US012155781B1

(12) United States Patent
Helfgott et al.

(10) Patent No.: US 12,155,781 B1
(45) Date of Patent: Nov. 26, 2024

(54) SYSTEM AND METHOD FOR DECENTRALIZED DATA MANAGEMENT AND DYNAMIC VERIFICATION, VALUATION, AND MONETIZATION OF DATA QUERIES

(71) Applicant: Valence Digital, Inc., New York, NY (US)

(72) Inventors: Adam Helfgott, New York, FL (US); Matthew Barlin, Pownal, VT (US)

( * ) Notice: Subject to any disclaimer, the term of this patent is extended or adjusted under 35 U.S.C. 154(b) by 0 days.

(21) Appl. No.: 18/738,985

(22) Filed: Jun. 10, 2024

Related U.S. Application Data

(60) Provisional application No. 63/472,185, filed on Jun. 9, 2023.

(51) Int. Cl.
*H04L 9/00* (2022.01)
*H04L 9/32* (2006.01)

(52) U.S. Cl.
CPC ............. *H04L 9/50* (2022.05); *H04L 9/3218* (2013.01)

(58) Field of Classification Search
CPC . H04L 9/50; H04L 9/3218; H04L 9/32; H04L 9/00
See application file for complete search history.

(56) References Cited

U.S. PATENT DOCUMENTS

| | | | |
|---|---|---|---|
| 2015/0269244 A1* | 9/2015 | Qamar | G06Q 10/10 705/7.42 |
| 2021/0174448 A1* | 6/2021 | Kotarinos | G06Q 40/04 |

\* cited by examiner

*Primary Examiner* — Quazi Farooqui
(74) *Attorney, Agent, or Firm* — Derek Fahey, Esq.; The IP Plus Firm, PLLC

(57) ABSTRACT

A computer-implemented method is disclosed for managing data transactions and verifying data integrity within a decentralized network using blockchain technology. This method involves receiving a data submission containing multiple data attributes and a unique digital identifier from a data provider's device. The data submission is authenticated via blockchain, verifying its cryptographic signature. A verifiable credential is generated, including the data attributes and a cryptographic proof created using zero-knowledge proofs to ensure each attribute's integrity. This verifiable credential is linked to the provider's device and stored on a connected database. An access credential is also generated, allowing specified data access under set permissions. Data access requests from authorized devices are verified and matched to credentials stored on the database. The system dynamically values data based on its usage across queries, employing a valuation model that uses game theory and Shapley values to calculate the relative value of data within the network, thereby enhancing privacy and monetization efficiency.

16 Claims, 20 Drawing Sheets

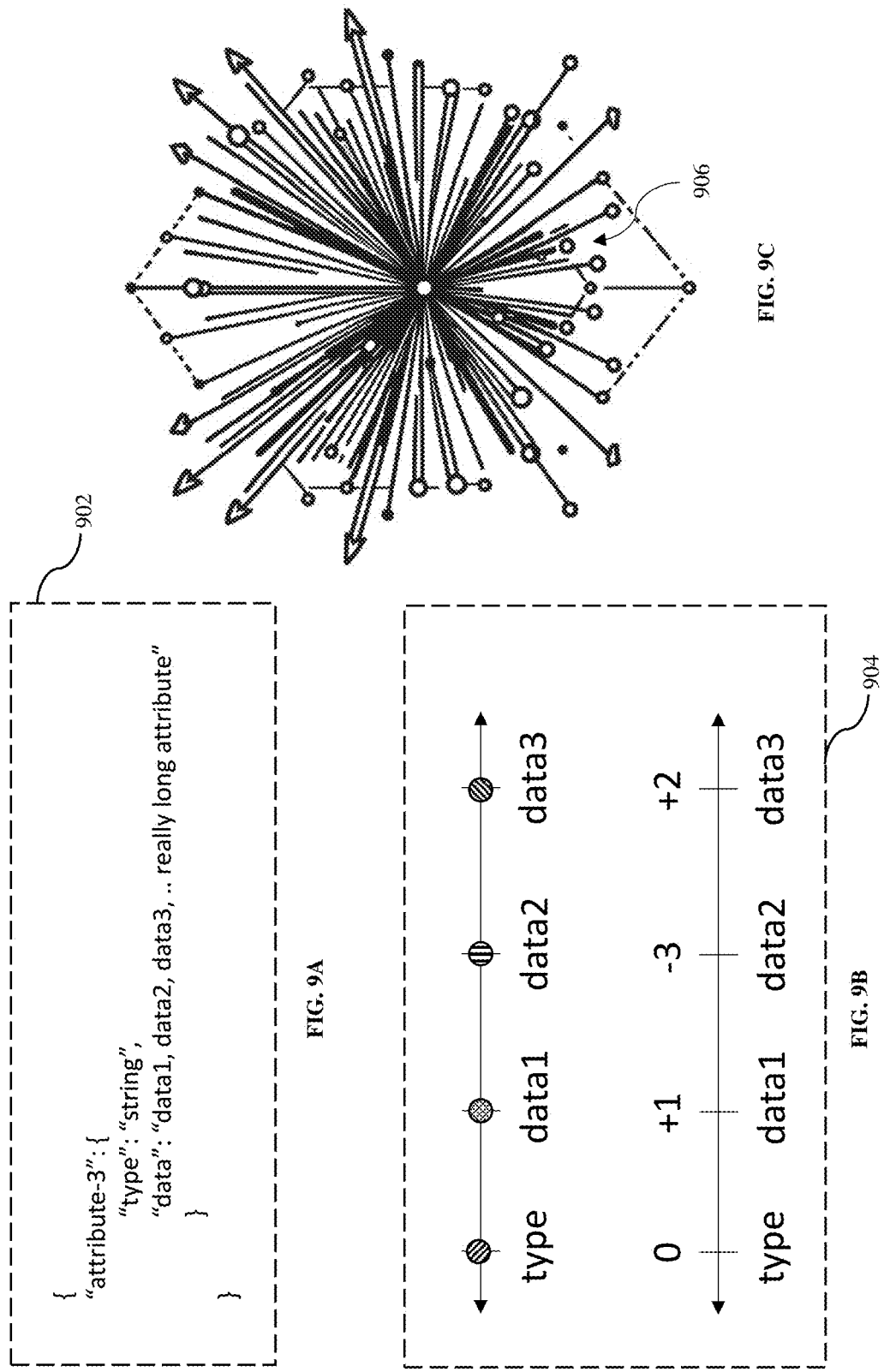

SYSTEM AND METHOD FOR DECENTRALIZED DATA MANAGEMENT AND DYNAMIC VERIFICATION, VALUATION, AND MONETIZATION OF DATA QUERIES

REFERENCE TO RELATED APPLICATIONS

This application is a non-provisional patent application which claims the benefit of the filing date of U.S. Provisional Application Ser. No. 63/472,185 titled "Methods and Systems for Monetizing Data Provided by A First User While Maintaining and Preserving the Veracity, Privacy, And Authenticity of the Data" and filed Jun. 9, 2023, and the subject matter of which is incorporated herein by reference.

CROSS-REFERENCES

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISK

Not applicable.

TECHNICAL FIELD

The present disclosure relates generally to the fields of data management, security, and monetization. More specifically, it pertains to systems and methods that utilize decentralized identifiers (DIDs), blockchain technology, and advanced cryptographic techniques, including zero-knowledge proofs, to facilitate dynamic and privacy-preserving data verification and monetization.

The disclosed system and methods may be implemented in a variety of fields involving data transactions, including but not limited to financial services, healthcare, e-commerce, supply chain management, and other fields which are within the spirit and scope of the present disclosure. For example, in the financial sector, the system enables secure and privacy-preserving data monetization, facilitating trusted exchange of sensitive financial information while ensuring compliance with regulations. In healthcare, the methods provide a framework for secure sharing and verification of medical records, enabling seamless interoperability and improving patient care. E-commerce platforms can leverage the system to enhance data privacy and trust in customer transactions, ensuring secure handling of personal information. Additionally, the disclosed methods may be implemented in supply chain management by enabling transparent and tamper-proof record-keeping of product provenance, thereby facilitating efficient tracking and verification of goods. These example applications of the disclosed methods and systems for enabling privacy-preserving data monetization using decentralized identifiers, blockchain technology, and cryptographic techniques are understood to be non-limiting example embodiments and other technical applications and fields may be within the spirit and scope of the present disclosure.

BACKGROUND OF THE INVENTION

In the contemporary data-driven economy, the ability to monetize data effectively while preserving privacy and security is paramount. Traditional data monetization platforms, however, face several challenges that hinder their efficiency and reliability. These challenges include inadequate privacy protections, lack of control over data usage, vulnerability to data breaches, and reliance on centralized systems that may lead to scalability issues and single points of failure.

In the burgeoning landscape of data-driven markets, traditional systems for data management and monetization frequently exhibit several deficiencies that curtail their efficacy and reliability. One predominant issue inherent in conventional methodologies is the compromised privacy and control over data. Typically, users are required to disclose personally identifiable information (PII) or sensitive data to access services or monetize their digital assets. This not only raises substantial privacy concerns but also heightens the risk of data breaches, leaving data owners vulnerable to unauthorized access and misuse of their information. Moreover, data owners may have limited control over the usage and distribution of their data, which can further exacerbate privacy concerns and undermine trust in the system.

Furthermore, the centralized architecture of many existing data management systems introduces significant vulnerabilities. These systems often serve as single points of failure, making them susceptible to cyber-attacks and operational disruptions. Centralization can also impede scalability and performance, leading to bottlenecks that affect the overall system efficiency. Moreover, the lack of transparent and robust mechanisms for value exchange between data owners and users often results in inefficient transactions. These transactions are typically encumbered by cumbersome agreements, slow processing times, and reliance on third-party intermediaries, which not only inflate costs but also obscure the fair distribution of revenues.

Existing data monetization platforms may also lack efficient, transparent, or secure mechanisms for exchanging value between data owners and requesting parties. Traditional methods of value exchange often involve complex agreements, manual processes, and third-party intermediaries, which can lead to potential disputes, increased costs, or unfair distribution of revenue. The dynamic valuation of data presents an intricate challenge that has long been unaddressed by traditional data monetization systems. Historically, these systems have employed static or overly simplified valuation models that fail to accurately reflect the real-time utility and relevance of data in diverse contexts. This static approach does not accommodate the fluid nature of data's value, which can fluctuate based on factors such as market demand, data scarcity, and its relevance to current events or trends. As a result, data providers and consumers often grapple with outdated valuations that do not accurately represent the data's current worth, leading to inefficiencies and missed opportunities in the marketplace. Moreover, there is a conspicuous absence of tools that adaptively assess and adjust data's value in response to its changing utility across different contexts and over time. This gap underscores a long-felt need for systems capable of dynamic and context-sensitive data valuation, which could significantly enhance the precision of data transactions and the fair distribution of economic benefits among stakeholders.

Additionally, verifying the authenticity and integrity of data in regulated industries poses significant challenges. Meeting regulatory compliance standards requires thorough verification of the data source, which can be a time-consuming and resource-intensive process. Traditional methods often involve manual checks or reliance on third-party intermediaries, resulting in delays, increased costs, and potential errors or fraudulent activities. These inefficiencies not only hinder the data exchange process but also raise concerns about data privacy and security. Furthermore, the reliance on external entities for verification introduces additional complexities and potential risks. Therefore, there is a need for improved solutions that streamline the verification process, enhance data integrity, and maintain regulatory compliance.

As a result, there exists a need for improvements over the prior art and more particularly for improved systems and methods for dynamic valuation and monetization of data queries in decentralized networks.

BRIEF SUMMARY OF THE INVENTION

A system and method for a computer-implemented method executed on a non-transitory recording medium for monetizing data while ensuring data veracity, privacy, and authenticity is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a computer-implemented method executed on a non-transitory recording medium for dynamic valuation and monetization of data queries is disclosed. The method is particularly tailored for a decentralized network utilizing blockchain technology, decentralized identifiers (DIDs), and advanced cryptographic mechanisms such as zero-knowledge proofs (ZKPs). Initially, the system receives a data submission containing multiple data attributes along with a unique digital identifier from a data provider's computing device. The submission is authenticated via blockchain by verifying a cryptographic signature linked to the digital identifier, enhancing the security and authenticity of the data.

The method further involves generating a verifiable credential for the data submission, which includes a cryptographic proof for each attribute using zero-knowledge proof techniques. This credential is then associated with the provider's device identifier and stored securely. Following this, an access credential is created, permitting a data requester's device to access designated data attributes, provided specific access permissions are met. This credential includes a temporal attribute, ensuring timely and controlled access to the data.

Upon receiving a data access request from the requester's device, the method verifies the request against stored access credentials and the verifiable credential, ensuring compliance with established permissions and temporal constraints. A verified presentation is then generated, which includes cryptographic proofs for the requested data attributes, and is sent to the requester, ensuring the privacy-preserving verification of data without exposing underlying sensitive information.

The present disclosure leverages a dynamic valuation model based on comparative analysis of data access requests. This model utilizes game theory and Shapley values to evaluate the frequency and density of data attributes across multiple queries, assigning value based on their occurrence within overlapping query clusters. This innovative approach not only enhances the monetization process by assigning a more accurate value to the data based on actual usage but also maintains the integrity and privacy of the data. Through this method, the system facilitates a secure, efficient, and transparent exchange of value, addressing the limitations of prior art by reducing dependency on centralized systems and manual processing, thereby revolutionizing data transactions in Web3 environments.

The present disclosure aims to provide a more effective, secure, and privacy-focused approach by utilizing decentralized systems, advanced cryptographic methods, and blockchain technology to facilitate secure and transparent data transactions. This system is particularly designed to enhance the dynamic valuation and monetization of data by leveraging a network of data queries. The disclosure addresses the risks associated with exposure of PII and vulnerabilities in centralized systems by ensuring robust privacy protections and decentralization. By implementing mechanisms such as zero-knowledge proofs, smart contracts, and dynamic query valuation, it allows for the secure exchange of value based on data attributes, while ensuring the authenticity and confidentiality of the data involved. This results in an optimized framework for data monetization that maintains the integrity and privacy of data supplied by data providers.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

FIGS. 9A through 9C depicts a visual representation of data converted into a vector or embedding, which is then plotted as a three-dimensional cluster, according to an example embodiment.

Figure 1:
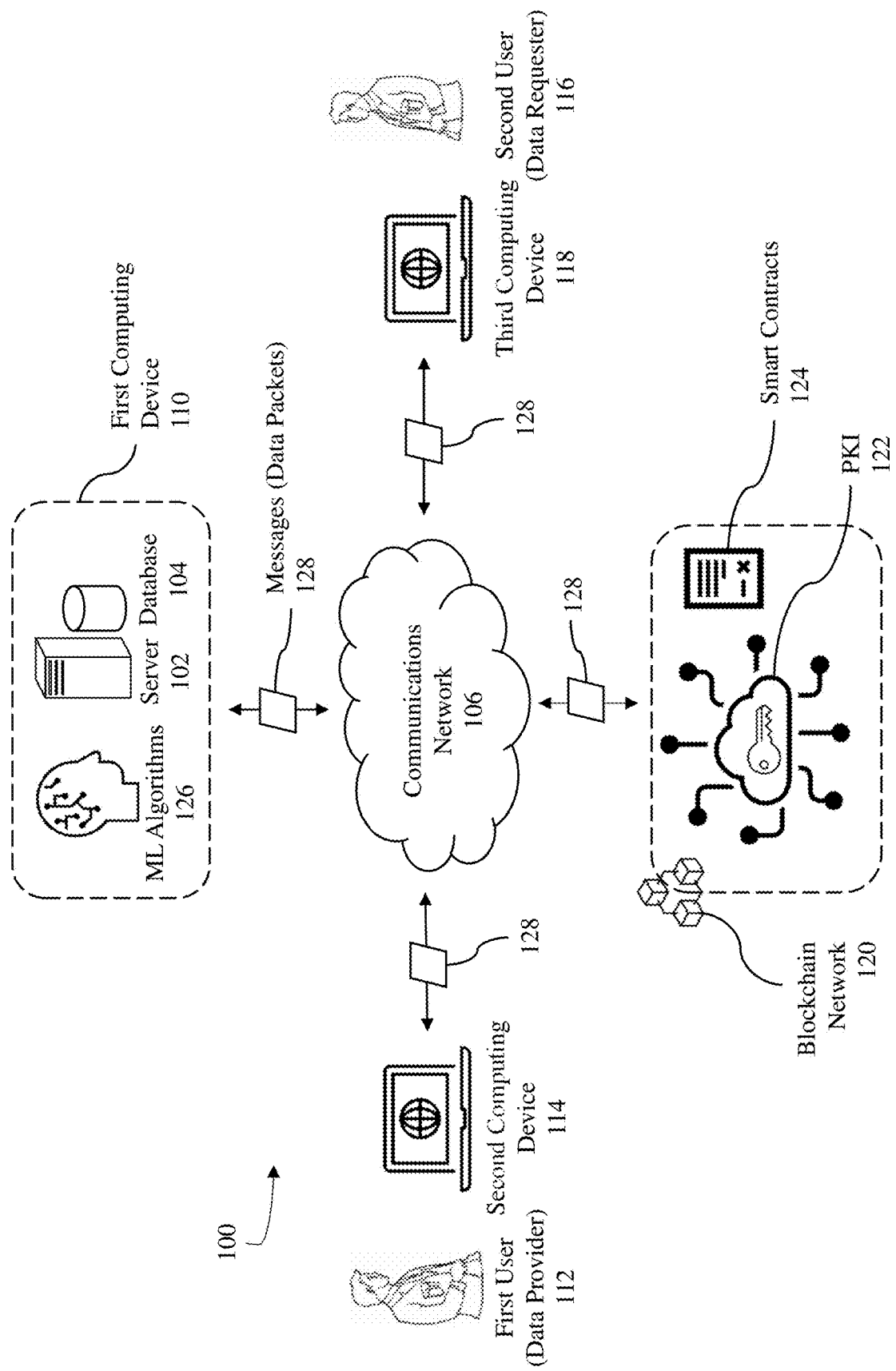
FIG. 1 is a diagram of an operating environment that supports the system and method for dynamic valuation and monetization of data queries, according to an example embodiment.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

Generally, the methods described herein are not limited to the particular order of the disclosed steps. While, in certain embodiments, the disclosed order may provide certain improvements over the prior art, it should be generally understood that the method steps may be rearranged, modified, or performed in alternative sequences without departing from the scope of the disclosure. In certain embodiments, the method steps may occur concurrently, simultaneously, independently, dependently, or in any other suitable manner, as determined by the specific implementation and requirements. The flexibility of the method allows for adaptability and optimization based on various factors, such as system resources, data availability, and user preferences. Therefore, the specific arrangement and order of the method steps should be interpreted as illustrative rather than limiting, and the disclosure encompasses all variations, modifications, and alternatives falling within the scope of the appended claims.

The disclosed methods and systems substantially advance the state of the art by integrating decentralized architectures, sophisticated cryptographic techniques, including zero-knowledge proofs (ZKPs), and blockchain technology. This combination addresses vulnerabilities associated with traditional centralized data transaction systems that often lead to compromised data integrity and privacy breaches. The method includes steps for verifying and storing DID documents, generating verified credentials, implementing zero-knowledge set membership, enabling querying of zero-knowledge set membership by a requesting party, verifying zero-knowledge proofs, and exchanging value between parties using frictional payments and smart contracts. The present disclosure provides significant improvements over the prior art in the field.

The method includes a comprehensive process for verifying DID document integrity, employing cryptographic proofs to secure data attributes, and using ZKPs for private data exchanges. Key to this method is the incorporation of blockchain technology not only for secure data storage but also for enabling transparent and efficient payment processing. By integrating smart contracts, payments related to data transactions can be automatically processed upon meeting predefined criteria, ensuring a seamless exchange of value between parties.

Auditability is achieved through the immutable nature of blockchain, where each transaction and data exchange is recorded in a tamper-proof ledger. This feature allows for real-time tracking and historical analysis of data transactions, enhancing trust and compliance with regulatory requirements.

Verification processes are strengthened by the blockchain's decentralized verification mechanisms, which authenticate data sources and users without the need for centralized authorities. This approach reduces vulnerabilities associated with centralized systems and minimizes the risk of PII exposure.

Importantly, this method also introduces mechanisms for tracking data lineage, enabling clear attribution, and assessing data valuation as it is used for querying and training models. Data lineage tracking ensures that every piece of data's journey, from its origin through its lifecycle, including modifications and branching, is recorded on the blockchain. This transparency not only aids in maintaining the integrity and reliability of data but also assists in compliance with regulatory and governance standards.

Attribution is seamlessly handled, attributing data contributions and usage back to their original sources, which is critical for intellectual property rights and compensating data owners appropriately. This fosters a more collaborative and respectful data exchange ecosystem, where contributors are acknowledged and rewarded for their input.

Traditional centralized systems are prone to single points of failure and centralized control, which can be exploited maliciously or fail catastrophically, leading to significant data loss or corruption. The adoption of a decentralized network in the present system mitigates these risks by distributing data transactions across multiple nodes, thereby eliminating any single point of failure and reducing the likelihood of data tampering or loss. This structure significantly increases the resilience and reliability of the data transaction system, enhancing user trust and system robustness.

Prior systems frequently fail to protect the privacy of data adequately during transactions, requiring the revelation of personally identifiable information or sensitive data. By implementing ZKPs, the disclosed system ensures that data owners can prove the validity of their data without exposing the underlying data itself. This capability contributes to maintaining data privacy and security, allowing owners to control their data's exposure and manage privacy risks effectively.

In addition, the disclosure offers efficient data validation mechanisms. By verifying DID documents before storage and employing cryptographic techniques, the method ensures the authenticity and integrity of data in a more efficient manner. This reduces the reliance on manual checks or third-party intermediaries, leading to streamlined processes and improved operational efficiency. Moreso, by verifying and authenticating the DID document before storage, the system improves over the prior art by enhancing the credibility and validity of the stored data. Unverified data and data provider(s) are not stored, thus, the database of information remains credible. This improves the associated value of said information.

The utilization of blockchain technology ensures that all transactions are recorded on an immutable ledger, providing transparency and a verifiable history of transactions that cannot be altered retroactively. This transparency is crucial for reducing fraud and disputes over data ownership or transaction history. Moreover, smart contracts automate these transactions, reducing the reliance on intermediaries, which in turn lowers costs and enhances transaction efficiency. These contracts execute automatically based on predefined conditions, ensuring that transactions are processed swiftly and without discrepancies.

Moreover, data valuation becomes an integral part of this system, offering a way to assess the worth of data based on its utility, rarity, and demand, especially as it is queried or used for training machine learning models. Traditional data valuation often relies on static metrics that do not account for the changing context or demand for data over time. The static approach can lead to undervaluation or overvaluation of data assets, making it difficult for data owners to capture the true market value of their data. In contrast, the dynamic data valuation model implemented in the disclosed system adjusts the valuation of data in real-time based on various factors, including usage patterns, demand fluctuations, and the specific context in which the data is being used. This method ensures that data pricing is responsive to market conditions and more accurately reflects the current utility and scarcity of the data. Such responsiveness not only maximizes revenue opportunities for data providers but also promotes fair pricing for data consumers.

The system incorporates advanced game theory concepts and Shapley values to further refine the process of data valuation. Shapley values, a concept from cooperative game theory, are used to fairly distribute the gains obtained from data transactions among all contributing data sources. This method calculates the contribution of each data attribute or source to the overall value of a dataset or query response. By assessing the marginal contribution of each attribute within the context of all possible coalitions of data attributes, the system can determine the intrinsic value of each data point in a way that accounts for interdependencies and synergistic effects among data. This application of Shapley values is particularly innovative because it recognizes and quantifies the value of data in complex, interconnected systems where the contribution of individual data points may not be straightforward. This approach is crucial in environments like healthcare, financial services, or targeted marketing, where the integration and analysis of various data types can lead to significantly enhanced insights and decision-making capabilities.

Moreover, the system facilitates an automated valuation process that dynamically adapts based on incoming data queries and transactions. This automation is enabled through the use of smart contracts on the blockchain, which execute valuation algorithms and adjust pricing models in real-time as new data is accessed or shared. This level of automation not only reduces the administrative burden associated with manual valuation processes but also increases the system's ability to quickly adapt to new information or changing market dynamics.

Furthermore, the transparency in the system is profoundly enhanced by the recording of detailed data exchange records on the blockchain. These records are not mere transaction logs but are comprehensive cryptographic proofs that offer multi-layered verification of each data transaction. Specifically, the system records each data exchange record includes at least one third cryptographic proof. This serves as a function of the plurality of verified presentations provided to the requesting device, thus ensuring a layered cryptographic validation of each verified presentation. This method authenticates every subset of the data attributes and the corresponding cryptographic proofs that were transmitted, ensuring that the data integrity and authenticity are maintained and verifiable. The records also capture details about the frictional payments calculated based on the dynamic valuation model. This inclusion not only ensures the transparency of the financial transactions related to data access but also ties the payment directly to the value derived from the data, as determined by the valuation model. Furthermore, the system records at least a portion of the access credentials of the requesting device. This documentation includes the credentials used in the transaction, providing an audit trail that links each data request directly to its requester, thereby enhancing accountability and traceability. This comprehensive and transparent recording mechanism on a decentralized blockchain architecture ensures that all stakeholders can audit and verify the fairness and accuracy of the data transactions. Such detailed recording of cryptographic proofs, financial transactions, and access credentials builds trust among data providers, consumers, and regulators. This is particularly crucial in sectors where data sensitivity and the privacy of personally identifiable information are paramount. By providing a robust framework for verifying the integrity and authenticity of every transaction, the system significantly elevates the standards of transparency and trust in data monetization platforms.

Referring now to the Figures, FIG. 1 is a is a diagram illustrating an exemplary embodiment of operating environment 100 that supports the system and method for dynamic valuation and monetization of data queries. The operating environment 100 includes a first computing device 110, which serves as the core server 102 comprising a database 104 and machine learning (ML) algorithms 126 for processing and analyzing data transactions. These ML algorithms are crucial for processing, analyzing, and dynamically valuing data transactions based on real-time data interactions and historical data patterns within the network. The first computing device 110 is connected to a communications network 106, facilitating data exchange among various entities in the network. Furthermore, the operating environment may further encompass decentralized storage systems, which allow for the secure storage and retrieval of data. These systems distribute data across multiple nodes, eliminating the risk of data loss or unauthorized access associated with centralized storage.

The server 102, associated with repository or database 104, which may be a relational database comprising a Structured Query Language (SQL) database stored in a SQL server or a database that adheres to the NoSQL paradigm. It is understood that other components of the system may also include databases. The server and database collectively define the first computing device, which is further coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. In one embodiment, network 106 is a secure network wherein communications between endpoints are encrypted so as to ensure the security of the data being transmitted. Server 102 may act as a central controller or operator for the functionality that executes on at least a first computing device 110, employing various methods. Server 102 leverages Web3 technologies and adheres to the World Wide Web Consortium (W3C) standards, forming a cornerstone of the operating environment's architecture. Web3, often referred to as the third generation of internet services, encompasses decentralized networks and protocols, emphasizing user privacy and data ownership. It utilizes blockchain technology, smart contracts 124, and cryptographic proofs to create a secure and transparent system where data transactions and verifications are executed without central oversight. This alignment with W3C standards ensures that the server's implementation of these technologies follows global best practices for web functionalities, including identity management through DIDs and secure data exchanges via verifiable credentials. Server 102 integrates these components into a cohesive system that not only supports robust security mechanisms but also enhances data interoperability across different platforms and services within the Web3 ecosystem. The use of W3C standards helps maintain compatibility with existing web infrastructures, facilitating a seamless integration of traditional web services with the innovative features of Web3, thus driving forward the evolution towards a more decentralized and user-empowered internet.

Within the network infrastructure, the disclosed method is executed by at least one processor, which may be at least one processor of the first computing device, operating on a non-transitory recording medium. The processor may be communicably connected to the communications network, allowing for data transmission and reception. The server 102 may include a software engine that delivers applications, data, program code and other information to networked devices. The software engine of server may perform other processes such as transferring multimedia data in a stream of packets that are interpreted and rendered by a software application as the packets arrive. The software engine and at least one processor may further employ ML algorithms 126 which are specifically designed to enhance data processing by employing predictive analytics and pattern recognition to optimize the valuation of data transactions. These algorithms enable the system to adapt to evolving data usage patterns and market dynamics, thereby ensuring that data valuations reflect the most current and accurate market conditions. ML algorithms are computational methods that enable systems to learn from data and make decisions or predictions without explicit programming. These algorithms develop mathematical models from input data to perform tasks such as classification, prediction, and pattern recognition, adapting their performance as they receive more data. In the context of the disclosed invention, ML algorithms are employed to dynamically evaluate and value data transactions within a decentralized network. Specifically, these algorithms analyze patterns of data usage and interactions across multiple queries to assess the relative value of data attributes. This assessment is based on a model that calculates attribute density and frequency within overlapping query clusters. The machine learning algorithms facilitate the automation of value determination, enhancing the efficiency and accuracy of data monetization processes in environments where data veracity, privacy, and authenticity are critical.

The software of the system may be configured to create records for the users in the network and may associate various nodes of the network with each user. The database 102 may include a stored record for each of the users in the system. The database may be configured to store a subset of user attributes including non-personal identifying information ("non-PII") data. PII means information that identifies, relates to, describes, is capable of being associated with, or could reasonably be linked, directly or indirectly, with a particular user. Non-PII data may include information that is anonymous and cannot identify the user. Non-PII data helps protect the user such that the information may not be used to harm the user. Non-PII data may include device type, browser type, language preference, temporal attributes, etc.

The networked environment may also include a blockchain network 120 or blockchain technology infrastructure for storing one or more distributed ledgers that record transactions, such as acquisition of a digital asset. The transactions are bundled into blocks and every block (except for the first block) refers to or is linked to a prior block in the chain. Computer nodes may maintain the blockchain and cryptographically validate each new block and thus the transactions contained in the corresponding block. A ledger is a record-keeping system that tracks the transactions in accounts. Unlike a centralized ledger, the data in the distributed ledger is immutable because the data is stored on multiple nodes, which are connected independent computers in a network, making it impossible to change the information in the data.

The blockchain serves as a decentralized, tamper-proof distributed ledger, storing recorded information securely and immutably. The blockchain infrastructure includes nodes, which are computing devices participating in the validation and consensus process to maintain the integrity of the blockchain. These nodes communicate with each other to reach agreement on the validity and order of transactions recorded on the blockchain.

A block chain or blockchain is a distributed database that maintains a list of data records on the ledger. The security of the block chain enhanced by the distributed nature of the block chain. A block chain typically includes several nodes. Each of the nodes may be one or more computers, databases, data stores, machines, operably connect to one another. In some cases, each of the nodes or multiple nodes are maintained by different entities. A block chain typically works without a central repository or single administrator. The data records recorded in the block chain are enforced cryptographically and stored on the nodes of the block chain. A block chain provides numerous advantages over traditional databases. The nodes of a block chain may reach a consensus regarding the validity of a transaction contained on the transaction ledger. The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. In the present disclosure, certain messages, cryptographic or otherwise, are transmitted across the communications network and may be stored on the blockchain network.

Users of the block chain create transactions that are passed around to various nodes of the block chain. A "valid" transaction is one that can be validated based on a set of rules that are defined by the particular system implementing the block chain. For example, in the case of present disclosure, a valid transaction is acquisition of a digital asset. In some block chain systems, miners are incentivized to create blocks by a rewards structure that offers a pre-defined per-block reward and/or fees offered within the transactions validated themselves. Thus, when a miner successfully validates a transaction on the block chain, the miner may receive rewards and/or fees as an incentive to continue creating new blocks. Example blockchain networks may include the Ethereum® network, Polkadot® network, Binance® network, Bitcoin® network, Cardano®, etc. Other blockchain networks may be used and are within the spirit and scope of the present disclosure.

It will be appreciated by those of ordinary skill in the art that a blockchain is a distributed ledger, meaning that the ledger is spread across a plurality of devices in a kind of peer-to-peer network. The blockchain ledger is cryptographically secured and data can only be added to the blockchain. Critically, any additions and/or transactions (i.e., newly created blocks) made to the blockchain are validated by other devices in the network against one or more criteria defined by the blockchain protocol. The additions and/or transactions to the blockchain are only made final and added to the blockchain ledger after a consensus has been reached among the validating devices on the network. In one exemplary embodiment, the record store discussed herein is built as a smart contract in a Permissioned Ethereum-based blockchain, such that the record store has the ability to rapidly iterate designs utilizing the semi-Turing Complete programming language Solidity. However, this specific blockchain design is but one of many possible suitable implementations. The blockchain-based record store system described herein is utilized for registering cryptographic identities for the various parties of the network involved in advertisement transactions, including the publishers, the advertisers, the supply-side platforms, and the demand-side platforms. In order to register a cryptographic identity in this system, this system, the owner of may write, at a designated record name, the public key of an asymmetric keypair. In one embodiment, these cryptographic identities are generated using the Libsodium library, against the Ed25519 elliptic curve.

In the disclosed system, the operating environment is significantly enhanced by the integration of smart contracts 124 and cryptographic proofs within the blockchain network. Smart contracts, automated scripts stored on the blockchain, contributes to facilitating and enforcing the terms of data transactions automatically. These contracts are executed in a decentralized manner, ensuring that actions such as access control, payment processing, and compliance with predefined conditions are performed without manual intervention and with a high level of reliability. Cryptographic proofs, particularly those generated using zero-knowledge techniques, are utilized to further secure and privatize the interactions within the network. These proofs allow a data provider to demonstrate the validity of data or credentials without revealing the underlying information. This mechanism is crucial for maintaining privacy and security, as it minimizes the exposure of sensitive data during transactions. Both smart contracts and cryptographic proofs are central to the blockchain network's architecture in the system, ensuring not only the integrity and immutability of data but also supporting complex workflows and interactions among various stakeholders. This framework allows for a robust, transparent, and secure ecosystem where data transactions are conducted efficiently, fostering trust among participants and adhering to stringent security and privacy standards.

ZKPs offer a significant improvement over prior art by enhancing the privacy and security aspects of data transactions in decentralized networks. ZKPs enable the verification of data or credentials without revealing any underlying sensitive information. This feature addresses a vulnerability in traditional systems where data must be fully exposed to validate its authenticity, leading to potential privacy breaches and unauthorized data access. In the context of blockchain-based systems, ZKPs allow participants to engage in transactions that require validation of conditions or credentials without disclosing the contents. For instance, a party can prove they meet the age requirement for a service without revealing their exact age or date of birth. This capability not only minimizes the exposure of personal information but also reduces the risk of data being compromised or misused. Furthermore, ZKPs contribute to the efficiency of the blockchain network by reducing the amount of data that needs to be transmitted and stored on the blockchain, since only the proof and not the actual data is recorded. This optimization helps in maintaining faster transaction speeds and lower operational costs, thus overcoming scalability challenges often faced in previous systems. By ensuring data privacy and system efficiency, ZKPs represent a transformative improvement in the way data transactions are secured and verified in modern technological frameworks.

In certain embodiments, the blockchain network utilized in the present disclosure incorporates a robust public key infrastructure 122 (PKI) to enhance security, integrity, and authenticity within the network. The PKI component within the blockchain network provides a comprehensive framework for managing digital certificates, cryptographic keys, and related protocols. In effect, this allows the records stored to act as a PKI. In order for a PKI to be trusted, there must be a root of trust in the system. The root of trust may be some trusted entity and/or certifying entity, or key issuing entity associated with the blockchain network 120. The key issuing entity may be a certifying entity; however, other types of entities may be used and are within the spirit and scope of the claimed embodiments.

Within the blockchain network, the PKI enables the generation, distribution, and verification of digital certificates and cryptographic keys. These certificates and keys play a vital role in establishing secure and authenticated communication among the various entities involved in the network. The PKI operates based on asymmetric key cryptography, utilizing public and private key pairs. Each participant within the blockchain network possesses a unique public key associated with their identity, while their corresponding private key is kept confidential. This asymmetric key pair ensures the authenticity and integrity of digital signatures and cryptographic proofs used in the blockchain network.

With the PKI, participants can digitally sign their transactions, adding an additional layer of security and verifiability to the recorded data. Digital signatures created with private keys can be verified using the corresponding public keys, ensuring that the transactions originated from the authorized parties and have not been tampered with during transmission. Furthermore, the PKI enables secure key exchange and encryption of sensitive data within the blockchain network. By leveraging cryptographic algorithms and protocols, participants can establish secure communication channels, protect data privacy, and prevent unauthorized access. By incorporating a PKI within the blockchain network, the present disclosure ensures that the recorded transactions and interactions are performed securely, with strong authentication and protection against tampering. The PKI enhances trust and confidence in the blockchain network, promoting the veracity and integrity of the recorded data.

It is understood that first user 112 is associated with second computing device 114 and second user 116 is associated with third computing device 118. These computing devices interact with the aforementioned components to initiate, authenticate, and execute the disclosed method. The disclosed system includes a diverse range of computing devices that work collaboratively to facilitate the secure and privacy-preserving data monetization method. These computing devices, interconnected through a communications network, provide the necessary infrastructure and functionality to execute the disclosed method effectively.

In one embodiment, the system includes data owner 112 associated computing devices, such as computing devices 114 for example, and requesting party 116 associated computing devices, such as third computing 118, each of which may be a computing device including but not limited to a mobile phone, tablet, smart phone, smart tv, application, over-the top media service (OTT), streaming platform, desktop, laptop, wearable technology, or any other device or system comprising a processor and configured to be utilized by individuals or organizations who possess and contribute data for monetization.

For example, a data owner may utilize a personal computer to securely interact with the system, authenticate their identity, and provide the required data attributes for monetization. Likewise, a business seeking access to specific data attributes may use a requesting party computing device to initiate queries, securely interact with the system, and receive verified presentations of desired data attributes.

Validator computing devices, such as first computing device 110, may include servers, cloud-based platforms, or dedicated hardware, are integral to the system's functionality. Validators perform tasks such as message authentication, cryptographic operations, and membership verification in the accepted set. For example, a dedicated server may be used as a validator to ensure the integrity and security of the data monetization process.

As discussed above, the system may also incorporate blockchain network nodes, which can be operated by individuals or organizations. These nodes, including dedicated servers or distributed computing devices, participate in the validation and consensus process, maintaining the integrity and transparency of the blockchain and its distributed ledgers. For instance, a network of interconnected servers can serve as blockchain network nodes, contributing computational resources and storage capacity to the network.

It should be noted that the described computing devices are provided as examples and are not intended to be exhaustive. The system can encompass various other types of computing devices based on the specific implementation requirements and available technologies. The computing devices within the system communicate and interact over the communications network, enabling secure data exchange, authentication, and validation.

In the disclosed operating environment, multiple data packets or messages 128 are exchanged between users over the communications networks to the plurality of computing devices, enabling the seamless execution of the data monetization method. As used herein, a message refers to a unit of information or data exchanged between computing devices within the system. It represents a structured format containing specific content and may include various attributes, parameters, instructions, or requests related to the operation and functionality of the system. Messages can be transmitted over a communications network, such as the internet, using standard protocols and formats to enable reliable and secure data transmission. They serve as a means of communication and interaction between different entities within the system, facilitating the exchange of data, instructions, queries, responses, or notifications. Messages can be in various formats, such as text-based messages, data packets, cryptographic constructs, or other suitable formats, depending on the nature of the information being conveyed. The content of a message may be tailored to specific requirements and functionalities of the system, including but not limited to authentication, verification, data queries, payment transactions, or any other relevant operations within the system.

In connection with other entities of the operating environment, a data provider, referred to as the first user 112, utilizes a second computing device 114 to submit data to the network. This data submission includes multiple data attributes and a unique digital identifier associated with the second computing device 114. The second computing device 114 transmits this data submission through the communications network 106 to the first computing device 110.

The first computing device 110 authenticates the received data submission by querying the blockchain network 120 to verify the cryptographic signature corresponding to the unique digital identifier. Upon successful verification, the first computing device 110 generates a verifiable credential that includes the plurality of data attributes, a first cryptographic proof generated using zero-knowledge proofs, the unique digital identifier, and a plurality of access permissions. This verifiable credential is then associated with the unique identifier of the second computing device 114 and sent back to it. The verifiable credential is stored on a connected database within the first computing device 110.

When a data requester, referred to as the second user 116, using a third computing device 118, submits a data access request, the first computing device 110 generates an access credential. This access credential authorizes the third computing device 118 to access a subset of the data attributes if the specified access permissions are met. The access credential includes a unique identifier of the third computing device 118 and a temporal attribute, ensuring controlled and time-bound access.

Upon receiving a data access request from the third computing device 118, the first computing device 110 verifies that the request satisfies the conditions specified in the access credential, including the temporal attribute. The verifiable credential associated with the access credential is then verified, and the relevant data attributes are retrieved from the indexable reference generated earlier.

A verified presentation of the requested data attributes, along with a second cryptographic proof, is generated and sent to the third computing device 118. Multiple verified presentations can be generated and transmitted based on subsequent data access requests from the third computing device 118. Each data transaction is recorded on the blockchain network 120, including a third cryptographic proof, a frictional payment based on a valuation model, and a portion of the access credential of the third computing device 118 that submitted the data request.

The valuation model employed for determining the frictional payment includes predefined metrics for assessing the value of data attributes. It dynamically adjusts based on data usage patterns and query frequencies, ensuring fair and accurate valuation of data transactions within the decentralized network.

In other embodiments, initially, a first message is received from a second computing device of a first party. This first message includes a variety of attributes, including a unique identifier of a first subject and a first public key associated with the first party. The first message is transmitted over the communications network, allowing for secure data transfer between the parties involved. To ensure the authenticity and integrity of the first message, verification steps are performed. These steps involve querying a blockchain-based PKI to authenticate the first message and its associated attributes. This authentication process establishes the validity of the first party's identity and ensures the integrity of the transmitted information.

Following the verification process, the method generates one or more cryptographic proofs for each attribute of the first message. These cryptographic proofs serve as a cryptographic construct that verifies the authenticity of the attributes without revealing sensitive information. The cryptographic proofs provide a means to demonstrate the membership of the first party's attributes within the accepted set.

Furthermore, additional messages are generated and exchanged within the operating environment. These messages include a second message derived from an aggregation of the cryptographic proofs, a third message generated based on the recorded second message, and a fourth message comprising a second cryptographic proof of the third message. These messages facilitate the storage, validation, and presentation of the verified credentials and ensure the secure transmission of information throughout the data monetization process.

Additionally, the operating environment allows for the exchange of messages between the plurality of computing devices and at least one third computing device representing a data requester. A fifth message is received from the at least one third computing device, containing a query for a desired attribute of the first message. This query is authenticated by querying the blockchain and ensuring the legitimacy of the requesting party. In response to the query, a sixth message comprising a cryptographic construct of the fourth message is sent to the at least one third computing device. This verified presentation enables the data requester to access and verify the desired attribute securely and without compromising the privacy of the first message. By facilitating the exchange of these various messages over the communications networks to the plurality of computing devices, the disclosed operating environment ensures secure and reliable communication, authentication, and data transfer throughout the data monetization process.

Therefore, the operating environment supports the transaction of multiple messages over the communications networks to the plurality of computing devices, enabling secure and efficient communication, authentication, and data exchange between the parties involved in the data monetization process. It should be noted that the operating environment described herein is intended to provide a general framework for implementing the disclosed system and methods. The specific configuration, arrangement, and functionality of the operating environment may vary based on the implementation requirements and available technologies. It should be further understood that the specific format, content, and sequence of the messages may vary based on the implementation details and requirements of the operating environment.

Figure 2:
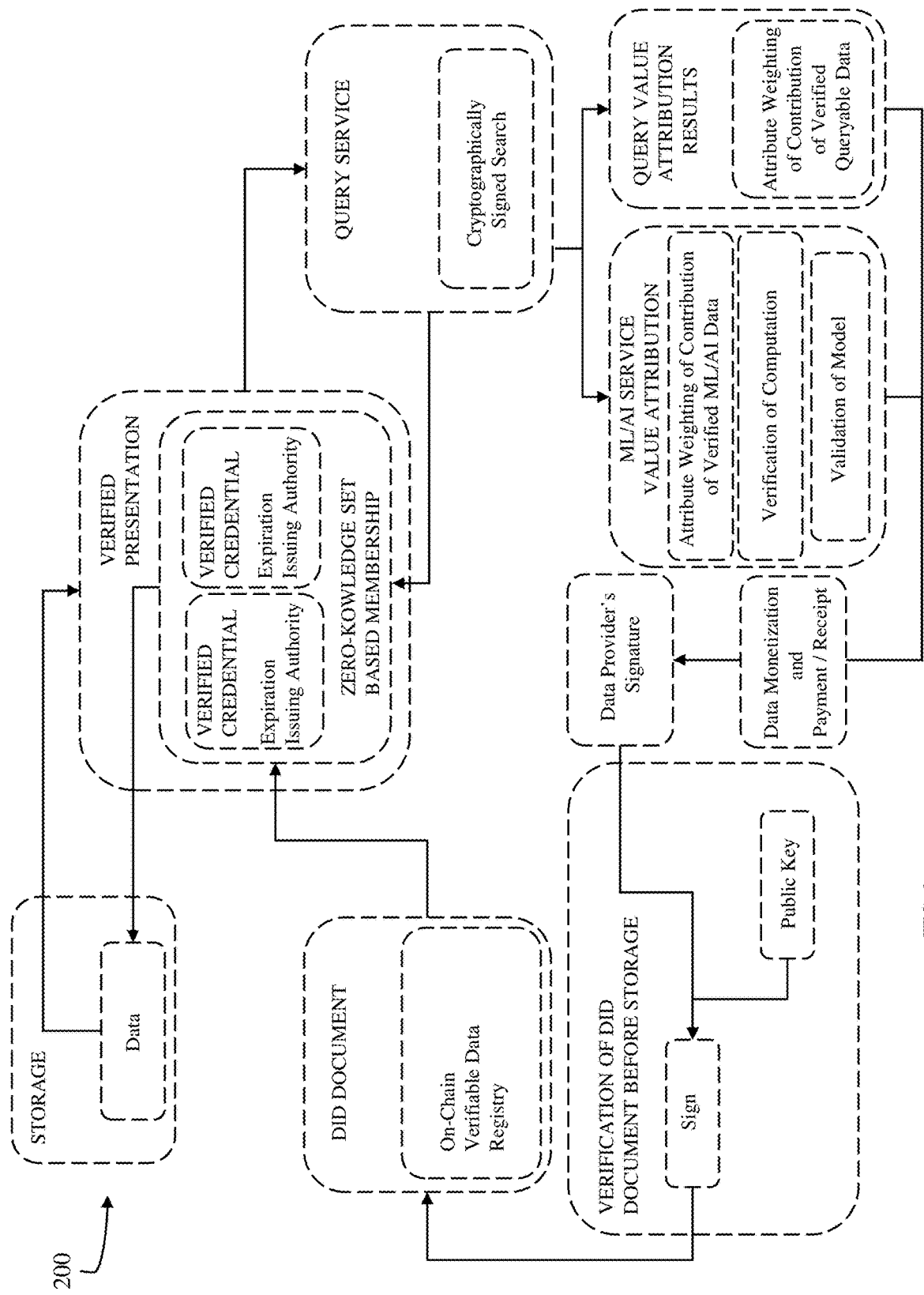
FIG. 2 is an overview diagram of the computer-implemented method for managing data transactions and verification in a decentralized network using a blockchain, according to an example embodiment.
Figure 3A:
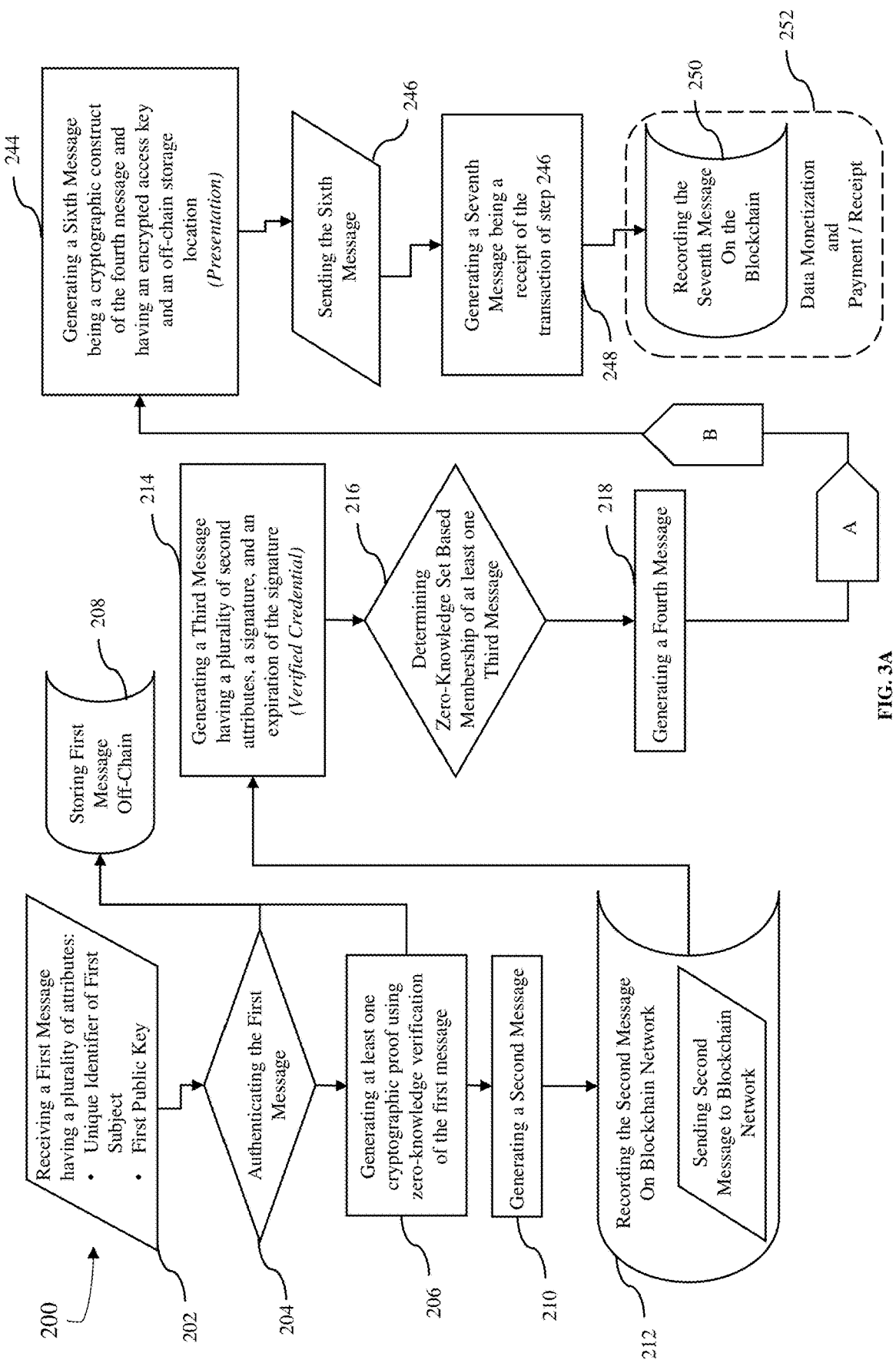
FIG. 3A is a detailed box-diagram of the method for computer-implemented method for managing data transactions and verification in a decentralized network using a blockchain, according to a first example embodiment.
Figure 3B:
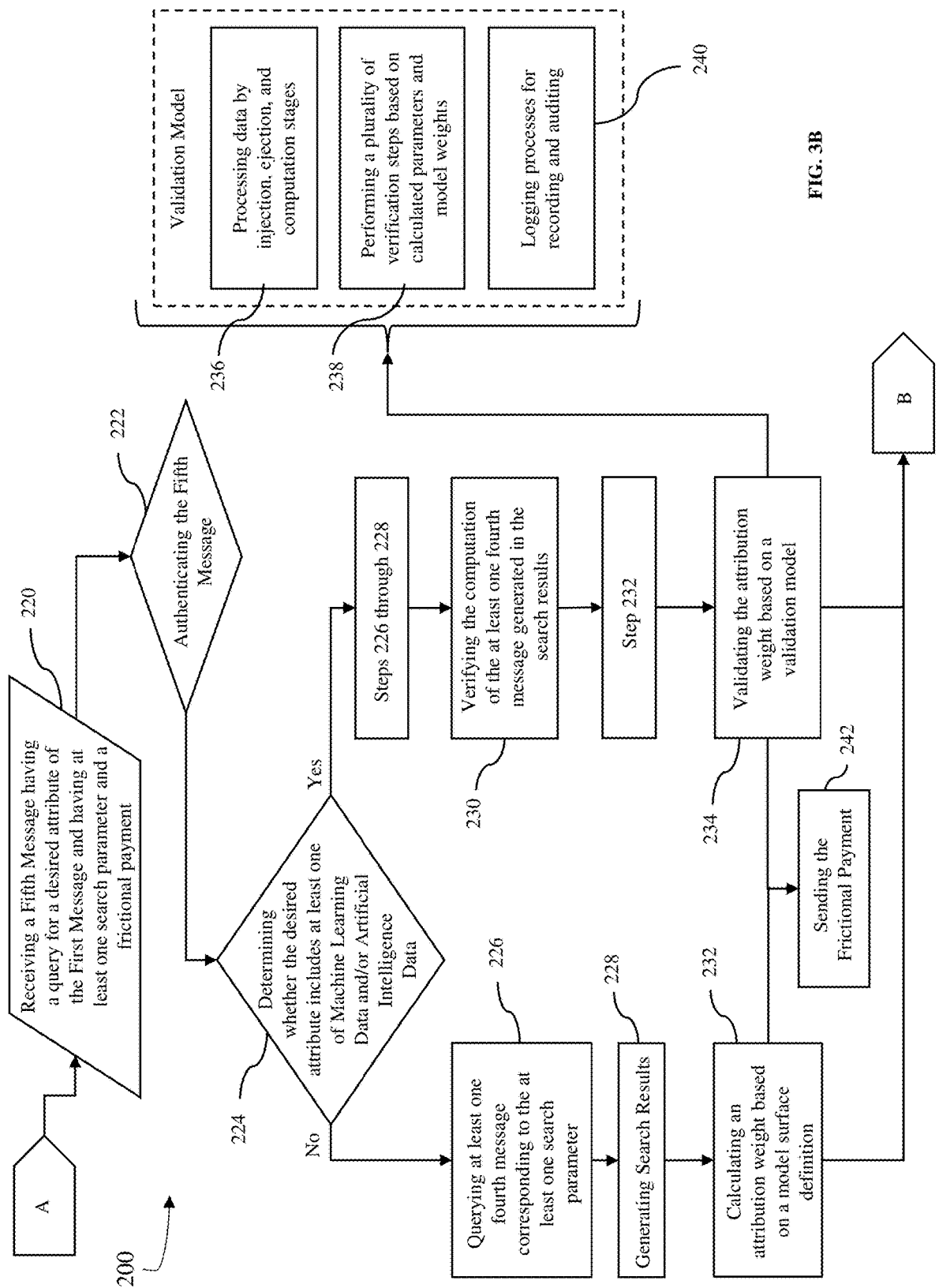
FIG. 3B is a continuation of the detailed box-diagram of the method of FIG. 3A, according to the first example embodiment.

Referring now to FIG. 2 and FIGS. 3A through 3B, overview diagram of the exemplary embodiment of computer-implemented method 200 for managing data transactions and verification in a decentralized network using a blockchain, according to an example embodiment. FIG. 3A is a detailed box-diagram of the method 200 for computer-implemented method for managing data transactions and verification in a decentralized network using a blockchain, according to a first example embodiment. FIG. 3B is a continuation of the detailed box-diagram of the method 200 of FIG. 3A, according to the first example embodiment.

The disclosed method enables the secure and privacy-preserving monetization of data while maintaining veracity, privacy, and authenticity. By leveraging DIDs, zero-knowledge proofs, and blockchain technology, the method provides a robust framework for data exchange and value attribution.

The method begins by verifying the authenticity of a DID document before storage, ensuring the integrity and trustworthiness of the provided data attributes. This verification is achieved through the utilization of a public key and private key pairing, along with a zero-knowledge deterministic architecture. Once verified, the DID document and associated attributes are securely stored on a blockchain, ensuring tamper-proof records and transparency. A verified credential is generated, containing relevant information such as expiration dates and issuing authority, further enhancing the credibility of the data. It is understood that in certain embodiments, the issuing authority may be the data providing entity itself, which has already undergone a rigorous process of verification and authentication. This ensures that the verified credential not only validates the data attributes but also reinforces the trustworthiness of the data source. By allowing the data providing entity to serve as the issuing authority, the disclosed system and methods streamline the verification process, promote self-governance, and empower trusted entities within the data ecosystem.

In another embodiment, the issuing authority of the verified credential may be a trusted entity that receives the data from the data provider. This embodiment enables a multi-tiered approach to data verification and authentication, leveraging the expertise and reputation of trusted entities within the data ecosystem. By involving a separate issuing authority, the disclosed system and methods provide an additional layer of validation and credibility to the data. The trusted entity acts as an intermediary between the data provider and the data consumer, verifying the authenticity and integrity of the data before issuing the verified credential. This embodiment enhances the overall trustworthiness of the data exchange process and promotes a collaborative and reliable data ecosystem.

The method incorporates zero-knowledge set membership to establish the inclusion of verified credentials within the accepted set. This allows for efficient querying of the data attributes without revealing private information. Zero-knowledge proof protocols, such as zk-SNARKs or zk-STARKs, can be utilized to generate cryptographic proofs, demonstrating the membership of credentials without disclosing sensitive details.

Furthermore, the method enables frictional payment mechanisms and value attribution. This allows for fair revenue distribution and a transparent value exchange between data owners and requesting parties. The attribution weighting of contribution is determined based on the verified queryable data or the verified ML/AJ data, ensuring a fair assessment of the data's value.

Overall, the method offers a privacy-focused approach to data monetization, leveraging decentralized architecture, cryptographic techniques, and secure value exchange mechanisms. By preserving the privacy of data, ensuring its integrity, and promoting transparency, the method addresses the challenges associated with existing data monetization methods, providing an innovative and reliable solution.

The method 200 is further detailed in FIG. 3A and FIG. 3B. At step 202, the first computing device receives a first message from a second computing device of the first party, which is the data providing party, and of which the reception of the first message facilitating the initial data exchange and authentication process. It is understood that in certain embodiments, the system may receive a plurality of first messages from at least one first user and/or a plurality of first users and data contributors.

The first message, transmitted over the communications network, includes a plurality of attributes that are essential for the subsequent steps of the method. In this step, the system receives the first message, which may contain various information, including but not limited to a unique identifier of a first subject and a first public key associated with the first party. The reception of the first message is accomplished through secure communication channels established over the communications network.

In the context of a DID document, a unique identifier refers to a distinct and unambiguous identifier assigned to a specific subject or entity. This identifier serves as a unique reference point for the subject within the decentralized identity system. It allows for the identification and differentiation of different subjects, such as individuals, organizations, devices, or entities, within the network. The unique identifier within a DID document is typically represented as a string of characters or digits that is globally unique and persistent. It provides a means to uniquely identify and reference the subject associated with the DID document. This unique identifier plays a crucial role in establishing the identity and authenticity of the subject within the decentralized identity ecosystem, enabling secure and trusted interactions between different parties and systems.

The receiving computing device, which may be operated by the system or a designated entity, is configured to accept and process the incoming first message. The receiving computing device ensures the proper handling and storage of the received message, adhering to data security and privacy protocols. By receiving the first message, the system initiates the data monetization process, laying the foundation for subsequent verification and storage steps. The reception of the first message acts as a trigger for further actions within the method, enabling the subsequent steps to authenticate, validate, and process the received attributes effectively.

Next, at step 204, the method includes authenticating, with the least one processor, the first message by querying a blockchain network having a public key infrastructure. This step ensures the verification and integrity of the received message while also verifying the identity of the data contributing party, further establishing the trustworthiness of the provided data attributes.

To authenticate the first message, the processor(s) initiate key pairing authentication with the PKI. This involves the use of public and private key pairs associated with the communicating parties. The first message contains a first public key, and the corresponding private key is securely held by the data contributing party. The processor(s) utilize the PKI to authenticate the public key in the first message by matching it with the corresponding private key held by the authorized data contributing party. By performing key pairing authentication, the system verifies the authenticity and integrity of the first message, ensuring that it was indeed generated and transmitted by the authorized party associated with the corresponding private key. This authentication process establishes a trusted and secure communication channel between the parties, preventing unauthorized access or tampering of the data attributes.

Key pairing authentication, also known as public key cryptography, is a fundamental cryptographic technique that enables secure communication and data exchange between parties. It relies on the use of two related cryptographic keys, namely a public key and a private key, to establish a secure and trusted communication channel. In key pairing authentication, each party generates a pair of cryptographic keys: a public key and a private key. The private key is kept secret and known only to the owner, while the public key is shared openly or through a trusted channel. These keys are mathematically related, allowing data encrypted with one key to be decrypted only with the corresponding key from the pair.

The authentication process starts when one party, the sender, wants to establish communication with another party, the recipient. To authenticate the recipient, the sender encrypts a challenge or message using the recipient's public key. The encrypted message is then transmitted to the recipient over a secure communication channel. Upon receiving the encrypted message, the recipient uses their private key to decrypt the message. If the decryption is successful, it demonstrates that the recipient possesses the corresponding private key, thus confirming their identity and authenticity. This authentication process ensures that only the intended recipient, who holds the private key, can decrypt the message and access the encrypted information.

Decryption using PKI is a cryptographic process that enables the secure access to encrypted messages. PKI relies on a pair of asymmetric cryptographic keys, including a public key and a private key. The public key is widely distributed and accessible to all users, while the private key remains confidential and known only to the key holder. To decrypt a message using PKI, the recipient utilizes their private key in conjunction with the sender's public key. The sender encrypts the message using the recipient's public key, resulting in an encrypted form that can only be decrypted with the corresponding private key. Upon receiving the encrypted message, the recipient applies their private key to unlock and decrypt the message, restoring it to its original, unencrypted form. The decryption process involves the recipient employing their private key to perform the necessary computations that reverse the encryption algorithm. This enables the recipient to retrieve the original message and access its contents securely. By employing PKI, decryption ensures that only the intended recipient, possessing the private key, can successfully decrypt and access the message, ensuring confidentiality and privacy during the communication process.

Key pairing authentication provides several security advantages. Since the private key remains secret and is never shared, it protects against unauthorized access and tampering of sensitive information. Furthermore, the use of mathematical relationships between the public and private keys ensures that the authenticity and integrity of the transmitted data can be verified.

In the context of the described method, key pairing authentication plays a crucial role in verifying the authenticity and identity of the data contributing party. By matching the public key included in the first message with the corresponding private key held by the authorized party, the system establishes a secure and trusted communication channel. This authentication process ensures that the data attributes are provided by the authorized party and protects against unauthorized access or tampering of the exchanged information.

It should be noted that various algorithms, protocols, and technologies can be employed to implement key pairing authentication, such as the RSA algorithm, Diffie-Hellman key exchange, or Elliptic Curve Cryptography (ECC), and others which are within the spirit and scope of the present disclosure. The specific choice of cryptographic algorithms and key sizes may depend on the security requirements and design considerations of the system. Overall, the PKI facilitates the secure storage, distribution, and management of the public keys, private keys, and digital certificates involved in the authentication process, thereby enabling the system to verify the identity and trustworthiness of the data contributing party to provide a reliable foundation for the subsequent steps in the disclosed data monetization process.

At step 206, the method includes generating at least one first cryptographic proof for each attribute of the plurality of attributes of the first message. This step generally encompasses the use of zero-knowledge verification techniques to provide evidence of the authenticity and integrity of the DID document or first message. In this step, the system applies cryptographic operations to generate one or more cryptographic proofs, each corresponding to an attribute present in the first message. These cryptographic proofs serve as cryptographic evidence that validates the existence and validity of the attributes without disclosing any sensitive or private information, such as PII data.

To achieve this, the system utilizes zero-knowledge verification techniques. Zero-knowledge proofs allow a party to demonstrate knowledge of certain information without revealing the actual information itself. In the context of the method, zero-knowledge verification ensures that the attributes of the first message are valid and accurate, without disclosing the underlying data or any personally identifiable information.

Generally, the zero-knowledge verification process involves computations and cryptographic protocols that enable the generation of the cryptographic proofs. These proofs provide assurance that the attributes have been verified and meet the specified criteria without disclosing the details of the attributes or compromising data privacy. By generating cryptographic proofs for each attribute, the system establishes a strong evidentiary basis for the authenticity and integrity of the first message. These cryptographic proofs serve as verifiable evidence that the attributes of the first message are genuine and have undergone rigorous validation processes.

It should be noted that the specific techniques and algorithms employed for zero-knowledge verification may vary depending on the design choices and security requirements of the system. Common zero-knowledge proof protocols include zk-SNARKs (Zero-Knowledge Succinct Non-Interactive Arguments of Knowledge) and zk-STARKs (Zero-Knowledge Scalable Transparent Arguments of Knowledge), and others which are within the spirit and scope of the present disclosure.

In one embodiment, at least after the authentication of the first message, the method further includes, storing, at step 208, the first message, off-chain, on a connected server and/or database. Storing the first message off-chain means that the message is stored outside the blockchain network or the main decentralized ledger. Instead, the message is stored on a connected server and/or database that is communicably linked to the system.

Storing the first message after it has been authenticated, offers significant improvements over the prior art by not only enhancing scalability and efficiency but also verifying the trustworthiness of the data and data contributing entity. Unlike traditional approaches that store all data directly on the blockchain or a centralized ledger, this method ensures that only authenticated and verified messages are stored off-chain. By authenticating the message before storage, the system establishes a trusted communication channel and verifies the integrity of the data and the trustworthiness of the data contributing entity. This enhances the overall reliability and credibility of the stored information. Furthermore, the off-chain storage of the authenticated message allows for more stringent access controls and encryption mechanisms, providing an added layer of security. Consequently, the method improves upon the prior art by not only addressing scalability and efficiency concerns but also by verifying the trustworthiness of the data and the data contributing entity.

At step 210, the system generates a second message. In one embodiment, the second message is derived from an aggregation of the least one first cryptographic proof for each attribute of the plurality of attributes. To generate the second message, the system combines or aggregates the individual cryptographic proofs associated with each attribute of the first message. The aggregation process ensures that the resulting second message encapsulates the cryptographic evidence of the authenticity and integrity of all the attributes without revealing any sensitive or private information.

In one embodiment, the aggregation of the cryptographic proofs is performed using cryptographic operations that preserve the integrity and security of the proofs. The system may employ mathematical algorithms or cryptographic protocols designed to combine the proofs while maintaining their validity and reliability. The resulting second message serves as a condensed representation or summary of the cryptographic proofs for all the attributes. It provides a comprehensive verification of the attributes' authenticity without the need to disclose the specific details or underlying data associated with each attribute.

Next, at step 212, the second message is recorded on the blockchain network. This step includes sending the second message, over the communications network, to the blockchain network for storage and recordation thereby ensuring its immutability and transparency. In this step, the system establishes a communication channel between the data processing system and the blockchain network. The second message, encapsulating the cryptographic evidence of attribute validations, is transmitted from the data processing system to the blockchain network using the existing communications infrastructure. Once received by the blockchain network, the second message is stored and recorded on the blockchain, which includes a distributed ledger system. The blockchain network ensures the immutability and tamper-proof nature of the recorded information, making it a reliable and trusted source for data storage.

Storing the second message, which includes an aggregate of cryptographic proofs of the attributes of the first message, after authentication, represents a substantial improvement over the prior art, particularly when compared to storing the first message on a blockchain network. By storing the first message off-chain, the sensitive data, which may include PII data, is privately secured, preventing the disclosure of personally identifiable information and thereby enhancing data privacy. However, by recording the second message on the blockchain network, the method achieves public verifiability and transparency. This combination of off-chain storage and on-chain recording improves over the prior art by balancing data privacy and data integrity, providing a solution that ensures the immutability and trustworthiness of the attribute validations while safeguarding sensitive information. Unlike the prior art methods that may expose complete messages on the blockchain, this approach leverages the benefits of decentralized storage and public verifiability, improving the security, privacy, and transparency of the data for incorporating monetization processes.

At step 214, the method includes generating a third message based on the recorded second message. Generally, the third message is a verified credential that encapsulates additional information and cryptographic elements, based on the recorded second message, to enhance the integrity, authenticity, and validity of the recorded data. The third message includes a plurality of second attributes about the recorded second message. The second attributes are additional pieces of information that provide context, metadata, contextual information, or descriptive details about the recorded second message. These attributes serve to enhance the understanding, identification, and interpretation of the recorded information. The specific second attributes may include elements such as timestamps, version numbers, data source identifiers, transaction identifiers, or any other relevant information that aids in the characterization or categorization of the recorded second message. These attributes enrich the overall context of the message, facilitating subsequent analysis, verification, and interpretation of the data.

Furthermore, the third message may include a signature. The signature is a cryptographic element that provides a unique identifier and proof of authenticity for the third message. It is generated using cryptographic algorithms and the private key associated with the entity responsible for generating the third message. The signature ensures that any subsequent modifications or tampering of the third message can be detected. The signature is generated by applying cryptographic algorithms, utilizing the private key associated with an authorized party responsible for generating the third message. The authorized party may be the validator entity associated with the first computing device. In other embodiments, the authorized party may be the data contributing party, or first party, or any authorized party thereof. The signature ensures that any subsequent modifications or tampering of the verified credential can be detected. The authorized party, responsible for generating the third message or verified credential, may set an expiration for the signature, the third message, and/or various attributes thereof based on various factors such as security policies, regulatory requirements, or the nature of the data being represented by the credential.

Additionally, the third message may include an expiration of the signature indicating the duration during which the verified credential is considered valid and reliable. In certain embodiments, the expiration typically does not apply to the entire message but rather to specific components within the verified credential. The expiration duration can be specified within the verified credential itself, typically as an attribute or field that denotes the expiration date or duration of validity. This allows relying parties to assess the currency and reliability of the credential when making authentication or verification decisions. In other embodiments, the expiration is associated with the entirety of the third message and/or the duration or which the signature is valid. Upon expiration of the third message, the third message may need to be revalidated by issuing a subsequent signature and expiration to maintain the integrity and authenticity of the third message.

It is understood that the method disclosed herein may produce at least one verified credential, or alternatively, there may be a plurality of verified credentials within the zero-knowledge set based membership. In certain embodiments, the at least one verified credential is denoted by "1+N" verified credentials, where N represents the number of additional verified credentials. The verified credentials serve as evidence of the authenticity and integrity of the associated data, ensuring trust and credibility in the data exchange process. By employing zero-knowledge set based membership, the method establishes a robust and secure mechanism for verifying the inclusion of the credentials in the accepted set, without disclosing any sensitive information. The presence of verified credentials provides a reliable and verifiable representation of the data attributes, promoting transparency and trust in the overall data ecosystem.

Step 214, generating the verified credential, improves over the prior art, firstly, by providing an additional layer of data privacy and integrity for the stored second message, as sensitive attributes, a signature, and an expiration are encapsulated within the verified credential. This safeguards the data from unauthorized access and tampering, enhancing overall security. Secondly, the verified credential enables controlled access and ensures the ongoing validity and verifiability of the third message. By incorporating an expiration, relying parties, such as the requesting or querying party, can assess the currency and reliability of the credential, promoting accuracy and trust.

It should be noted that the specific techniques, cryptographic algorithms, and protocols employed for generating the verified credential may include various standardized formats, such as verifiable credentials based on W3C standards, or proprietary credential formats, among others, may be utilized to structure and represent the verified credential and are within the spirit and scope of the present disclosure.

It is understood that a plurality of third messages may be generated based on a plurality of underlying first messages and/or complex datasets. Thus, at step 216, the method includes determining zero-knowledge set based membership of at least one third message. Zero-knowledge set based membership refers to the ability to prove the inclusion or membership of a particular item or entity within a set without revealing any additional information about the item or the set itself. It ensures that the prover can demonstrate the membership claim without disclosing any sensitive or private data, other than the fact that the item belongs to the set.

In the context of the disclosed method, zero-knowledge set based membership is employed to validate the inclusion of a third message (a verified credential) within a specific set. The prover, such as the first computing device, generates a cryptographic proof that asserts the credential's membership in the set, without revealing any additional details about the credential or its attributes. This allows the verifier to confirm the membership claim without gaining any knowledge about the specific data or sensitive information associated with the credential.

The zero-knowledge aspect of the proof ensures that the verification process does not disclose any information beyond what is necessary to validate the membership. It preserves the privacy and confidentiality of the data while providing assurance about the credential's legitimacy and inclusion in the desired set. By utilizing zero-knowledge set based membership, the disclosed method enhances the security, privacy, and trustworthiness of the data monetization system. It allows for verifiable and auditable proof of membership without compromising the sensitive information or underlying data, ensuring data privacy and integrity in the process.

The method, at step 216, ultimately determines zero-knowledge set based membership by employing cryptographic protocols and techniques that allow for the verification of the inclusion of a verified credential within a specific set without revealing any sensitive information. This process ensures privacy and confidentiality while enabling the validation of the credential's membership.

To achieve zero-knowledge set based membership, the method utilizes advanced zero-knowledge proof protocols such as zk-SNARKs or zk-STARKs. These protocols enable the prover, in this case, the holder of the verified credential, to generate a proof of membership without disclosing any private details or attributes associated with the credential. The determination of zero-knowledge set based membership involves a series of complex calculations and cryptographic operations. The prover constructs a zero-knowledge proof that demonstrates their verified credential's membership in the desired set. This proof is generated based on the attributes and information contained within the verified credential itself, without revealing any additional data or sensitive details.

The verifier, typically the system or trusted entity seeking to validate the membership claim, can then verify the generated proof without gaining any knowledge about the underlying data or confidential attributes. The verifier can perform the verification process by utilizing the same cryptographic protocols and techniques employed by the prover. In application, the method herein described is understood to be from the perspective of the system as the verifying entity.

Through this process, the method achieves zero-knowledge set based membership, enabling the validation of the verified credential's inclusion in the desired set without compromising the privacy and confidentiality of the underlying data or attributes. This approach ensures that the membership verification can be conducted securely and efficiently, providing confidence in the trustworthiness and validity of the data monetization system.

Next, at step 218, the method includes generating a fourth message comprising a second cryptographic proof of the third message. The fourth message is based on the zero-knowledge set based membership determination such that step 218 leverages the results of the zero-knowledge set based membership determination, enabling the prover to provide an additional cryptographic proof to validate the authenticity and integrity of the verified credential. The additional cryptographic proof establishes a robust cryptographic foundation, protecting against tampering, unauthorized modifications, or false claims, thereby enhancing the overall security and trustworthiness of the data monetization system.

The generation of the fourth message involves applying cryptographic algorithms and techniques to construct a proof that verifies the membership of the third message within the desired set. This second cryptographic proof is derived from the information contained within the third message, ensuring that the prover can demonstrate the credential's validity without disclosing any sensitive or confidential details.

The fourth message serves as an additional layer of verification and validation, reinforcing the trustworthiness and reliability of the verified credential. It provides an irrefutable proof of the credential's legitimacy and membership in the designated set, further enhancing the confidence and assurance for relying parties. It should be noted that the specific cryptographic algorithms, protocols, and techniques employed to generate the second cryptographic proof may be implemented using various cryptographic primitives and methodologies, such as digital signatures, hash functions, or other cryptographic constructs, to construct the second cryptographic proof within the fourth message.

At step 220, the computing device receives, over the communications network from the second computing device associated with the second user and/or requesting party, a fifth message. The fifth message serves as a means for transmitting a request for information from the second user. The fifth message includes a request to query at least one attribute of the first message, which shall be referred to as a desired attribute of the second user. In certain embodiments, the fifth message also includes at least one search parameter and/or a frictional payment. The fifth message allows the second user to define the data requirements and provide additional criteria for the system to return verified data without revealing information that is not solicited.

The query refers to the specific request made by the second user or the requesting party for a desired attribute of the first message. It represents the information needs or criteria that the second user wants to be satisfied in the retrieved data. The query can take various forms depending on the context and the nature of the data being processed. It may involve keywords, search terms, logical operators, filters, or other parameters that define the attributes or conditions to be met by the desired information. The query serves as a means for the second user to communicate their information requirements to the computing device. It guides the data retrieval process and helps in identifying the relevant data or records that match the specified criteria.

In certain embodiments, the query may include at least one search parameter. The at least one search parameter refers to an additional criterion or condition included in the query to further refine the search results. It should be noted that the system at step 226 discussed below, will query a plurality of fourth messages that have undergone zero-knowledge set based membership. Said search parameters provide specific instructions or requirements for the data retrieval process, helping to narrow down the scope and increase the relevance of the retrieved information. The at least one search parameter may include any one of a plurality of data attributes, such as the origin of the data, a specific verified or trusted party, a specific data provider, a geographic parameter, a categorical parameter, a numerical parameter, a Boolean parameter, a data quality parameter, a data quantity parameter, a data age parameter, and other parameters within the spirit and scope of the present disclosure. It is understood that the examples provided above are illustrative and is not an exhaustive list. The system may support various search parameters, tailored to the specific context and requirements of the data retrieval process, and such parameters may be tailored to any message of the method herein disclosed. The inclusion of these search parameters enhances the precision and relevance of the retrieved information from the plurality of fourth messages that have undergone zero-knowledge set based membership, facilitating targeted and efficient data retrieval for the second user.

In certain embodiments, the fifth message may further include a frictional payment. The term "frictional payment" refers to a payment mechanism implemented between the second user or requesting party and the first user or data contributor. This payment mechanism facilitates the exchange of value for accessing or utilizing the desired attribute of the first Message or the data contributed by the first user. The frictional payment is designed to be seamless, transparent, and automated, reducing the friction or obstacles typically associated with traditional payment processes. It ensures that the requesting party provides compensation to the data contributor for the access or use of the desired attribute, creating a fair and value-based exchange. It may involve various payment methods, such as digital currencies, cryptocurrencies, tokens, or other forms of electronic payment. The system may utilize smart contracts on a blockchain network to facilitate and enforce the payment process, ensuring secure and efficient transactions between the involved parties.

Furthermore, it is understood that the fifth message may be transmitted over the communications network using a blockchain network for example. In such an embodiment, the fifth message may include an identifying key for authenticating the second user. The method includes, at step 222, authenticating, with the least one processor, the fifth message by querying a blockchain network having a public key infrastructure. This step ensures the verification and integrity of the received fifth message while also verifying the identity of the data requesting party, further establishing the trustworthiness of the system and operating environment to ensure that the requested data attributes are provided to the correct party to prevent leakage of information. To authenticate the fifth message, the processor(s) initiate key pairing authentication with the PKI in a manner similar to step 204 as discussed above.

Next, in certain embodiments, the method may include, at step 224, determining whether the desired attribute to be queried includes at least one of ML data and/or artificial intelligence (AI) data. This may be based on the contents of the fifth message, and more particularly considering, the query and/or at least one search parameter. During step 224, the system evaluates the nature of the desired attribute specified in the query and assesses whether it pertains to ML data and/or AI data. The analysis takes into account the specific search parameters provided in the fifth message, which define the criteria and conditions for the attribute retrieval process. By examining these parameters, the system determines whether ML data and/or AI data are relevant to fulfilling the query. This determination is crucial for efficiently processing the query and ensuring appropriate handling of the desired attribute. If the determination indicates the involvement of ML data and/or AI data, the system can initiate specific procedures tailored to handling and retrieving such data. This may involve accessing ML models, AI algorithms, or other relevant resources to provide accurate and insightful responses to the query. By identifying whether ML data and/or AI data are integral to the desired attribute, the disclosed method optimizes the query processing and enhances the precision of the response. It enables the system to apply specialized techniques and methodologies, specific to ML and AI, in order to retrieve and present the most relevant and valuable information to the user.

Generally, whether or not the desired attribute includes ML or AI data, the method includes step 226 and step 228. At step 226, the method includes querying at least one fourth message corresponding to the fifth message, and more particularly, to the at least one search parameter. To accomplish this, the system employs a querying mechanism that identifies the fourth messages which have already undergone zero-knowledge set based membership. By leveraging the results of the membership determination, the system can efficiently narrow down the search scope to the specific subset of fourth messages that are pertinent to the query. The querying process involves examining the at least one search parameter provided in the fifth message and comparing it against the attributes and metadata of the fourth messages. By matching the search parameter to the relevant criteria, the system retrieves the corresponding fourth messages that possess the desired attribute or meet the specified conditions.

The system's querying mechanism may utilize various techniques such as indexing, searching algorithms, or database queries to identify and retrieve the relevant fourth messages. This process optimizes the efficiency of data retrieval and reduces the computational burden, allowing for quick and accurate responses to the user's query. By selectively querying the subset of fourth messages that have undergone zero-knowledge set based membership, the system minimizes unnecessary data processing and ensures that only relevant and authorized data is accessed. This approach enhances data privacy and security while facilitating efficient and precise search results within the context of the disclosed method.

At step 228, a list of search results are generated. It is understood that steps 226 and 228 may not be completely independent steps within the disclosed method. Instead, they can be closely interconnected, operating in a sequential or iterative manner to achieve the desired outcome of generating accurate and relevant search results. Step 226 involves querying at least one fourth message corresponding to the fifth message, based on the provided search parameter. This step aims to identify the relevant data or attributes that align with the desired attribute specified in the query. The result of this querying process directly impacts the subsequent step, 228, which involves generating the search results.

In step 228, the system utilizes the information retrieved from the queried fourth messages to generate search results that fulfill the user's query. The relevance, accuracy, and completeness of the search results are highly dependent on the quality and appropriateness of the queried fourth messages. Therefore, the output of step 228 is intricately tied to the input obtained from step 226. The iterative nature of these steps allows for refinement and optimization of the search results. As more relevant data is retrieved and analyzed from the queried fourth messages, the system can iteratively update and enhance the generated search results. This iterative process may involve multiple rounds of querying, filtering, and result generation to achieve the desired outcome.

Overall, during this process, the system analyzes the retrieved fourth messages, which have undergone zero-knowledge set based membership and which are relevant to the specified search parameter. The system extracts the pertinent data or attributes from these messages, considering factors such as relevance, accuracy, and other predetermined criteria. Using various data processing techniques and algorithms, the system organizes and filters the extracted information to generate search results that align with the desired attribute and user's query. This may involve ranking the results based on their significance, applying machine learning algorithms for data classification, or utilizing statistical models to identify patterns and trends within the retrieved data.

The generated search results aim to provide the user with a concise and informative representation of the relevant attributes and data associated with the desired attribute. The system may present the results in a user-friendly format, such as a list, table, or graphical representation, to facilitate easy interpretation and understanding. In certain embodiments, the search results may present themselves in an encrypted or cryptographic format only accessible by an access key and PKI decryption.

If the data generated in the search results contains ML and/or AI data, then the method may further include step 230, which includes verifying the computation of the at least one fourth message generated in the search results. During step 230, the system may apply various verification techniques to assess the validity of the computation performed on the fourth message. This may involve evaluating the algorithms, models, or methodologies used in the computation, as well as examining the inputs, outputs, and intermediate results involved in the data generation process. The verification process may include comparing the computed ML and/or AI data against reference data or established benchmarks to assess its consistency and correctness. Statistical analysis, validation frameworks, or other predetermined criteria can be employed to evaluate the quality and reliability of the generated ML and/or AI data.

By verifying the computation of the fourth message, the disclosed method ensures that the ML and/or AI data derived from it can be trusted and relied upon for subsequent analysis, decision-making, or any other purposes. This step enhances the credibility and integrity of the search results, especially when ML and/or AI data is involved, and facilitates the proper use and interpretation of the generated information.

Next, generally, whether or not the generated search results include ML or AI data, the method includes step 232. At step 232, an attribution weight is calculated based on a model surface definition which provides a plurality of attributes for assessing the at least one fourth message that were generated in the search results. This step aims to determine the relative contribution or significance of the fourth message in relation to the desired attribute or query parameter specified by the user. The model surface definition is a structured framework or specification that defines the factors and considerations taken into account when calculating the attribution weight. For example, the model surface definition may encompasses a range of attributes that are relevant to the evaluation of the fourth message's contribution or significance within the context of the desired attribute or query parameter specified by the user. These attributes may include, but are not limited to, data quality, data relevancy, data accuracy, data freshness, data source credibility, data diversity, and/or any other factors deemed important for assessing the value and relevance of the fourth message.

The model surface definition serves as a guide or template for determining the relative importance or weight assigned to each attribute when calculating the attribution weight. It provides a structured approach to quantifying and evaluating the various aspects of the fourth message, ensuring a systematic and consistent assessment process. The attribution weight, as determined according to the framework established by the model surface definition, plays a crucial role in various aspects of the method, including determining the relevance and prioritization of the search results, as well as potentially influencing the frictional payment associated with accessing the desired attribute.

The attribution weight can be utilized to reflect the importance or value of the fourth message in the context of the user's query. Depending on the specific implementation, the calculated attribution weight may directly impact the ranking or ordering of the search results, with higher weighted fourth messages being considered more relevant or significant. In some embodiments, the attribution weight may also contribute to the determination of the frictional payment required to access the desired attribute. A higher attribution weight may indicate a greater contribution or relevance of the fourth message, potentially warranting a higher payment for access.

Furthermore, in certain embodiments, the calculated attribution weight can be used as a factor to determine if additional payment is required to access the desired attribute. For instance, if the attribution weight falls below a predetermined threshold, it may trigger an additional payment requirement to access the information associated with the fourth message. In other words, the frictional payment provided by the fifth message may be of an insufficient value to access certain data generated in the search results. This ensures that the payment mechanism aligns with the perceived value and relevance of the desired attribute as indicated by the attribution weight.

If the data generated in the search results contains ML and/or AI data, then the method may further include step 234, validating the attribution weight based on a validation model. This step aims to ensure the accuracy, reliability, and integrity of the attribution weight assigned to the fourth message within the context of the search results, particularly when the data generated includes ML and/or artificial intelligence (AI) data.

The validation model is implemented as a second computer-implemented method that runs in parallel with the main method, working in conjunction to ensure the accuracy and reliability of the calculated attribution weight. The validation model includes a series of steps, namely, steps 236 through step 240, that contribute to the validation process. First, at step 236, the validation model includes processing the relevant data (e.g. the generated search results) through various stages, including, but not limited to, injection, ejection, and computation.

In an example embodiment, the injection stage involves the intake and integration of relevant data into the validation model. This stage ensures that the necessary data for verification is properly received and prepared for subsequent processing. It may include tasks such as data retrieval, data transformation, and data normalization, which ensure that the data is in a suitable format for further analysis and computation.

In an example embodiment, the ejection stage involves the extraction and filtering of data based on specific criteria or requirements. The ejection stage ensures that only the pertinent data is retained for further analysis, reducing unnecessary computational overhead and focusing on the most relevant information. The ejection stage may involve data filtering, data selection, or data reduction techniques to streamline the subsequent verification steps.

Furthermore, in an example embodiment, the computation stage performs the necessary calculations and computations required for the verification process. It employs various algorithms, mathematical models, or statistical methods to assess the data and evaluate the validity of the attribution weight. The computation stage may involve complex computations, statistical analyses, or algorithmic processing, depending on the specific requirements of the validation model.

By employing the aforementioned stages, the validation model ensures a comprehensive and systematic approach to data processing and verification. Each stage plays a distinct role in preparing and analyzing the data, filtering out irrelevant information, and performing the necessary computations to evaluate the attribution weight. These stages contribute to the overall robustness and reliability of the validation process, enhancing the accuracy and integrity of the disclosed method.

Additionally, the validation model may include step 238, which includes performing a plurality of verification steps based on calculated parameters and model weights. The plurality of verification steps is a set of distinct actions or procedures performed within the validation model to validate the attribution weight. Said verification steps are designed to ensure the accuracy, integrity, and reliability of the attribution weight calculation. The plurality of verification steps assess the accuracy, integrity, and reliability of the attribution weight calculation against calculated parameters and model weights, which are predefined criteria and standards. While the specific verification steps may vary depending on the implementation and requirements of the validation model, said verification steps generally involve a series of checks, comparisons, and analyses that aim to validate the integrity and correctness of the attribution weight. For example, the plurality of verification steps may include data consistency checks, algorithmic validations, model-based assessments, sensitivity analyses, and quality assurance checks.

By using predefined calculated parameters and model weights, the validation model can objectively assess the attribution weight and verify its adherence to the expected standards and criteria. These elements ensure that the attribution weight calculation is consistent, reliable, and aligned with the defined rules and guidelines of the validation model. Calculated parameters refer to specific values or variables derived from mathematical calculations or data processing. These parameters are determined based on the attributes of the data, the algorithms used, or the specific requirements of the validation model. Calculated parameters can include statistical measures, numerical coefficients, threshold values, or any other quantifiable elements that contribute to the verification process. Additionally, model weights, represent the significance or influence assigned to specific factors within the validation model. These weights are typically determined through training or calibration processes, where the model learns from data and adjusts the importance of different attributes or features. Model weights can reflect the relative importance, impact, or contribution of certain parameters or variables in the attribution weight calculation.

Furthermore, the validation model may include step 240, which includes logging processes for recording and auditing. In this step, the validation model captures and records relevant information about the verification process and outcomes, ensuring a comprehensive audit trail for future analysis and accountability. The logging processes involve systematically documenting the various actions, events, and decisions made within the validation model, including the input data, calculated parameters, model weights, and verification results. The recorded information may include timestamps, unique identifiers, system logs, or any other relevant metadata to facilitate traceability and transparency. By maintaining a detailed log, the validation model enables comprehensive auditing, error detection, and performance evaluation. This logging mechanism enhances the transparency and trustworthiness of the verification process, allowing stakeholders to review and validate the integrity of the attribution weight calculation. Additionally, the recorded information can be used for troubleshooting, compliance purposes, or further analysis to improve the validation model's effectiveness and reliability.

The steps 236 through 240 of the validation model described herein are not limited to the particular order of their disclosure. In certain embodiments, the steps of the validation model may occur concurrently, simultaneously, independently, dependently, or in any other suitable manner, as determined by the specific implementation and requirements. Therefore, the specific arrangement and order of the steps should be interpreted as illustrative rather than limiting, and the disclosure encompasses all variations, modifications, and alternatives falling within the scope of the appended claims.

Referring now to step 242, step 242 includes sending the frictional payment, over the communications network, to the second computing device associated with the first user, or data providing party. The frictional payment represents the agreed-upon value exchange for accessing and utilizing the desired attribute or information. This step ensures that the data providing party is duly compensated for their contribution and enables a fair and transparent revenue distribution model. Furthermore, in certain embodiments, the frictional payment may be sent to a plurality of data providing users or divided between user based on the calculated attribution weights of the search results. The attribution weights, which reflect the relative contribution of each data providing user, are used to allocate the frictional payment proportionally. This enables a more equitable distribution of payments among the participating data providing parties, ensuring that each party is appropriately compensated based on their respective contributions. The allocation of the frictional payment can be determined by a payment calculation module or algorithm that takes into account the attribution weights and the overall value generated by each data providing user. The distribution of the frictional payment also promotes providing higher quality and desirable data or information, which may be associated with higher calculated attribution weights.

At step 244, the method includes generating a sixth message. The sixth message is a cryptographic construct of the plurality of fourth messages that were generated in the search results. A cryptographic construct is a data structure or representation that is designed to provide security and integrity for information or data. It incorporates cryptographic techniques and algorithms to ensure confidentiality, authenticity, and integrity of the data being represented. In context of the disclosed method, the cryptographic construct serves as a presentation of the data or information contained within it. It is a representation that encapsulates the relevant attributes, properties, or proofs of the underlying data in a secure and verifiable manner. The cryptographic construct is designed to present the necessary information to the intended recipients or verifiers while maintaining the privacy and integrity of the data.

Through the use of cryptographic techniques, the construct is generated in a way that allows for verification and validation without revealing sensitive details. It contains cryptographic proofs, cryptographic keys, or other relevant cryptographic components that enable the recipient to verify the authenticity, integrity, and validity of the data without requiring access to the complete underlying information. The cryptographic construct acts as a trusted presentation of the data, enabling the recipient to ascertain the veracity of the information, confirm its membership in the accepted set, or perform other necessary operations without compromising the privacy or security of the data. It allows for secure and efficient verification processes, enabling parties to interact with the data in a trusted manner while preserving the confidentiality and integrity of the information.

In certain embodiments, the sixth message further includes an encrypted access key. The encrypted access key ensures secure and authorized access to the desired attribute and/or the first message. The encryption of the access key utilizes a PKI to authenticate and verify the identity of the requesting party. This authentication process ensures that only the authenticated requesting party can access the information, maintaining the privacy and confidentiality of the data.

Additionally, in other embodiments, the sixth message may include an off-chain storage location for accessing the desired attribute and/or the first message. In certain embodiments, the off-chain storage location in the sixth message can include access links, passwords, and/or instruction to the desired attribute and/or first message stored off of the blockchain network. Such off-chain storage locations may include, for example, cloud storage provider(s) (e.g., Amazon® S3, Google® Cloud Storage), distributed file systems (e.g., IPFS®, Storj®), external databases (e.g., relational, NoSQL), file hosting services (e.g., Dropbox®), or custom storage solutions. These options offer secure and scalable storage environments for securely storing and accessing data off-chain. It is understood that certain underlying off-chain storage means may utilize and/or leverage blockchain technology, however, the underlying data is not publicly recorded on the blockchain and may be stored within a decentralized network. The specific off-chain storage location can be selected based on factors such as scalability, performance, cost, security requirements, and system implementation. Other off-chain storage systems and methods may be implemented and are within the spirit and scope of the present disclosure.

By specifying an off-chain storage location in the sixth message, the intended recipient or authorized parties can access the desired attribute and/or the first message from this designated storage location. This allows for more efficient data management and retrieval while maintaining the necessary privacy and security measures provided by the cryptographic construct and associated authentication mechanisms.

At step 246, the sixth message is sent, over the communications network, to the third computing device associated with the data requesting party. It is understood that the method may further incorporate asymmetric key pairing and utilize a PKI by querying the blockchain network to authenticate the recipient of the sixth message being the sender of the fifth message, or query. Such authentication may be similar to step 204 herein described. The method herein serves to prevent leakage of personally identifiable information and allows the exchange of value for the plurality of attributes without compromising data privacy of the first message. Therefore, the use of numerous verification and authentication steps ensures said data privacy while preserving the provided data and its associated value.

Next, in certain embodiments, the method includes step 248 and step 250, which includes generating a seventh message being a receipt of the transaction of step 246 and then recording said seventh message on the blockchain, respectively. The seventh message serves as a receipt of the transaction conducted in step 246. This step ensures transparency and accountability in the data exchange process while maintaining the privacy of the data presented in the sixth message. The seventh message may contain information pertaining to the transaction, such as the transaction ID, timestamp, payment details, and any other relevant transactional data. Overall, the seventh message acts as a proof of the completed transaction and provides a record that both the data providing party and the requesting party can refer to.

In step 250, the method includes recording the seventh message on the blockchain. This step ensures the immutability, transparency, and verifiability of the transaction record. The seventh message, serving as a receipt of the transaction, is securely stored on the blockchain network, which is a decentralized and tamper-proof ledger system. By recording the seventh message on the blockchain, the transaction record becomes permanently and publicly accessible. It provides a transparent and auditable trail of the data exchange process, allowing all relevant parties to verify the transaction details, including the transaction ID, timestamp, payment information, and any other relevant data. This recording mechanism enhances the trust and integrity of the data exchange process, as the transaction record is securely stored on a decentralized network, eliminating the need for reliance on a central authority. Furthermore, it ensures the long-term preservation and availability of the transaction record, as the blockchain is designed to be resistant to data loss and censorship, and allows for maintaining an auditable trail of the transaction history while safeguarding the privacy and integrity of the data of the underlying transaction.

In step 252, the system implements the handling and processing of frictional payments required for the data transactions identified in the preceding steps. This step may involve generating an invoice that aggregates all access fees from multiple queries, compiling the total payment required based on the value assessed for each data interaction. The frictional payment reflects the economic value of the data accessed, ensuring that data providers are compensated for the utility and access to their data. This process often involves a dynamic pricing model and/or the valuation model using machine learning and artificial intelligence programing and algorithms, where the cost is adjusted according to the valuation model established in earlier steps, which may consider factors such as data rarity, demand, and the specific usage context of the data attributes.

The method may require the data requester to remit payment before accessing the requested data, or it could trigger an automatic payment mechanism upon the completion of the data transaction. Once the required payment is confirmed, the system records the transaction details on the blockchain, including the amount paid, the data or query IDs involved, and the timestamps, further enhancing the traceability and auditability of each interaction. This step ensures that all financial transactions related to data access are transparently and securely logged, providing a verifiable and immutable record that supports non-repudiation and aids in compliance with data monetization regulations. This structured approach not only secures compensation for data providers but also fortifies the data transaction system against potential disputes or discrepancies regarding payment.

Figure 4A:
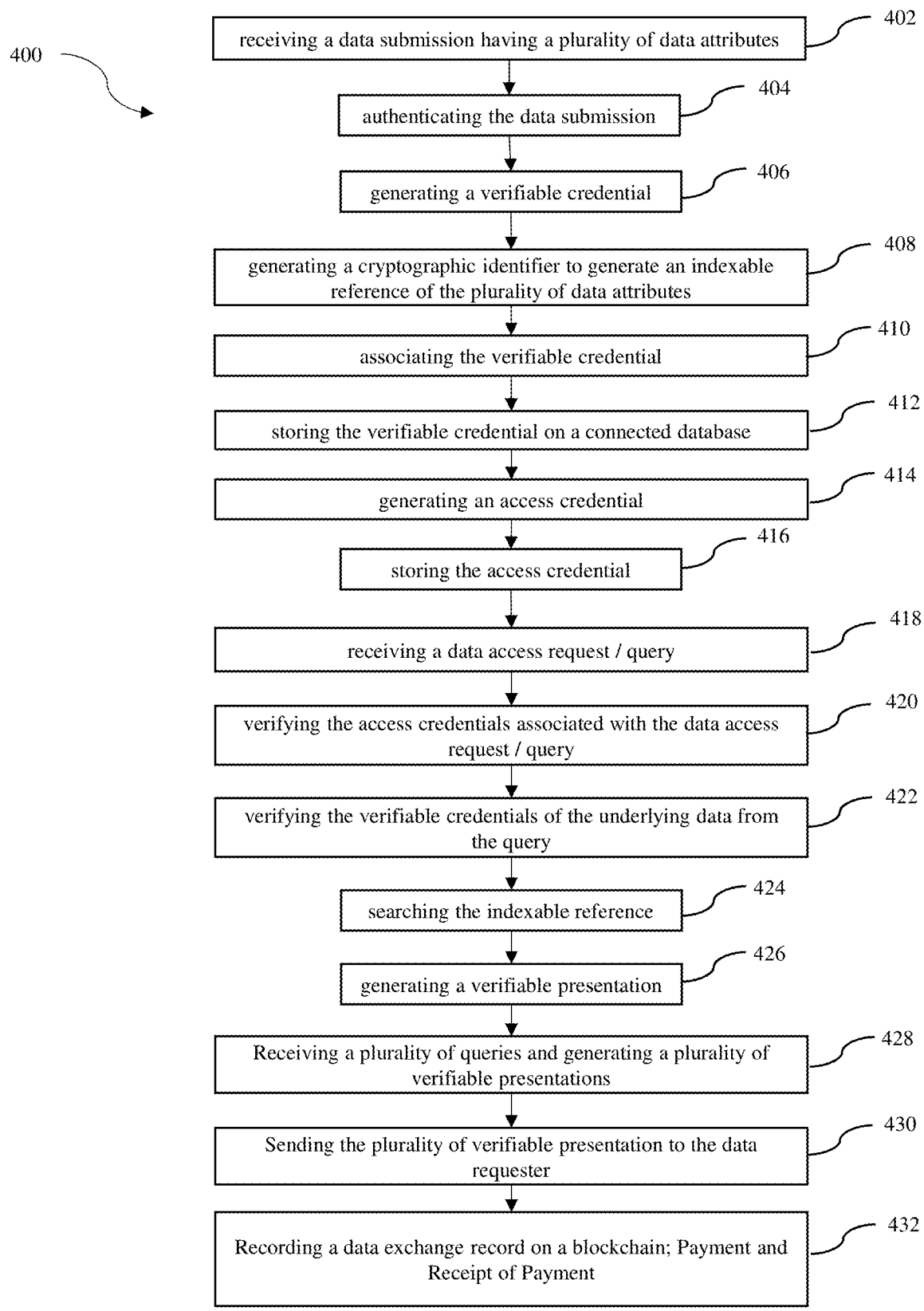
FIG. 4A is a detailed box-diagram of the method for computer-implemented method for managing data transactions and verification in a decentralized network using a blockchain, according to a second example embodiment.
Figure 4B:
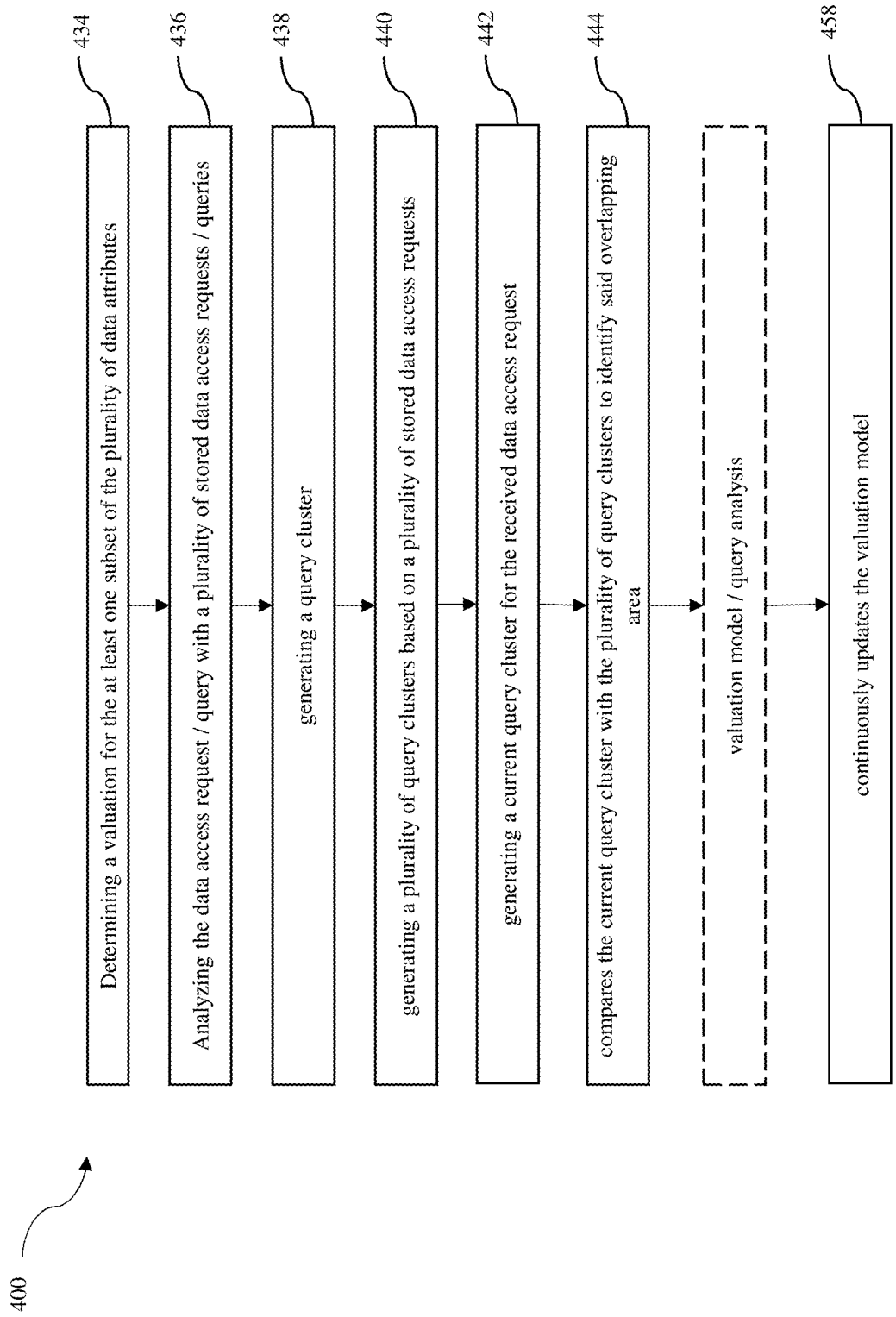
FIG. 4B is a continuation of the detailed box-diagram of the method of FIG. 4A, according to the second example embodiment.
Figure 4C:
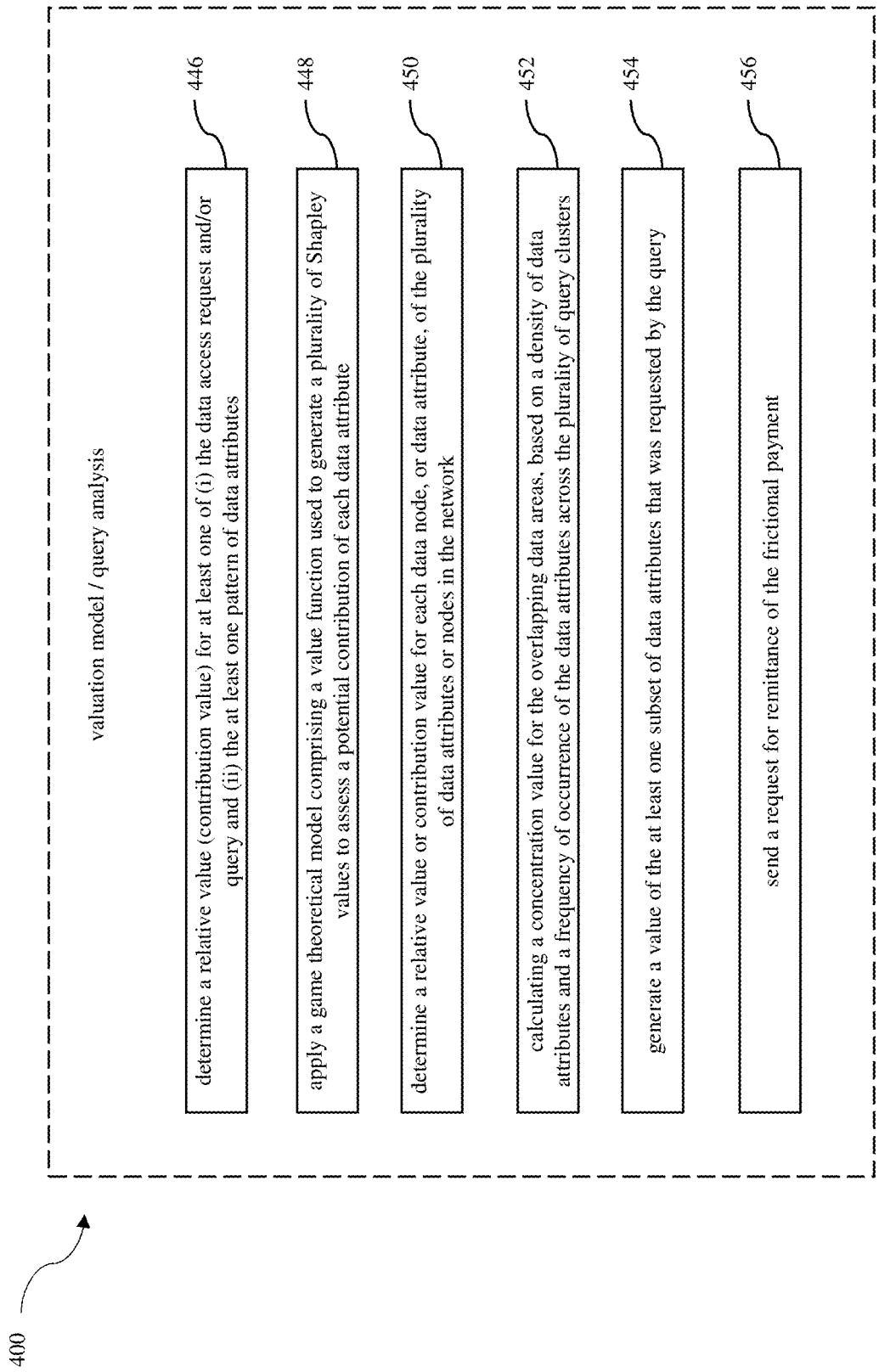
FIG. 4C is a continuation of the detailed box-diagram of the method of FIG. 4A, according to the second example embodiment.

Referring now to FIG. 4A, FIG. 4B, and FIG. 4C, a detailed box-diagram of a second exemplary embodiment of the method, referred to as computer-implemented method 400 for managing data transactions and verification in a decentralized network using a blockchain is shown. This embodiment employs a federated data approach, where the data transactions and verifications are conducted across multiple independent nodes or databases that maintain their own secure stores of data. In a federated data system, each participant retains control over their own data stores. The systems are designed to allow these diverse data sources to be queried, updated, or managed while maintaining data sovereignty. This means that each data source can enforce its own policies on data access, manipulation, and sharing. Each node in this federated system acts as a semi-autonomous entity capable of executing data transactions and participating in the verification process without needing to centralize data.

The method leverages blockchain technology to ensure that each transaction and data interaction across these federated nodes is recorded immutably, maintaining a high level of security and traceability. By integrating cryptographic proofs such as zero-knowledge proofs, the method allows for the verification of data authenticity and integrity without revealing the actual data, adhering to privacy requirements. This approach enables a robust system where data can be dynamically accessed and valued based on its utility and relevance in real-time queries, without compromising on the decentralized ethos of the system.

This federated architecture not only enhances the security and efficiency of the data transaction system but also supports scalability by distributing the data load across multiple nodes. It minimizes bottlenecks and potential points of failure, which are more prevalent in centralized systems. The decentralized yet interconnected nature of this method facilitates a resilient framework for managing and verifying data across different jurisdictions and operational domains, making it highly suitable for applications requiring stringent data security and privacy, such as in financial services, healthcare, and government sectors.

Referring now to the data onboarding steps of method 400, namely, step 402, step 404, and step 406; step 402 initiates the process by receiving a data submission from a second computing device associated with a data provider. This submission is comprised of a plurality of data attributes and a unique digital identifier of the second computing device. The data submission initiates the transaction process within the decentralized network. The data submission comprises a plurality of data attributes, which could include various types of structured, semi-structured, or unstructured data, depending on the application's domain such as financial records, medical records, personal identification information, etc. Additionally, the submission includes a unique digital identifier, which serves as a key attribute in establishing the identity and authenticity of the data provider. The submission is facilitated by leveraging DIDs, which uniquely authenticate the identity and source of the data provider. The use of DIDs at this stage helps establish a trusted connection between the data provider and the network, ensuring that the data submission is directly linked to a verified entity within the decentralized system. DIDs help in setting up a verified digital identity anchored in PKI, ensuring secure and identifiable data exchanges in the network.

Figure 5:
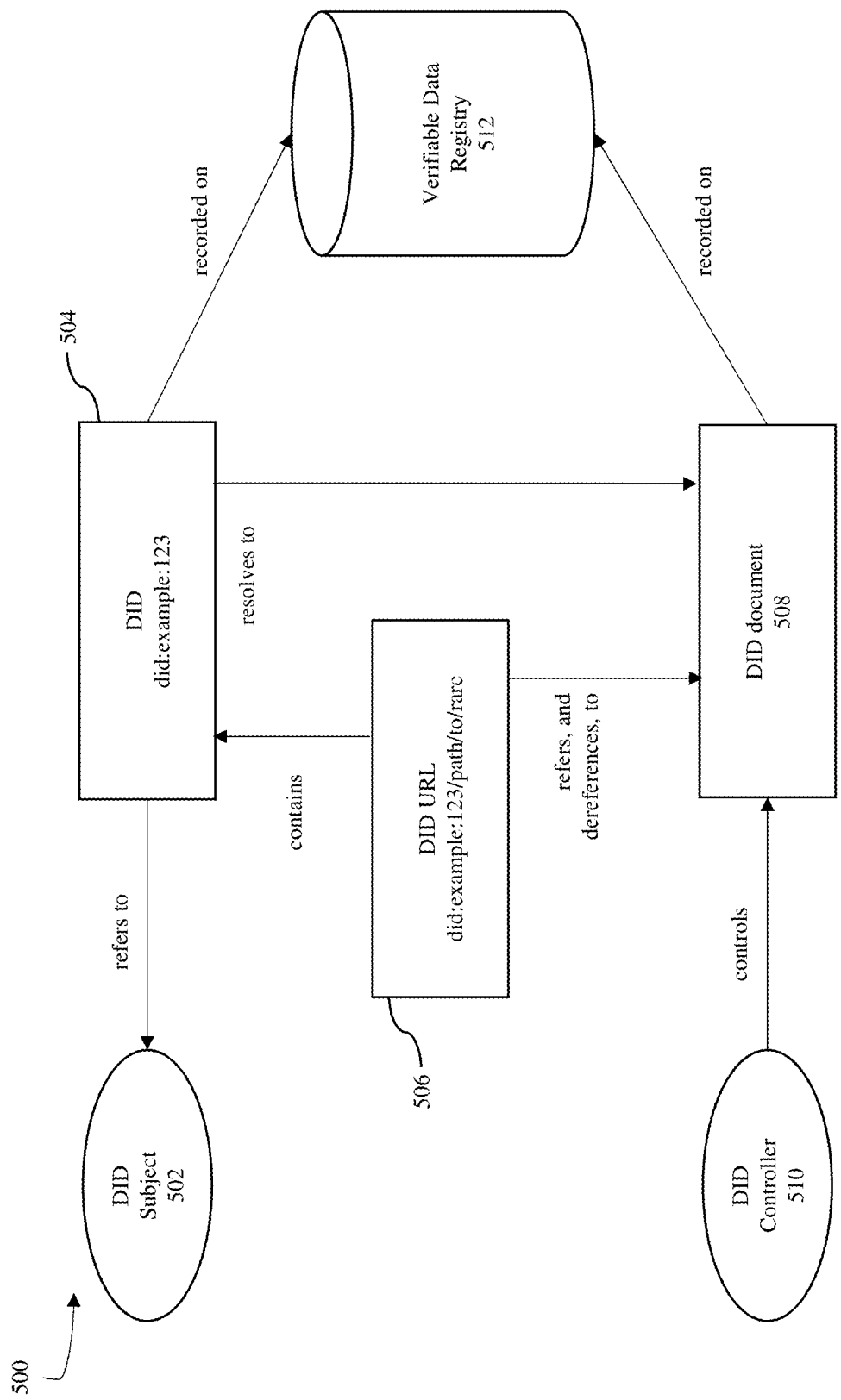
FIG. 5 is a diagram illustrating the components and relationships involved in the DID architecture, according to an example embodiment.

DIDs provide a robust framework for digital identities without relying on centralized registries, allowing entities to verify each other's identities securely. Referring briefly to FIG. 5, a diagram illustrating the components and relationships involved in the DID architecture 500 is shown. This figure represents the flow and interaction between various entities and elements involved in the DID system, showcasing how a DID subject 502, DID 504, DID URL 506, DID document 508, and DID controller 510 interact with the Verifiable Data Registry 512.

The DID subject 502, signifies the entity (e.g., an individual, organization, or device) that the DID pertains to. DID 504 denotes the unique identifier associated with the DID subject, exemplified as "did:example: 123456789abcdefghi". This identifier serves as a reference point for the DID subject. The DID is composed of several distinct parts, each playing a role in ensuring the integrity, security, and functionality of the identifier within a decentralized framework. The scheme specifies the protocol used for the DID, denoted by the prefix "did:" in the identifier. This prefix is a constant that signifies the identifier as a DID. Following the scheme, the DID method is a string that specifies the specific method used to create and manage the DID. In the example "did:example: 123456789abcdefghi", "example" represents the DID method. This method indicates the rules and operations that can be performed with the DID. The final component of the DID is the method-specific identifier, a unique string generated according to the rules defined by the DID method. In the provided example, "123456789abcdefghi" is the method-specific identifier. This segment ensures the uniqueness of the DID within the context of the specified method. Collectively, these components form a DID that is resolvable and interoperable within a decentralized ecosystem. The DID scheme establishes the identifier as part of the DID protocol, the DID method defines the rules and operations, and the method-specific identifier ensures its uniqueness. This structure allows for the creation of secure, verifiable digital identities without reliance on centralized authorities, thus providing a robust framework for decentralized identity management.

A specific URL containing the DID 504 is denoted as DID URL 506 and exemplified as "did:example:123/path/to/rsrc. This URL refers to and dereferences to the DID document, enabling retrieval of detailed information about the DID. The DID document 508, contains essential metadata, including cryptographic material and service endpoints associated with the DID. This document is under the control of the DID controller 510, which holds the authority to manage and update the DID document.

The Verifiable Data Registry 512, as a decentralized storage system where both the DID and DID document are recorded. The arrows in the diagram indicate that the DID resolves to the DID document, both of which are recorded on the Verifiable Data Registry, ensuring secure and verifiable storage.

In summary, the architecture delineated in FIG. 5 demonstrates the secure and decentralized management of digital identities through DIDs, facilitating a trustless system where entities can reliably verify each other's identities. This framework supports the principles of Web3 architecture, emphasizing decentralization, security, and user sovereignty over digital identities. Below is an example of a DID for scp256k1; from User DID (did user.json):

The above example is a technical specification for a DID using the secp256k1 elliptic curve algorithm. This specification includes the following key components, namely, a context, an id, a controller, and a verification method. The context provides the necessary schema and definitions for the DID document. The context value must be present. It may either have the value "https://www.w3.org/ns/did/v1" or be an array with "https://www.w3.org/ns/did/v1" as the first value. The id of a subject may be directly linked to the private key used to sign the DID document. A private key, public key pair must be generated, with the public key hashed using the SHA3-256 hash function. The 32 bytes of output should be encoded with multibase encoding using base64url without padding to determine the id. When only the id is needed without signing, the id will be 32 uniformly random bytes encoded with multibase encoding using base64url without padding.

The alsoKnownAs method is optional and generally should not be used by information providers, but by those certifying information. The controller may share the same id; in this case, the id must be derived from the private key.

The controller is the entity that controls the DID, it may be the same as the id; in this instance, the id must be derived

```
{
  "@context": "https://www.w3.org/ns/did/v1",
  "id": "did:valence:uSFb6NGCtAg4a4PbRLOrFHdKxkmTbVINVMgY1kD4z4eE",
  "controller": "did:valence:uSFb6NGCtAg4a4PbRLOrFHdKxkmTbVINVMgY1kD4z4eE",
  "verificationMethod": [
    {
      "id": "did:valence:uSFb6NGCtAg4a4PbRLOrFHdKxkmTbVINVMgY1kD4z4eE#uSOV6O1cHDJEPGyNY2ma4FKj28SHMH_Pp&tDLUIWBF90A",
      "controller": "did:valence:uSFb6NGCtAg4a4PbRLOrFHdKxkmTbVINVMgY1kD4z4eE",
      "type": "JsonWebKey2020",
      "publicKeyJwk": {
        "crv": "secp256k1",
        "kty": "EC",
        "x": "UTUts@TYQMsqbeq6S2QCqTUXZ6tgkyUIzdMRRpyVNB2Y",
        "y": "ukJ6totD-ITtt)XzrDWZChGYUhXSXtmtUWZI9MO3ENEA",
        "kid": "uSOV6O1cHDJEPGyNY2m4FKj28SHMH_Pp&tDLUIWBF90A"
      }
    },
    {
      "id": "did:valence:uSFb6NGCtAg4a4PbRLOrFHdKxkmTbVINVMgY1kD4z4eE#uQyoSiRvqUIRsnaoZgFss",
      "controller": "did:valence:uSFb6NGCtAg4a4PbRLOrFHdKxkmTbVINVMgY1kD4z4eE",
      "type": "JsonWebKey2020",
      "publicKeyJwk": {
        "crv": "bls12-381",
        "kty": "EC",
        "x": "uulmp6RUD1BALVHLVPnVOUMZAS4q1MNAEeot3hSu-C7QEKxRS1ZN1Z28cDEQgnkxuBuImiSyMVaNe",
        "kid": "ugyoSiRvqUIRsnaoZgFsSrbcom-6ZqciOgiCFMaVaxw"
      }
    }
  ],
  "proof": {
    "type": "DataIntegrityProof",
    "proofPurpose": "did:valence:uSFb6NGCtAg4a4PbRLOrFHdKxkmTbVINVMgY1kD4z4eE",
    "verificationMethod": "did:valence:uSFb6NGCtAg4a4PbRLOrFHdKxkmTbVINVMgY1kD4z4eE#uSOV6O1",
    "created": "2024-01-18T23:25:15Z",
    "proofValue": "u3LRMpbgGqqNAagbvRzFRnkztakglygMTopi-owy3VN3KBTUAyaXi-K2nZAEMgvQozi0q7"
  }
}
``` from a public key. If the controller is not the same as the id, then the controller must be the DID which is derived from a private key.

The verification method lists the public keys and associated metadata used to verify the DID. Each verification method includes (i) an id for the verification method, (ii) a controller indicating the entity controlling the key, (iii) the type of key, in this case specified as JsonWebKey2020, (iv) the public key itself, defined in this example using publicKeyJwk, which includes details such as the curve (crv), key type (kty), and the key coordinates (x and y), and (iv) the key id (kid). The verification method must be included. The x and y coordinates are encoded with multibase encoding using base64url with no padding. The kid is determined by sorting the public key material, hashing it using a hash function, and then encoding the resulting hash with multibase encoding using base64url with no padding.

The proof must also be included, which provides proof of the integrity of the document. The proof includes (i) the type of proof used, in this case DataIntegrityProof, (ii) the purpose of the proof, (iii) the verification method used to generate the proof, (iv) a temporal attribute, or timestamp of the proof, and (v) the proof value, which is a cryptographic signature or hash.

Furthermore, the DID may also include specifications from the DID Datum Specification and the DID Custodian Specification. The DID Datum Specification defines the data attributes, formats, usage context, metadata, and verification methods associated with a particular DID. It ensures that data linked to a DID is well-structured, secure, and easily verifiable. In the context of the described system, the DID Datum Specification facilitates the onboarding process by specifying how data attributes from a provider are formatted and authenticated, ensuring that each data submission is reliable and can be indexed and accessed efficiently within the decentralized network. Below is an example DID Datum Specification:

```
}
    "@context": "https://www.w3.org/ns/did/v1",
    "id": "did:valence:uxe1zcC4e-KLFIIDmcewV0uop5_cSqKt0F59RaIkBA",
    "controller": "did:valence:uWe6S13RqTeMVT-t9CW2-OlfnBcX3ajrZvKsn62p3Jyk",
    "proof": {
       "type": "DataIntegrityProof",
       "proofPurpose": "did:valence:uxe1zcC4e-KLFIIDmcewV0uop5_cSqKt0F59RaIkBA",
       "verificationMethod":           "did:valence:u We6S13RqTeMVT-t9CW2-OlfnBcX3ajrZvKsn62p3Jyk#utJAJQ1",
       "created": "2024-01-30T17:49:08Z",
       "proofValue": "uBxgeJkyy3mLuqA_13i9gst3k2qCP8k1Eg7h7hWd3rVj9fPagyyxntXvAJpNEznfRAYbOBL"
    }
}
```

The DID Custodian Specification outlines the roles, responsibilities, and technical requirements for entities that manage DIDs on behalf of users. This specification includes guidelines on data protection, key management, credential management, and operational procedures to ensure the secure and compliant handling of DIDs and their associated data. Within the system, the DID Custodian Specification ensures that data providers' and requesters' identities and their transactions are securely managed and verified. Custodians follow these guidelines to maintain trust and security in the decentralized network, facilitating reliable data exchanges and enforcing access permissions as specified in the verifiable credentials. Below is an example DID Custodian Specification:

```
{
    "@context": "https://www.w3.org/ns/did/v1",
   "id": "did:valence:uw6es13RqTeMVT-t9CW2-OiFnBcX3ajrZVksn6ZpJ3yk",
   "controller":"did:valence:uw6es13RqTeMVT-t9CW2-OiFnBcX3ajrZVksn6ZpJ3yk",
     "verificationMethod": [
        {
        ""id":"did:valence:uw6es13RqTeMVT-t9CW2
           OiFnBcX3ajrZVksn6ZpJ3yk#utJAJQ1H4GCps-eL0T4Tu
        "controller":"did:valence:uw6es13RqTeMVT-t9CW2-OiFnBcX3ajrZVksn6ZpJ3yk",
        "type": "JsonWebKey2020",
        "publicKeyJwk": {
           "crv":"secp256k1",
           "kty":"EC",
           "x":"uTUts0TYQMsqb0q652QCqTUXZ6tgKyUIzdMRRpyVNB2Y",
           "y":"uKj6totD-IIttJXzrDwZChGYuhX9XtmtUwZi9MQ3tNtA",
           "kid":"utJAJQ1H4GCps-eL0T4TuRGArT-9syUMvcEhavmgHZRY"
        }
     },
     {
        "id":"did:valence:uw6es13RqTeMVT-t9CW2-
           OiFnBcX3ajrZVksn6ZpJ3yk#usTNwy2JR0KiD5UGwz3Hx
```

```
        "controller":"did:valence:uw6es13RqTeMVT-t9CW2-OiFnBcX3ajrZVksn6ZpJ3yk",
        "type": "JsonWebKey2020",
"publicKeyJwk":{
        "crv": "bls12-381",
        "kty":"EC",
        "x":"uuMmp6RUD1BAtVhLVPnVOUmZA84q1wW4Eeot3h5u-
            C7QEKxRsIZNIZ28cDEQqnkxuBuImi5yMYaNm
        "kid":"usTNwy2JR0KiD5UGwz3Hx0rVbm6iLz5aYFFhXoLe6tcg"
        }
    }
],
"proof": {
    "type": "DataIntegrityProof",
        "proofPurpose":"did:valence:uw6es13RqTeMVT-t9CW2-OiFnBcX3ajrZVksn6ZpJ3yk",
        "verificationMethod":"did:valence:uw6es13RqTeMVT-t9CW2-
            OiFnBcX3ajrZVksn6ZpJ3yk#utJAJQ1
    "created": "2024-01-30T17:48:54Z",
    "proofValue":"uHhqi12mtkTXcgEleYagg3AsiE8CQfeDqAqJS55RZ140TX13ACbyh2uO3P9f
Ofw8FkwResJ5
    }
}
```

The subsequent step, step 404, involves authenticating the received data submission by querying the blockchain to verify the cryptographic signature associated with the unique DID. This signature verification utilizes the Public Key Infrastructure (PKI), where the blockchain acts as an immutable ledger that provides the necessary infrastructure to validate public keys and the corresponding cryptographic signatures. This authentication confirms that the data has not been altered and maintains its integrity from the point of origin to its entry into the blockchain system.

In this process, the method employs advanced cryptographic algorithms specified for digital signatures, such as EdDSA (Edwards-curve Digital Signature Algorithm) as outlined in RFC 8032, focusing on the PureEdDSA version for its robustness and security advantages. The use of EdDSA is preferred for its efficiency and security in environments where high-speed and secure verification of signatures is important. Additionally, ECDSA (Elliptic Curve Digital Signature Algorithm) and BBS signatures may also be used depending on system requirements and security protocols.

The authentication process involves the verification of the DID document, which must be signed using the allowed algorithms-EdDSA, ECDSA, or BBS. This step ensures that only data submissions with properly signed DIDs, confirming the identity and authority of the data provider, are accepted and processed. This verification contributes to preventing the submission of fraudulent or altered data, thereby safeguarding the integrity of data transactions within the decentralized network.

Moreover, the blockchain's role in this PKI system extends beyond mere storage of data it also provides a transparent, auditable trail of all transactions and operations. By embedding these cryptographic operations within the blockchain, the system enhances trust and security, enabling participants to verify the authenticity of data submissions independently without relying on central authorities. This decentralized verification mechanism is fundamental to the operation of trustless systems in Web3 architectures, where data security and privacy are paramount.

For authentication and verification, the DID must the DID document must be signed using one of the aforementioned signature methods. This ensures that the DID document adheres to rigorous security standards and provides proof of authenticity, which is crucial for maintaining the integrity and trustworthiness of data within the blockchain.

Following the successful authentication of the data submission in step 404, the method progresses to step 406, where a verifiable credential is generated for the data submission. This verifiable credential encapsulates the plurality of data attributes, a unique digital identifier, and a set of access permissions, all anchored by a first cryptographic proof. Verifiable Credentials enable the sharing of specific data attributes securely, without disclosing unnecessary personal information, leveraging cryptographic methods for privacy and verifiability. A verifiable credential is a digital form of certification or claim that links the holder to certain attributes or qualifications verified by an issuer. It is a crucial component of decentralized identity systems, particularly within the frameworks that use blockchain and related technologies. A verifiable credential can be understood as a set of assertions or claims about an individual, entity, or object, which an authoritative party (issuer) attests to and digitally signs. These credentials are designed to be tamper-evident and verifiable by anyone who needs to validate the claim's authenticity and integrity without needing to contact the issuer directly every time. In the context of the disclosed method related to managing data transactions and verification in a decentralized network using blockchain, the verifiable credential is utilized to represent and secure data attributes associated with a DID. These credentials incorporate information specific to the data provider or the subject of the credential, such as age, membership, access rights, or other personal or non-personal data.

This proof is crafted using ZPK techniques, which allow the verification of the integrity of each data attribute without exposing the underlying data itself. Zero Knowledge Proofs allow for the verification of data or credentials without exposing the data itself, ensuring privacy and security during the data verification process. These are used to generate trust in the veracity of the information contained within the credential without revealing the underlying data. Zero-knowledge proofs, for instance, enable one party to prove to another that a given statement is true, without conveying any additional information apart from the fact that the statement is indeed true. Fine-grained permissions ensure detailed control over data sharing, specifying what data is shared, with whom, and under what conditions, thus safeguarding against unauthorized access and misuse. They define the rules under which the data can be accessed, ensuring that data sharing and usage adhere to predetermined privacy standards and permissions set by the data owner. This approach not only enhances privacy but also ensures the veracity of the data without compromising sensitive information.

The verifiable credential includes the data attributes submitted by the data provider, which are crucial for the subsequent data transactions and access control processes within the network. Each attribute within the credential is paired with a cryptographic identifier, which serves as an indexable reference in the connected database, enabling efficient query and retrieval operations. The unique digital identifier, typically tied to the DID of the data provider, ensures that each credential can be distinctly traced back to its origin, supporting accountability and non-repudiation.

Additionally, the credential incorporates a plurality of access permissions, which define the conditions under which the data can be accessed or shared within the network. These permissions contributes to enforcing data governance policies and in maintaining control over data distribution, thus furthering the data owner's ability to manage their data securely in a decentralized environment.

The generation of this verifiable credential is important as it transforms raw data submissions into trusted assets within the blockchain ecosystem. By embedding these credentials with zero-knowledge proofs, the system not only upholds the privacy of the data provider by concealing their personal or sensitive information but also facilitates a trustless verification process where the validity of data can be ascertained without revealing the actual data. This mechanism is particularly advantageous in scenarios where data sensitivity is paramount, such as in healthcare or financial services, providing a secure method to handle and exchange data while adhering to stringent privacy standards.

A verifiable credential seeks to give the same (or better) security of physical documents within the digital world. The use of verifiable credentials improves over the prior art because resulting information from a query is not required to reveal the entire contents of a credential. For example, ff the question asked is, "Are you over 21?", then, the answer is yes or no (with proof). Generally, one example of proving that someone is over the age of 21 would be showing a valid driver's license; however, this reveals more PII than is strictly required. This is where the use of verifiable credentials is employed to facilitate the query process and generation of verifiable presentations later described herein. The verifiable presentation will selectively reveal information from a verifiable credential in a verifiable manner.

The Verifiable Credential Specification elaborates on a sophisticated data model for credentials that are verifiable and can be presented selectively, based on the W3C Verifiable Credentials Data Model. This framework enhances digital interactions by bringing the security standards of physical documents into the digital realm. Verifiable credentials are designed to confirm identities or qualifications without necessarily disclosing additional details beyond what is required, thereby enhancing privacy.

A verifiable credential comprises several components. The "context" field is a mandatory component that must be structured as an ordered list. The initial entry in this list must be the URI https://www.w3.org/ns/credentials/v2. Additionally, it is recommended to incorporate a specific reference detailing the implementation procedures, which may enhance the comprehensiveness and utility of the documentation. The "type" field is a requisite unordered set that must include the entry "VerifiableCredential". Moreover, it is necessary to incorporate a subtype within this set, an example of which is "UniversityDegreeCredential". This requirement ensures the categorization and specification of the credential type, providing clarity and precision in the credentialing framework.

Key attributes are encapsulated within a credentialSubject of the verifiable credential. Each attribute within this subject is stored as a key-value pair where the value itself may be a simple string, a nested map, or a hashlink pointing to external data. This method of data reference using hashlinks helps in maintaining a lean credential structure by not embedding large data directly within the credential but rather referencing it securely. Within the structure of the verifiable credential, the individual data attributes are typically encapsulated within the credentialSubject component. This field is a fundamental element of the verifiable credential where the actual data pertaining to the credential's subject is stored. It consists of key-value pairs where each key represents an attribute name, and the value provides the data for that attribute. The structure allows for flexible representation of any information about the subject that the issuer of the credential wishes to certify. Each attribute in the credentialSubject can further detail the nature of the data it holds by specifying type and data properties. The type describes the kind of data (e.g., "string", "map", "hashlink"), while data contains the actual data value or a reference to it. A hashlink is a type of link that not only references data, like a URL, but also includes a cryptographic hash of the data it points to. This mechanism ensures the integrity of the data being pointed to, because anyone using the hashlink can independently verify that the data has not been altered since the hash was created. In the context of verifiable credentials, hashlinks are used to reference external data or documents that are related to the credential but not directly stored within it. For example, if a verifiable credential contains information that is too large or not practical to embed directly (like a detailed educational transcript or extensive medical records), a hashlink can point to this external data. The hash part of the hashlink ensures that any data retrieved still matches the data as it was when the hashlink was created, thereby maintaining data integrity and trust.

The next field of the verifiable credential is the "issuer" field. This field is important as it specifies the authority or entity that issues the credential. It is mandatory for each credential, ensuring accountability and traceability. The 'issuer' must be a URL and should be a verified URL, which enhances the security and authenticity of the credential by linking it directly to a recognized and verifiable web presence. The issuer of the verifiable credential is identified through the URL, preferably a Verified DID, ensuring the credential's origin is authenticated and traceable. Optionally, a source field can be included to categorize the credential under various domains or purposes, like different types of quality assurances in a manufacturing context.

The "subjectID" is a field that identifies the subject of the credential, which could be an individual or an entity. The 'subjectID' must be either a single URL or an array of URLs, ensuring that the credential is accurately linked to a verifiable digital identity or entities. This strengthens the framework for identity verification within the system.

To ensure temporal relevance, each VC contains validFrom and validUntil dates, defining the active period of the credential. Importantly, the credential includes a cryptographic proof, typically a BBS signature, ensuring its authenticity and integrity. This proof contributes to verifying that the verifiable credential has not been tampered with from the time of its issuance.

For permissions management, the specification allows for either Document-Level Permissions, which restrict the viewing of the credential based on issuer-defined access levels, or Fine-Grain Permissions, which provide detailed access control down to the attribute level, potentially using hashlinked documents for defining complex permission structures.

Regarding the "proof", to be a valid verifiable credential, the proof must incorporate a BBS signature. Additionally, the proof must list the total number of attributes, including any that are empty, as defined by the BBS signature requirements. BBS signatures are a type of zero-knowledge proof, allowing a prover to demonstrate knowledge of a signature without revealing it in full. This facilitates the selective disclosure of certain attributes of a message while keeping others hidden, thereby preserving the privacy of the signer's information. They are based on the mathematical foundations of bilinear pairings on elliptic curves, which enable the construction of such proofs. BBS signatures are utilized to enhance the security and privacy of verifiable credentials. These signatures allow for the encoding of multiple claims (or attributes) into a single signature. Importantly, they enable the presentation of these credentials in a manner where verifiers can authenticate specific attributes without requiring the disclosure of the entire credential. This capability is essential for applications where users need to prove certain aspects of their identities or qualifications without revealing excess personal information. The implementation of BBS signatures supports the integrity and non-repudiation of the signed data while allowing the credential holder to control how much information is shared with verifiers, aligning with the principles of minimal disclosure for privacy preservation.

Furthermore, these signatures allow for the selective disclosure of attributes within the credential, facilitating the creation of Verifiable Presentations that reveal only the necessary information while maintaining the integrity of the hidden data. BBS signatures, being a form of zero-knowledge proof, enable this functionality by allowing the prover to demonstrate knowledge of the signature without revealing it entirely. This method not only enhances security by minimizing exposure but also maintains the compactness of credentials by not requiring all data to be exposed or transmitted.

The application of BBS signatures within verifiable credentials is meticulously structured. To create a BBS signature, the issuer first compiles all requisite attribute data into a format suitable for signing. This compilation involves organizing each attribute into a sequence that aligns with the defined order in the credentialSubject. Each attribute, whether it be a simple string or a complex data structure, is hashed to produce a uniform representation that is then fed into the signature algorithm. This ensures that every piece of the credential, regardless of its original format, contributes to the final signature in a consistent and secure manner.

The BBS signature algorithm operates by generating a unique signature that encompasses all attributes collectively. The signature itself does not expose individual attribute values but confirms their collective authenticity and integrity. When a verifiable credential is presented, the verifier can check the signature against the disclosed attributes and the public key of the issuer, confirming the validity of the presented attributes without needing to see the entire set. This approach not only protects sensitive information but also streamlines the verification process.

Furthermore, the structure of the verifiable credential incorporates robust mechanisms for permissions and identity verification. The use of a Verified DID as part of the issuer URL ensures that the source of the verifiable credential can be authenticated and trusted. The permissions associated with the verifiable credential, whether they are Document-Level or Fine-Grain, are defined through a clear and enforceable framework that governs who can access what data under which conditions. This level of control is critical in environments where data sensitivity is high, and regulatory compliance is mandatory.

The verifiable credential may also include document permissions. Permissions may be included in a verifiable credential. If present, permissions must adhere strictly to either Document-Level Permissions or Fine-Grain Permissions, with no alternatives allowed. Adjustments to permissions require the credential to be revoked and then reissued. Document level permissions must include a map with key-value pairs where the key is "permissions-dlp" and the values define who can view the credential. Each entry in this map should have two key-value pairs: one specifying the 'issuer' as a Verified DID in URI format, and another defining the 'access-level' as a string. Fine-grain permissions are more detailed and include a map where the key is "permissions-fgp." The values must include a hashlink to a document detailing the Fine-Grain Permissions and a 'version' string indicating the document version, with specifications for "simple" and "full" versions detailed further in the text.

The fine-grain permissions document is presented as a JSON map, where the primary elements are selected from a predefined list in the 'boilerplate' section. The document specifies key-value pairs for 'access-level' and 'issuer'. Access Credentials, required to access the attribute, must be clearly defined. Additionally, a 'boilerplate-salt' is required, consisting of 32 cryptographically secure random bytes encoded with multibase encoding, specifically using base64url encoding. This encoding method is detailed with specific reference URLs for guidance on implementation. Every access level defined in the 'boilerplate' must be met for any attribute to be accessed; these conditions apply to each specific attribute within the credential.

The full version is similar to the simple version, but the structure is more complex, featuring lists within the 'boilerplate' section to specify layers of access control. This version still uses key-value pairs for 'access-level' and 'issuer', but arranges them into multiple lists which detail more granular access requirements. These lists detail acceptable access levels that must be satisfied logically (either through OR or AND conditions) to access the specified attributes. The 'boilerplate-salt' requirement remains the same as in the simple version.

The introduction of a unique verifiable credential identifier, generated from the cryptographic proof, offers a robust method to uniquely identify each credential, enhancing the tracking and management of credentials across systems. In sum, the verifiable credential Specification not only sets the standard for creating digital credentials that are secure, privacy-respecting, and selectively disclosable but also integrates advanced cryptographic techniques to ensure these credentials are verifiable and tamper-evident across their lifecycle. Below is an example of the verifiable credential using BBS signatures.

The unique identifier is essential for tracking and managing the lifecycle of the credential efficiently. The identifier is generated by hashing the proof value of the verifiable credential, a process that ensures each credential can be individually identified without revealing the entirety of its content. The proof value itself is derived from the contents of the verifiable credential and the private key of the issuer, employing either BBS signatures or Merkle trees. Specifically, when BBS signatures are used, the proof involves a signature of 80 bytes, whereas Merkle tree-based signatures result in a 64-byte signature. By applying a SHA-256 hash function, which outputs a 32-byte (256-bit) value, the identifier for the verifiable credential is compacted to 32 bytes, ensuring a robust yet efficient form of identification.

To generate a BBS signature, which is integral to the proof mechanism of the verifiable credential, a specific protocol is followed. Initially, the boilerplate material of the verifiable credential, excluding the credentialSubject to avoid redundancy in proof, is compiled. This initial message, along with each subsequent attribute of the credentialSubject, is signed in lexicographical order. The number of messages signed is carefully controlled to be a multiple of four and no fewer than eight to enhance privacy and obscure the exact number of attributes within the verifiable credential. This methodology is crucial in maintaining the confidentiality of the attributes not disclosed explicitly.

For the computation of BBS signatures, specific generators are required within the cryptographic group structure. These generators, denoted as $g_1, h_1, \ldots, h_n \in G_1$ and $g_2 \in G_2$, are defined using a hash-to-curve function, ensuring that each attribute within the verifiable credential is associated with a unique generator, thereby securing the integrity of the cryptographic proof.

The algorithm proceeds by applying a hash-to-finite-field function, $H_{\mathbb{Z}_p}$, which maps binary strings to the finite field defined by the order p of the group. For each attribute or message $M_i$, this function computes $m_i = H_{\mathbb{Z}_p}(M_i)$, transforming the message into a field element suitable for inclusion in the cryptographic operations of the BBS signature. This step is crucial as it allows for the secure and verifiable embedding of the attribute data within the cryptographic framework provided by the BBS signature scheme. In essence, this algorithm not only ensures that each attribute of the verifiable credential is authenticated individually but also enhances the overall security of the credential by embedding these attributes within a cryptographic framework that supports confidentiality, integrity, and non-repudiation. This advanced cryptographic provides a robust foundation for the secure management and verification of digital credentials in decentralized architectures.

Below is an example verifiable credential using BBS signatures:

```
{
  {
    "@context": [
      "https://www.w3.org/ns/credentials/v2"
    ],
    "type": [
      "VerifiableCredential",
      "UniversityDegreeCredential"
    ],
    "issuer": "did:valence:_UXmpo0fHuLaICEtEY6RN8U18EmuDZi_0sEQXwMLiaA",
    "validFrom": "2019-06-14T00:00:00Z",
    "subjectID": "did:valence:_u4F1_tSpEHt7R2Ns -- x1Z_o1CVeytQJ3wvkEkRPriQ",
    "credentialSubject": {
      "attribute-0": {
        "type": "string",
        "data": "really long attribute"
      },
      "attribute-1": {
        "type": "string",
        "data": "really long attribute"
      },
      "attribute-2": {
        "type": "string",
        "data": "really long attribute"
      },
      "attribute-3": {
        "type": "string",
        "data": "really long attribute"
      },
      "attribute-4": {
        "type": "string",
        "data": "really long attribute"
      },
      "attribute-5": {
        "type": "string",
        "data": "really long attribute"
      },
      "attribute-6": {
        "type": "string",
        "data": "really long attribute"
      },
      "attribute-7": {
        "type": "string",
        "data": "really long attribute"
      },
      "attribute-8": {
        "type": "string",
        "data": "really long attribute"
      }
```

```
        "attribute-9": {
            "type": "string",
            "data": "really long attribute"
        },
        "attribute-10": {
            "type": "string",
            "data": "really long attribute"
        },
        "attribute-11": {
            "type": "string",
            "data": "really long attribute"
        },
        "attribute-12": {
            "type": "string",
            "data": "really long attribute"
        },
        "attribute-13": {
            "type": "string",
            "data": "really long attribute"
        },
        "attribute-14": {
            "type": "string",
            "data": "really long attribute"
        },
        "attribute-15": {
            "type": "string",
            "data": "really long attribute"
        },
        "attribute-16": {
            "type": "string",
            "data": "really long attribute"
        }
    }
    "proof": {
        "type": "DataIntegrityProof",
        "verificationMethod": "did:valence:u5Fb8N6CtAg4a4PbRL0rFHdKxkmTbVINVMgYlkD4z4eE#uQyo5iR",
        "created": "2024-01-19T15:50:26Z",
        "proofValue": "ulMr7bQo5OTelDFl5Usg1vZjNZNeSy9tkvlsilKiGE-JsfY0e_Volg2sXYSNPZwWKafuP0FT",
        "totalAttributes": 16
    }
}
```

Following the establishment of a verifiable credential, step 408 initiates the generation of a cryptographic identifier for each attribute within the data submission. This cryptographic identifier is a unique, hash-based token that serves to create an indexable reference for the plurality of data attributes. This hashing process converts variable-length strings of data into fixed-length, unique hash values that act as cryptographic identifiers. Employing hash functions, such as SHA-256, each data attribute is converted into a cryptographic hash, ensuring a consistent and secure representation that supports quick lookup and comparison operations. For example, an attribute detailing "expiration date" might be transformed into a hash like 1a2b3c4d . . . , creating a distinct and tamper-evident identifier that uniquely tags this specific piece of data in the system. For instance, also consider an attribute such as "production date" with a value "2024-05-01." This attribute is processed through the hash function to produce a cryptographic hash like 3e23e8160039594a33894f6564e1b134. This hash serves not only as a unique identifier for the "production date" but also enhances the security of the data by obscuring the original attribute value in its hashed form, thereby preventing unauthorized access and ensuring data integrity.

The use of cryptographic hashes as identifiers is essential for creating an indexable reference framework within the database. These identifiers allow for efficient querying and retrieval of data attributes, facilitating rapid access and manipulation in various operations, such as data verification, updates, or audits. Traditional systems often rely on sequential searches or less efficient indexing mechanisms, which can slow down data retrieval as data volumes grow. The use of cryptographic identifiers as indexable references in a blockchain environment allows for immediate access to data attributes based on their unique keys, bypassing the need for exhaustive searches across unsorted or poorly indexed data.

Moreover, the immutable nature of cryptographic hashes ensures that once data is encoded, it cannot be reversed or altered without detection, thus providing a trustworthy foundation for data transactions and interactions within the decentralized network. By using cryptographic techniques to generate identifiers, the system ensures that each identifier is both unique and secure, reducing the risk of collision (where two different entries share the same identifier) and unauthorized data manipulation. This is a significant step up from traditional methods, where identifiers might be predictable or not securely tied to the data they represent. By using blockchain technology to manage the indexable references, the integrity of the data can be verified independently by any participant in the network, enhancing trust and transparency.

Furthermore, with the creation of indexable references, the system can scale more effectively. As the blockchain grows, the efficiency of accessing and managing data does not degrade because each piece of data is directly accessible through its cryptographic identifier. This ensures that the system remains robust and responsive, even as the amount of managed data increases significantly.

In step 410, the method continues by associating the newly generated verifiable credential with the unique identifier of the second computing device, which originated the data submission. The unique second computing device identifier typically acts as a distinct digital fingerprint for each device within the network. This identifier could be derived from several hardware or software-based characteristics of the device, such as MAC addresses, serial numbers, or a cryptographic hash of various system properties. By associating each verifiable credential with this unique identifier, the system ensures that the credential can only be accessed by the specific device it was intended for, thereby preventing unauthorized access and use. This association ensures that the credential is explicitly linked to the correct data provider within the network, maintaining the integrity of the transactional process. Following this association, the verifiable credential is transmitted back to the second computing device. The integration of the unique computing device identifier in this process enhances security by ensuring that credentials are only usable by their intended device, thus preventing unauthorized access. Moreover, it supports precise tracking and management of credentials across the network, facilitating detailed audit trails and compliance with regulatory requirements. This transmission not only confirms the successful processing and verification of the data but also empowers the data provider with a certified record of their data submission, encapsulated within the verifiable credential. Associating the verifiable credential and/or access credential with its respective party and/or computing device as described herein may further include creating a record for said party and/or computing device and storing said record on the connected database. The unique identifier and respective credentials may be associated with said records by storing them in the respective records.

In step 412, the method concludes this segment of the process by storing the verifiable credential in a connected database. This database may reside within a blockchain network or any suitable decentralized or centralized storage system that supports the integrity and accessibility of the stored data. The storage of the verifiable credential ensures that it is preserved in a secure and accessible manner, enabling future verification and retrieval. This step is crucial for maintaining a persistent record of the credential, which is essential for subsequent transactions, access control, and auditability within the system. Through these methodical steps, the system enhances the management and verification of data transactions within a decentralized network, leveraging cryptographic techniques to ensure data integrity and security.

Next, in step 414, an access credential is generated that authorizes a third computing device, belonging to a data requester, to access specific subsets of data attributes of the plurality of data attributes of the verifiable credential, contingent upon the fulfillment of predefined access permissions. Access permissions embedded within verifiable credentials delineate specific conditions and restrictions regarding the access and utilization of data encapsulated by the credentials. These permissions are integral to ensuring data security and maintaining privacy, particularly in contexts where sensitive information is involved. They define the scope of actions permissible by different stakeholders, based on predetermined criteria such as role, time frame, or additional authentication requirements.

For example, access permissions can be configured to allow only read-only access, ensuring that the data can be viewed but not altered. This is particularly useful in scenarios such as clinical research where integrity of the data is paramount. Another common application involves time-bound access, which restricts data accessibility to a specific duration, useful for temporary staff or contractors who require access for a limited period. Conditional access permissions might require the fulfillment of certain criteria before access is granted, such as passing a security clearance or possessing a particular secondary credential. Role-based access control (RBAC) is also widely implemented, allowing permissions to be automatically adjusted based on the user's role within an organization, thereby simplifying the management of access rights and enhancing security by minimizing unnecessary data exposure. These structured permissions frameworks significantly improve over traditional methods by providing more dynamic, flexible, and secure mechanisms for data management, particularly in decentralized environments where data integrity and privacy are critical.

This step 414 is crucial for managing and controlling access to sensitive data within a decentralized network. The access credential generated includes a unique identifier for the third computing via the computing device and a temporal attribute, which restricts the duration of access. The unique identifier ensures that the credential is uniquely linked to a specific device, enhancing security by preventing unauthorized devices from accessing the data. The temporal attribute further enhances the system's security by limiting the duration of access, thereby minimizing potential exposure to unauthorized access over time. The generation of an access credential incorporates not only standard verification methods but also adheres to specific operational and structural standards to enhance security and manageability. The access credential, a specialized type of verifiable credential, is uniquely designed to govern data access rights within the system.

Each access credential is issued under a distinct DID, ensuring separation of data and access credentials for enhanced security management. The credential includes a type designator of "AccessCredential" and contains attributes such as "access-level", which are critical in defining the scope of access granted. The subjectID of the credential is typically a user DID, ensuring that each credential can be explicitly linked to a verified entity.

The credential structure ensures that access credentials strictly adhere to defined access levels. Each verifiable presentation derived from these credentials is restricted to reveal only a single "access-level" key, preventing unnecessary exposure of credential details. This controlled revelation aligns with privacy-preserving practices by minimizing the data footprint during the verification process.

To adapt to evolving security needs or correct potential issues, access credentials can be modified by a process of revocation and reissuance. This process involves the explicit invalidation of the old credential and the issuance of a new one with updated parameters. The revocation process is particularly stringent, requiring that all identifiers associated with the revoked credentials be published to ensure system-wide recognition of the revocation. Revocation of credentials is an essential feature that provides the flexibility to respond to security breaches or policy changes. For user DIDs, revocation is typically not practiced due to the persistent nature of these identifiers within the system. However, in the rare cases where it is necessary, the process involves meticulous management to ensure system integrity is maintained without exposing the network to risks associated with key compromises.

For access credentials, the revocation process is distinct and involves publishing the identifiers of the revoked credentials to the blockchain. This ensures transparency and irreversibility, providing a clear audit trail. The publication is handled in a manner that does not compromise the privacy of the underlying data or the associated users, leveraging cryptographic techniques to secure the identifiers.

ZKPs are integral to this system, used to substantiate the possession of access rights without revealing the actual rights or related data. Generally, ZKPs are a cryptographic protocol that enables one party, known as the prover, to prove to another party, the verifier, that a certain statement is true without revealing any information other than the veracity of the statement itself. This method contributes to ensuring privacy and security in digital communications, as it allows for the confirmation of possession of information without exposing the information itself. The mechanism of ZKPs involves several steps: initially, the prover and verifier agree on the problem's parameters. The prover then generates a proof that they possess certain knowledge or information by constructing a series of cryptographic commitments. These commitments are designed to be unforgeable and must convincingly demonstrate the truth of the prover's statement without revealing the underlying data. Upon receipt, the verifier issues a challenge to the prover, prompting them to provide additional cryptographic responses. These responses must be structured to satisfy the challenge while still protecting the confidentiality of the underlying data. The verifier analyzes the responses to determine whether they correctly address the challenge, confirming the statement's truth without gaining any other knowledge from the interaction. The incorporation of ZKPs offers substantial benefits, notably enhancing data privacy by minimizing exposure during verification processes and bolstering security by reducing the data attack surface. Moreover, ZKPs facilitate interoperability across different technological platforms without compromising data confidentiality, positioning them as an essential tool in the privacy-preserving cryptographic toolkit.

Additionally, herein, ZKPs are used throughout many of the method steps to ensure that access to certain data attributes is only granted to entities that have the right permissions, without revealing the identity or other sensitive information of the requesting party. This can be particularly useful in scenarios where data is sensitive, and access needs to be strictly controlled. When data consumers make queries to access specific datasets, ZKPs can be used to prove that their queries are legitimate and comply with the privacy rules set in the blockchain, without revealing the content of the queries. This minimizes the risk of exposing sensitive query patterns or data during the transmission and processing phases. As part of the data transaction process, ZKPs can be utilized to confirm that transactions comply with predefined rules encoded in smart contracts without revealing any underlying data involved in the transactions. This use of ZKPs helps maintain transaction privacy and integrity, ensuring that only necessary information is disclosed. ZKPs facilitate compliance with privacy regulations by allowing for audits and verifications that data handling complies with legal requirements without exposing the actual data. Auditors can verify the correctness and compliance of data handling processes using proofs that certify compliance without needing to access the raw data.

In the described system, the generation of access credentials can be managed by different entities depending on the specific implementation and operational requirements. In some embodiments, the system itself is responsible for generating the access credentials. This approach centralizes control within the system architecture, allowing for standardized security measures and uniform handling of credentials across all data transactions. The system-managed generation facilitates the integration of robust cryptographic protocols and compliance checks before issuing the credentials, enhancing overall system security and reliability.

Alternatively, access credentials can be generated directly by the data provider. This method decentralizes the credential issuance process and provides the data providers with direct control over the access permissions for their own data. It allows data providers to tailor the access permissions based on specific user requirements or data sensitivity, and to apply their own security and validation standards. This can be particularly useful in environments where data providers operate under distinct regulatory requirements or need to enforce personalized access controls that are not uniformly provided by the system.

Below is an example access credential:

```
{
  "@context":[
    "https://www.w3.org/ns/credentials/v2"
  ],
  "type":[
    "VerifiableCredential",
    "AccessCredential"
  ],
  "issuer":"did:valence:uXmpOofFuHlacIEIY6R0N8Iu18EumDZi_OSeXQ4wLiAA",
  "validFrom": "2023-06-01T00:00:00Z",
  "validUntil": "2024-06-01T00:00:00Z",
  "subjectID":"did:valence:u4EfI--tp5PhT2zs--x1Z_olcV0YjTQJ3wvrKeWkPriQ",
  "credentialSubject": {
    "access-level": {
      "type": "string",
      "data":"HIPAA Compliance"
    }
  },
  "proof": {
    "type": "DataIntegrityProof",
    "verificationMethod":"did:valence: Uw6es13RqTeMVT-t9CW2-OiFnBcX3ajrZVksn6ZpJ3yk#usTNwyz",
```

```
    "created": "2024-01-30T19:41:21Z",
    "proofValue":"uPuk8OT-Z5ZivN8fqV7qH-
m6siitss3ZN2CUAJTdaUzo50rYKBfgUb6KARLFWzZtGM1PZpsW",
      "totalAttributes":8
    }
}
```

Overall, the structured approach to generating, managing, and revoking access credentials within this system not only enhances security and operational efficiency but also ensures that privacy and data integrity are upheld across all interactions. This methodology reflects a sophisticated understanding of cryptographic principles and privacy-preserving technologies, setting a high standard for access management in decentralized networks.

In step 416, after the access credential is generated, the access credential is securely storing within a connected database. This storage not only serves as a repository but also plays a crucial role in managing and validating future access requests. By storing the access credential, the system maintains a record of all authorized devices and the specific data subsets they are allowed to access, along with the valid time frame of such access. This mechanism ensures that any access outside the defined parameters can be quickly identified and prevented, reinforcing the security and integrity of data transactions within the network. Moreover, the secure storage of access credentials facilitates efficient and rapid verification processes whenever access is requested, streamlining operations while maintaining stringent security standards.

In step 418, the system receives a data access request from the third computing device. The data access the request specifies the at least one subset of the plurality of data attributes and includes the unique third computing device identifier of the third computing device. In the context of step 418, where a data access request from the third computing device is received, the system processes these requests by determining which subsets of data attributes are being queried. Each of these subsets, once verified and authenticated in subsequent steps, forms the basis of separate verifiable presentations. The data request may be read as a structured query object, incorporating several elements essential for the precise identification and execution of the data retrieval. Below is an example data request or query:

```
{
  "query": {
  "type": "object",
  "properties": {
    "queryID": { "type": "string" },
    "user": { "type": "string" },
    "queryText": { "type": "string" },
    "source": { "type": "object" },
    "issue": { "type": "string" },
    "queryText": { "type": "string or object" },
    "timestamp": { "type": "string", "format": "date-time" },
    "status": { "type": "string", "enum": ["Running", "Completed",
      "Failed"] },
    "metadata": { "type": "array" }
    },
    "required": ["queryID", "user", "queryText", "timestamp", "status"]
    }
  }
}
```

The query object is defined with the following parameters, including but not limited to, queryID, user, source, issuer, queryText, timestamp, status, and metadata. The queryID is a unique identifier assigned to each query, which facilitates the effective tracking and management of the query across its lifecycle. The user parameter identifies the user or entity initiating the request, linking the query to specific access rights and historical interactions. The source is an optional component that may provide additional context or source information about the query, aiding in refined data retrieval. The issuer indicates the entity responsible for issuing the query, which could be vital for validating the query based on established credentials.

The queryText is the key element of the query where the data or attributes being requested are specified, either as a string or a structured object. It directs the system to search for and match the requested data attributes within the database. The queryText component of the query provides detail into the data attributes sought by the third computing device. Let's consider a scenario where an advertiser wants to place a targeted ad in The New York Times (NYT) and needs specific demographic information provided by the NYT to tailor their advertising strategy effectively. For example, an advertising agency planning to launch a campaign aimed at readers interested in luxury travel. The agency intends to place this ad on the NYT digital platform. To ensure the ad reaches the most relevant audience, the agency submits a query to the NYT's data service to retrieve detailed demographic data. The queryText for such a query might look like this:

```
"queryText": {
  "consumerAttributes": {
    "ageRange": "35-55",
    "incomeBracket": ["high"],
    "interests": ["luxury", "travel"]
  }
}
```

In this query, the queryText is designed to fetch data about NYT readers who are likely to be interested in luxury travel, fall within a high-income bracket, and are aged between 35 and 55. This data enables the advertising agency to precisely target their ads, enhancing engagement and return on investment.

Upon receiving the data access request, the system checks the query against the access credentials assigned to the advertiser's third computing device to ensure proper authorization. Specifically, in step 420, the system verifies that the at least one subset of the plurality of data attributes and the unique third computing device identifier of the third computing device from the data access request are associated with the access credential stored on the connected database and that the data access request satisfies the temporal attribute of the access credential. This ensures that the data request or query is authorized and complies with any established access controls. For example, each query includes a timestamp that captures the exact moment the query was submitted, ensuring that the data access is logged with a precise temporal marker for security and compliance. The system retrieves the access request accoladed with the requesting commuting device. If the requesting computing device is associated with more than one access credential, then the system retrieves the access credential associated with the issuer of the specified data attribute. The system then compares the timestamp to any temporal attributes or access permissions of the access credential to ensure that the data is accessed only by satisfying predetermined conditions. For clarity, consider a scenario where a financial analytics firm wishes to access aggregated financial data from multiple banks to enhance its predictive models. The system would check that the analytics firm's computing device has a valid access credential that grants it the right to access this specific type of financial data. Additionally, the system verifies that the request was made within the valid time frame specified in the credential, ensuring that access permissions are current.

This structured approach to the query, especially the detailed formulation of "queryText", enables the system to efficiently interpret and fulfill data requests. It uses the "queryText" to conduct targeted searches against the indexed references of data attributes stored in the connected database. Such meticulous organization not only optimizes the retrieval process but also aligns closely with specific user requirements and access controls, marking a significant improvement over conventional data access systems by ensuring accurate, secure, and compliant data handling in a decentralized environment.

Additional attributes of the query or data request include the timestamp which captures the exact moment the query was submitted, ensuring that the data access is logged with a precise temporal marker for security and compliance. The status component reflects the current state of the query such as "Running", "Completed", or "Failed", helping manage and monitor its progress. Moreover, the metadata component provides a flexible array intended for additional data pertinent to the query, supporting complex processing or compliance requirements.

Additionally, in step 422, the system will verify the verifiable credential associated with the access credential. This step is crucial for confirming the authenticity and integrity of the data being accessed. The verifiable credential contains cryptographic proofs-such as ZKPs or other secure cryptographic mechanisms—that validate each data attribute without exposing the underlying data. This mechanism not only secures data transactions but also upholds privacy by ensuring that no unnecessary data is disclosed during the verification process. Continuing with the financial analytics firm example, once the firm's access credentials are verified, the system then confirms the authenticity of the verifiable credential associated with the requested financial data. This includes checking cryptographic proofs that validate the accuracy and integrity of the data attributes related to financial trends and behaviors. This step ensures that the data has not been altered or tampered with since its issuance and that it accurately represents the original data as certified by the issuing bank.

After all verification, the system then searches, in step 424, its cryptographic index of data attributes, efficiently pinpointing the entries that match the query criteria. This step utilizes an indexable reference, which serves as a structured, searchable map of all data attributes stored within the system. Each data attribute is associated with a cryptographic identifier generated earlier in the process, which not only enhances security but also optimizes the search operation by providing a direct link to the location of each specific attribute within the database. Once the system has verified the verifiable credential and the access credential, it proceeds to search for the specified data attributes mentioned in the data access request. This is achieved by querying the connected database using the cryptographic identifiers that correspond to the requested attributes. The indexable reference system facilitates rapid retrieval of data, significantly reducing the search time and computational overhead involved in accessing large datasets.

Consider a digital marketing agency that wants to access consumer behavior data for a targeted advertising campaign. The agency submits a query specifying certain demographic attributes, such as age range and interests. The system, using the indexable reference, quickly locates these attributes by their cryptographic identifiers. This allows for the efficient extraction of the relevant data from a large database, enabling the agency to tailor its marketing strategies more effectively based on the retrieved data. The use of an indexable reference in step 424 is particularly advantageous in environments dealing with large volumes of data, such as big data analytics, financial services, or healthcare systems. By organizing data attributes in a manner that is easily searchable, the system enhances the overall efficiency and responsiveness of data queries. Moreover, the cryptographic nature of the identifiers used in the index not only speeds up the data retrieval process but also adds an additional layer of security, ensuring that the data cannot be accessed or altered without proper authorization. This step significantly improves over prior art by providing a scalable and secure method to manage and access vast datasets, thereby supporting real-time data applications and advanced analytics.

Each data attribute within the verifiable credential is assigned a unique cryptographic identifier, forming an indexable reference that streamlines data retrieval and integrity checks. This indexing mechanism is predicated on a unique key derived from the verifiable credential, which ensures the uniqueness of each data attribute stored in the system. The uniqueness of each attribute is ensured by the use of a cryptographic proof, typically a hash function, that generates a deterministic output based on the contents of the VC and its issuer's private key. In the context of BBS signatures, this output might be an 80-byte signature, condensed into a more manageable 32-byte identifier using a hash function like SHA-256. This compact identifier not only ensures data integrity but also minimizes storage requirements and enhances the privacy by concealing the original data attributes behind hash-based proofs.

The collision resistance of hash functions, specifically in the context of SHA-256 used within this system, contributes to maintaining the uniqueness and security of cryptographic identifiers generated for verifiable credentials and their associated verified presentations. SHA-256 is a robust cryptographic hash function that outputs a 256-bit (32-byte) hash. It is well-regarded for its high level of security against collision attacks, where two different inputs produce the same output hash. The probability of such collisions with SHA-256 is extremely low, making it highly suitable for systems requiring secure and unique identifiers.

The application of collision-resistant hash functions is particularly advantageous in handling longitudinal data, which involves collecting and analyzing repeated observations of the same subjects over time. In such cases, each data entry or observation is linked to a specific timestamp and potentially to a unique digital identifier that must remain consistent and unique over the study's duration.

For instance, in a longitudinal study tracking patient health outcomes over several years, each set of patient data could be encrypted and stored with a unique hash generated from the data itself and relevant metadata, such as the timestamp. This hash serves not only as a unique identifier to retrieve and verify the data but also ensures that the data has not been altered, providing a reliable basis for analysis over time. Furthermore, the structure of verifiable credentials and verifiable presentations in this system allows for the efficient organization and retrieval of longitudinal data. Each verifiable credential and verifiable presentation can be associated with specific time points and particular data attributes, and because the identifiers are generated through collision-resistant hashing, each identifier reliably points to a unique set of data without the risk of hash collisions-even as the dataset grows. This method enhances the integrity and trustworthiness of longitudinal data analyses in decentralized systems, where data provenance and immutability are paramount. It ensures that researchers and analysts can rely on the authenticity and accuracy of the data over long periods, which is essential for studies that aim to observe trends, changes, or developments within the subjects being studied.

Once relevant data is identified, the system compiles this information into a verified presentation, complete with cryptographic proofs that validate the integrity and authenticity of the data. In step 426, the system generates a verified presentation that comprises the at least one subset of the plurality of data attributes and at least one second cryptographic proof for the at least one subset of data attributes. The verified presentation is a digital construct of that allows specific pieces of information, derived from underlying verifiable credentials, to be presented in a secure and verifiable way. In the generation of a verified presentation, the system selects a subset of data attributes from the available verifiable credentials that meet the criteria specified in the data access request. This selective approach helps in minimizing the exposure of sensitive information, adhering to the principles of least privilege and data minimization. Following the selection, a second cryptographic proof is generated for these attributes. This cryptographic proof is crucial as it secures the integrity of the presented data by ensuring that it has not been altered since the issuance of the original credential and remains consistent with the source credentials.

These cryptographic operations confirm that the data has not been tampered with and accurately represents the demographics of interest to the advertiser. The verifiable presentations essentially serve as filtered views or excerpts of the underlying verifiable credentials, tailored to match the specific data request without exposing unnecessary or sensitive information. This method ensures that each data retrieval instance is precisely aligned with the user's access rights and query specifications.

The practical application of generating the verifiable presentations involves storage and computational considerations. For example, if there are m verifiable credentials, each with n attributes, the potential number of verifiable presentations that can be generated is bounded by $(nm)^2$. This scale, while providing robust flexibility in data handling, introduces significant storage demands. Taking an estimate from the provided sizes, with verifiable credentials containing 10 attributes roughly consuming 1019 bytes and each corresponding verifiable presentations about 1778 bytes, the operational storage needs escalate notably as the number and complexity of the credentials and presentations increase.

Figure 6A:
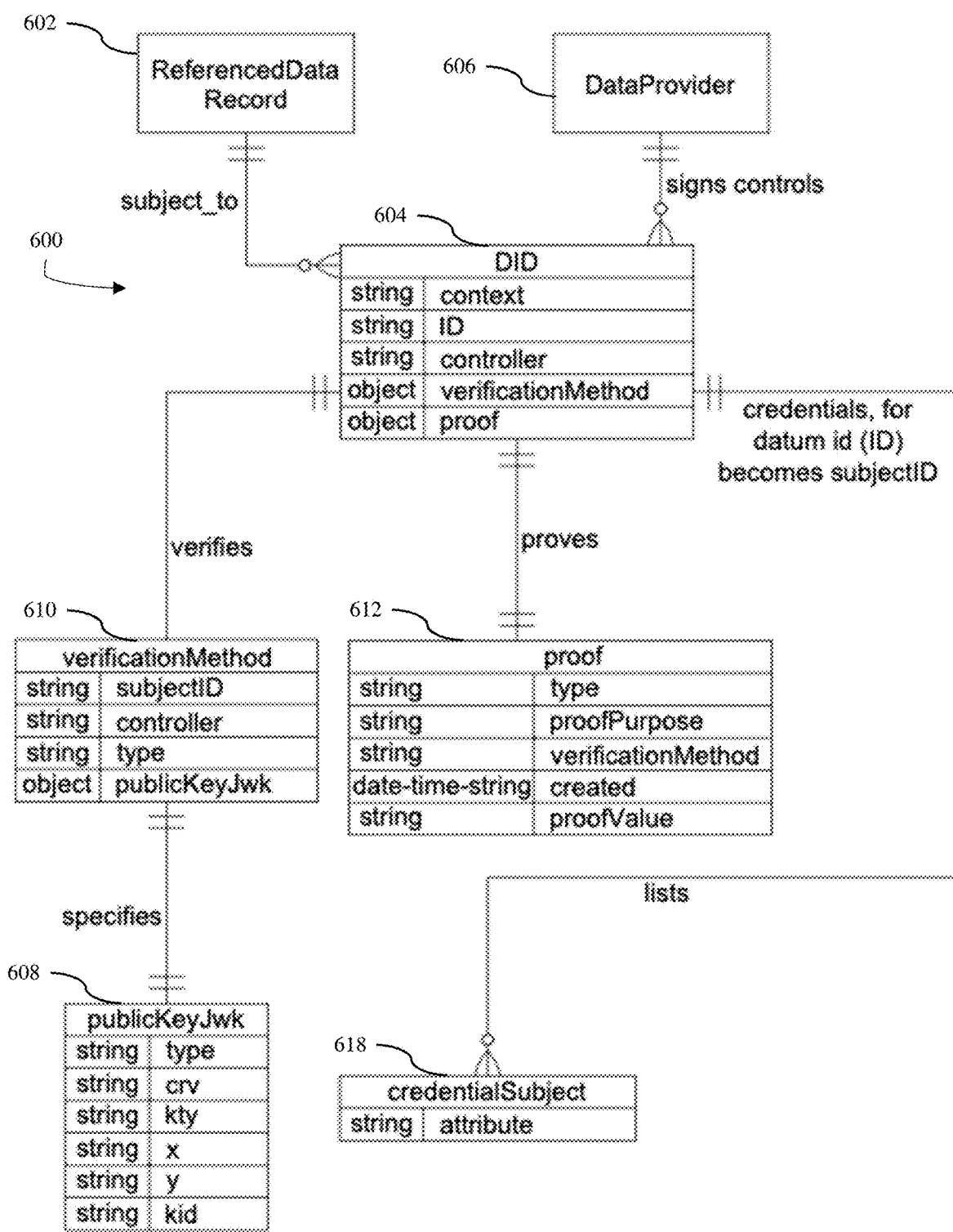
FIG. 6A is a detailed entity-relationship diagram (ERD) class diagram representing entities and their relationships within a data credentialing system, according to an example embodiment.
Figure 6B:
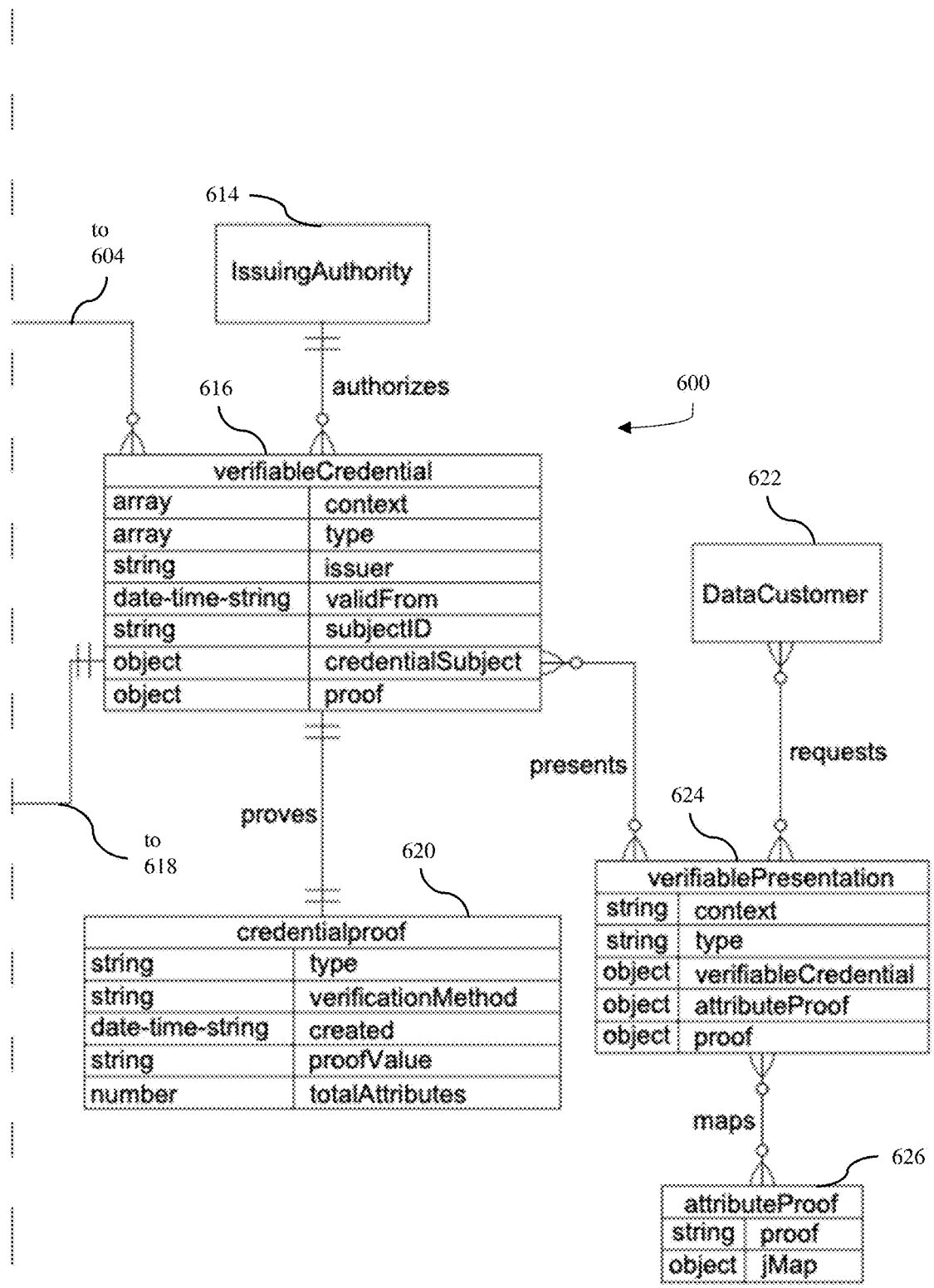
FIG. 6B is a continuation of the ERD class diagram of FIG. 6A, according to an example embodiment.

To manage these vast quantities of data efficiently, the underlying database, typically structured in JSON format, must be adept at storing and retrieving these large data sets. The entity-relationship diagram, shown in FIG. 6A and FIG. 6B, provides a visualization for how the system manages the relationships between different data entities, ensuring that each query is processed accurately and efficiently. This structured approach allows for effective scalability and management of data within the system, essential for maintaining performance and reliability in a decentralized environment handling diverse and voluminous data requests. Below is an example verifiable presentation:

```
{
  "@context": [
    "https://www.w3.org/ns/credentials/v2"
  ],
  "type": [
    "VerifiablePresentation",
    "UniversityDegreePresentation"
  ],
  "verifiableCredential": [{
    "@context": [
      "https://www.w3.org/ns/credentials/v2"
    ],
    "type": [
      "VerifiableCredential",
      "UniversityDegreeCredential"
    ],
    "issuer": "did:valence:ukDgOBfifaJcIEYGR0NBJIuefEm0JLQ5eXQ4kILa",
    "validFrom": "2019-06-16T08:00:00Z",
    "subjectDID": "did:valence:4qEFL_tSPpfi7Z25 -- x1Z_cGdVCyojT3QhwrcKwkPiFQ",
    "credentialSubject": {
      "attribute-0-t": {
        "type": "string",
        "data": "really long attribute"
      },
      "attribute-1-t": {
        "type": "string",
        "data": "really long attribute"
      },
      "attribute-2-t": {
        "type": "string",
        "data": "really long attribute"
      }
    },
```

```
    "proof": {
      "type": "DataIntegrityProof",
      "verificationMethod":         "did:valence:ude6S1J8qTeWnT-tC9C2-
0IfnbCk3zjvZn5kG2jy3kuusT1h",
      "created": "2024-08-16T19:35:59Z"
    }
  }],
  "attributeProof": {
    "proof":
"uoTOacnI2EMLkQGBXKvGFS7Gzsxx5kI3slw3mdGfOHdWx0J1tpiiBXwB2p7wAXCkPQH
rEc",
    "gpId": "boolprime-0-t",
    "attribute-0-t": {
      "attribute-1-3",
      "attribute-2-3"
    },
    "proof": {
      "type": "DataIntegrityProof",
      "verificationMethod":          "did:valence:utbC7Ydp4prVFvF-
ylvbtA2vCsvvc_oylyZ8kLyWRrEuh2J7Cf4",
      "created": "2024-08-16T20:00:58Z",
      "proofValue":
"u9er1S812sz8k0wF8mr3BOFJOpCbJg2InEMh6kAWGbjExLSn24y4JadxrHMx8c"
    }
  }
}
```

Referring to FIGS. 6A and 6B, a detailed entity-relationship diagram 600 representing entities and their relationships within a data credentialing system is shown, according to an example embodiment. The ERD maps the structured relationships and attributes within a data management system designed to optimize data control and verification processes. This ERD identifies several key entities interconnected through well-defined relationships, embodying the system's architecture for managing, verifying, and utilizing data credentials. This ERD is essential for understanding the interactions between various entities within the system, each defined with specific roles and attributes that contribute to the overall functionality and integrity of the data management process.

Entity 602, labeled "ReferenceDataRecord," records or houses the reference data within the system. The data record in a provided dataset will have a DID as an identifier. This DID is a subject in the DID document and would not require private key generation. The DID serves as a content address. The ReferenceDataRecord is subject to entity 604, labeled as "DID", of which is signed and controlled by entity 606, labeled as "Data Provider".

Entity 604 provides a unique identifier for each data element. The "DID" 604 is defined by attributes such as "context", "id", "controller," "verificationMethod", and "proof"—facilitating the linkage and verification of data within the decentralized framework. Anything can be a DID subject: person, group, organization, physical thing, digital thing, logical thing, etc. This entity verifies the credentials for the datum, making the datum's identifier the "subjectID" for entity 614, "VerifiableCredential." The public key specified by entity 608, e.g. "publicKeyJwk" specifies the "VerificationMethod" 610 to verify the "DID" 604. As previously stated, the publicKey, proof, and the verification method are provided for within the specification of the DID submitted, signed, and controlled by the DataProvider. Furthermore, the proof specified in entity 612 proves the "DID."

A DID controller, or the DataProvider, is an entity that is authorized to make changes to a DID document. The data provider is a dataset owner that is granting permissioned access to his/her dataset. The data provider is the controller on the DID document with signing authority over changes to the document. The process of authorizing a DID controller is defined by the DID method. The DataProvider 606 is responsible for supplying the foundational data that populates the system, which is then associated with unique, blockchain-secured DIDs. The DataProvider ensures the authenticity and accuracy of the data it supplies, managing its lifecycle from inception to its eventual use. By controlling the issuance of DIDs that are linked to the data, the Data Provider enhances trust and ensures the integrity of the data within the system. This role is crucial for maintaining the reliability and credibility of the data ecosystem, providing a trusted source of data for all stakeholders involved, including consumers, businesses, and regulatory bodies. Through this governance, the Data Provider directly influences the effectiveness and security of the data verification processes, underpinning the system's overall functionality and its capacity to support secure and transparent data transactions.

Entity 614, denoted as "IssuingAuthority," authorizes the issuance of verifiable credentials within the system. The issuing authority for certain onboarded datasets can be a central party, i.e., the system, or an independent third party, that is responsible of maintaining the registry and authority to revoke a credential. This case would pertain to a dataset that did not need an independent authority to assert the claim about the dataset. In the other case, a credentialing authority can be independent and have the standing to issue a credential. In certain embodiments, the DataProvider may have standing to issue a credential, in other embodiments, the system may issue a credential only upon request by a third party seeking to join the network. Moreover, the issuing authority may be an aggregator or clearing house of data.

The "IssuingAuthority" interacts with entity 616, "VerifiableCredential," which encapsulates the credentials issued by the authority. The "VerifiableCredential" 616 is detailed with attributes such as "context", "type", "issuer", "subjectID", "credentialID", temporal attributes such as "ValidFrom", and "proof", providing a structured and verifiable assertion of data ownership or control. The verifiableCredential entity lists the attributes of entity 618, "CredentialSubject," which details the specific attributes associated with the credential, including "attribute" and other relevant details. Entity 620, "CredentialProof," encompasses the proof elements associated with the verifiable credentials 616, including attributes like "type", "verificationMethod", "created", "totalAttributes", and "proofValue". This entity proves the verifiable credentials within the system.

Entity 622, "DataCustomer", represents the recipients or users of the verified data within the system, characterized by attributes such as "requests", submitting and indicating the data requests made by the customer seeking the presentation of certain data attributes within a verifiable credential. The DataCustomer submits a request to the system, which will request data entity 624, denoted as "verifiablePresentation", to remit a verifiable presentation of a verifiable credential based on one or more data requests or queries from the DataCustomer. The verifiablePresentation is characterized by attributes such as "context", "type" "verifiableCredential", "attributeProof", and "proof". This entity interacts with entity 626, "AttributeProof," which maps the specific attributes and proofs associated with the presentation, detailed with attributes like "proof" and "jMap". "AttributeProof" within the "VerifiablePresentation" entity serves as a critical component that ensures the verifiability and integrity of the presented data attributes. Specifically, the "AttributeProof" is designed to provide cryptographic evidence that the attributes being presented within the "VerifiablePresentation" are authentic and have not been tampered with. The "AttributeProof" is linked to this entity 624 to map and validate the individual attributes contained in the presentation. This linkage ensures that each attribute presented to the "DataCustomer" is verifiable against the underlying credentials and proofs. "AttributeProof" stores the cryptographic proof data, which is derived from methods such as digital signatures or ZKPs. This proof confirms that the attribute has been issued by a legitimate authority and has not been altered. The "jMap" attribute provides a mapping of the attribute to its corresponding proof, allowing for the seamless verification of each individual attribute within the "VerifiablePresentation." The jMap ensures that each piece of data can be independently verified, maintaining the integrity of the overall presentation. The role of the "AttributeProof" in the "VerifiablePresentation" is to ensure that when a data customer requests and receives data, each attribute of the data is accompanied by verifiable proof. This mechanism enhances trust and reliability in the system by enabling the data customer to validate the authenticity and accuracy of each attribute presented, thus preventing fraud and ensuring data integrity.

Referring back to FIG. 4A, FIG. 4B, and FIG. 4C, after receiving multiple, or a plurality of, requests or queries from the third computing device, the method involves generating a series of verified presentations in step 428. Each presentation is crafted to include at least one subset of data attributes accompanied by robust cryptographic proofs, ensuring the integrity and authenticity of the information provided. Following the generation of these presentations, step 430 involves transmitting the compiled verified presentations back to the third computing device. This step is crucial as it delivers the results of the data queries in a secure and verified format, enabling the requesting device to utilize the data for its intended purposes while ensuring that all transactions adhere to the predefined security protocols.

Overall, ZKPs enable one party, the prover, to affirm the truth of a claim to another party, the verifier, without divulging any additional information apart from the validity of the claim itself. This method contributes to ensuring that sensitive data remains confidential while still being utilized in data queries and exchanges. ZKPs facilitate the secure sharing of data by guaranteeing that no sensitive details are inadvertently disclosed during the verification process. Moreover, verifiable presentations, as standardized by the W3C, provide a robust format for sharing data that is both cryptographically secure and verifiable. When data is encapsulated in a verifiable presentation, it assures recipients of its integrity and authenticity. This assurance enables recipients to confirm that the data has not been altered and originates from a credible source, all without needing to access the underlying data or sensitive particulars directly.

The integration of ZKPs with verifiable presentations enhances data exchanges by making them not only private but also exceptionally reliable and transparent. This dual-layered approach is particularly advantageous in domains where the stakes around privacy and data integrity are high, such as in financial services, healthcare, and personal identity management sectors. By merging the privacy-preserving capabilities of ZKPs with the authentication strength of verifiable presentations, this methodology ushers in a new standard for secure, private, and trustable data exchanges. It allows parties to share and validate essential information without the risk of compromising privacy or security, catering to a broad range of applications where confidentiality and trust are crucial.

Lastly, step 432 involves recording a comprehensive data exchange record on the blockchain. This record includes: (i) a third cryptographic proof, which serves as a layered cryptographic validation for each verified presentation, certifying the authenticity and integrity of the data transmitted; (ii) a notation of the frictional payment, which is calculated based on a dynamic valuation model, reflecting the value and utility of the data accessed; and (iii) a record of at least a portion of the access credential associated with the third computing device that initiated the request. This step not only ensures a transparent and immutable log of the transaction but also supports the integrity of the entire system by providing a verifiable audit trail that enhances trust and reliability across the network. The blockchain records a data exchange record which consists of multiple components that highlight the integrity and authenticity of the transaction. Primarily, it includes a third cryptographic proof. This proof is not standalone; it acts as a cumulative assurance layered atop each verified presentation provided to the third computing device. Each verified presentation itself contains a second cryptographic proof attesting to the authenticity of the specific data attributes within that presentation. Further back in the chain of trust, each data attribute's integrity and authenticity are initially established by a verifiable credential, which is itself securely linked to the data attribute using cryptographic methods.

The layering of these proofs serves several important purposes. First, it allows for a reduction in the amount of data that needs to be directly recorded on the blockchain, as the layered proofs provide a compact yet robust method of verifying the authenticity of complex transactions without storing all transactional details. This efficient use of blockchain space not only optimizes transaction processing times but also reduces costs associated with data storage on the blockchain. Second, the structure of the recorded proof leverages the inherent properties of blockchain technology-immutability and transparency. By recording only the final cryptographic proof and associated details like frictional payments and portions of the access credential, the system ensures that each data access request and the resulting data presentation are authenticated and verifiable through a traceable, secure chain of proofs. This method effectively guards against tampering and revision, as altering any part of the transaction would require recalculating the entire chain of cryptographic proofs, which is computationally infeasible. Moreover, this layered proof system enhances privacy by minimizing the exposure of detailed data on the blockchain. Instead of recording every detail of the data transaction, only essential cryptographic proofs are recorded. This approach maintains confidentiality while still allowing for complete verification of the data's integrity and authenticity through the blockchain.

Additionally, the recording of frictional payments on the blockchain as part of the data exchange record provides a direct measure of the data's assessed value based on the dynamic valuation model applied in earlier steps. This not only facilitates the clear and transparent accounting of costs associated with data access but also aligns the economic incentives of the data providers and requesters. By incorporating the financial aspects of data transactions into the blockchain record, the system ensures that all parties are adequately compensated or charged according to the agreed-upon valuation of the data, which is crucial for sustaining a fair and functional data marketplace. The inclusion of access credentials in the blockchain record further reinforces the security measures, ensuring that only authorized parties can access the specified data under the conditions agreed upon in the access credentials. This systematic recording of detailed and verifiable proofs, along with transaction values and access permissions, underscores the robustness of the blockchain-based system in managing secure, transparent, and equitable data transactions.

In one embodiment, the system requires a frictional payment to be made in order to execute a blockchain transaction. This means that each query submitted by a third computing device must be accompanied by an immediate payment that reflects the value of the data accessed according to the dynamic valuation model. This model promotes real-time compensation for data providers and ensures that access to data is always pre-funded, enhancing the liquidity of the digital marketplace.

Another embodiment allows for the generation of an invoice that aggregates all queries over a designated period. Instead of requiring immediate payment for each transaction, this approach tallies the total usage of data by a particular entity, and generates a comprehensive invoice at the end of the billing cycle. This method can be particularly beneficial for regular data users who perform multiple queries and prefer a consolidated payment structure, simplifying budgeting and payments for both providers and consumers of data.

In yet another embodiment, the system may implement a model where each data access request is individually charged. Here, the payment is calculated based on the specific attributes of the data accessed per request and/or according to the valuation model, with each transaction being treated as a separate entity within the billing system. This a la carte pricing model allows for precise tracking and charging of data usage, ensuring that charges are directly aligned with the actual consumption of data resources. This method tailors the recordation and audit process to each individual data access and/or query.

Figure 7:
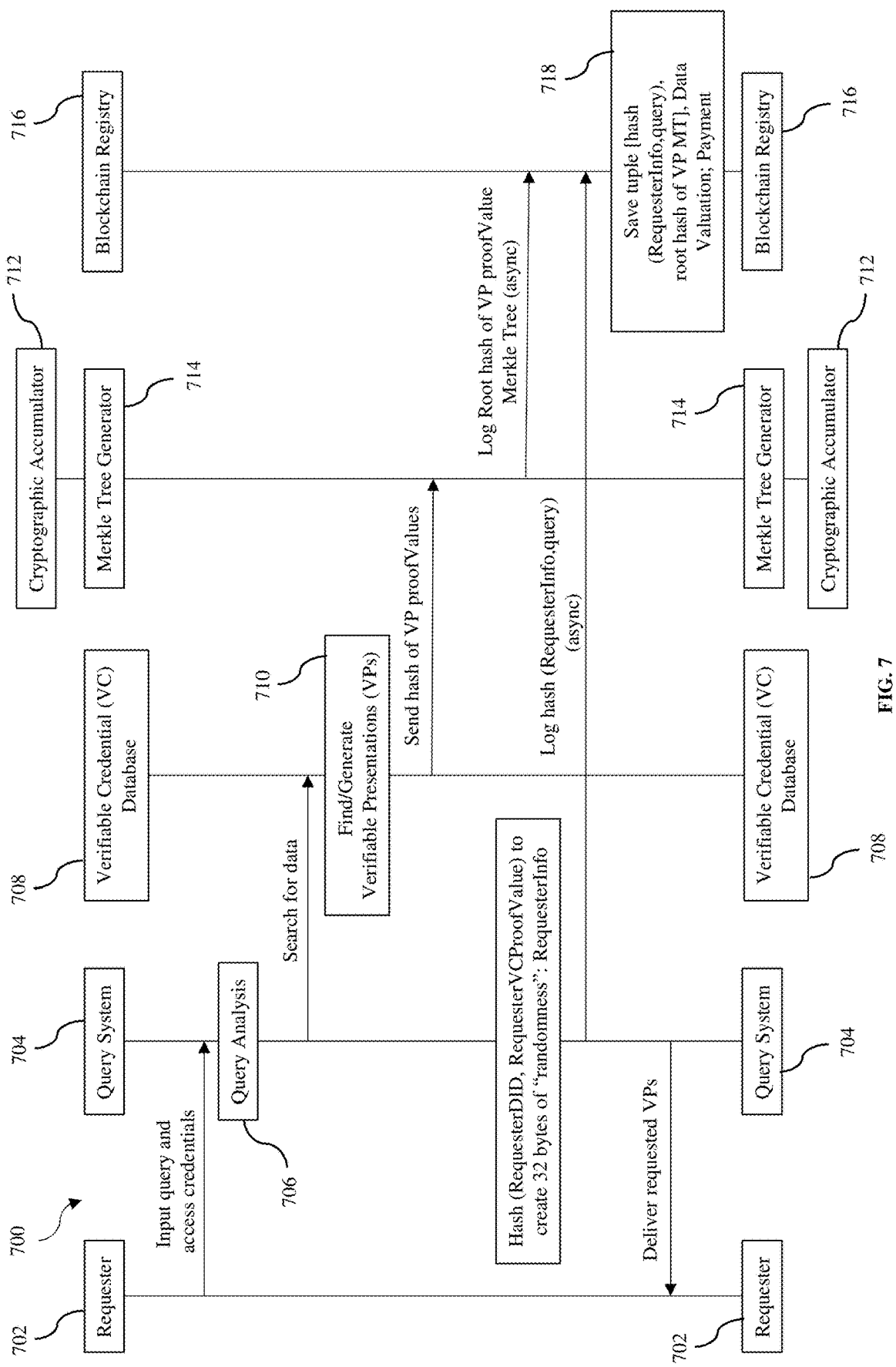
FIG. 7 is a flow diagram illustrating the framework of processing a data query within a blockchain-based system according to an example embodiment.

FIG. 7 is a flow diagram 700 illustrating the framework of processing a data query within a blockchain-based system according to an example embodiment. The process initiates with the Requester 702, who submits or inputs a query along with access credentials to the Query System 704. This system is responsible for the initial query analysis 706 of the query and the subsequent retrieval of relevant data. The query system interfaces with the verifiable credential database 708 to search for the underlying dataset from the query. The system searches the indexable reference of verifiable credentials to find and generate verifiable presentation 710, which encapsulate the data in a secure and verifiable format.

The verifiable credential database 708, after finding and generating the verifiable presentations, sends hashes of the verifiable presentations' proofValues to a cryptographic accumulator 712. A cryptographic accumulator is used to efficiently handle and process large datasets and prove a way to prove set based membership or non-membership of individual elements without revealing the entire dataset. The primary function of a cryptographic accumulator is to enable the compact aggregation of information that can be verified quickly and securely by any party without needing to access the underlying data. This maintains the privacy and integrity of the underlying dataset, thereby preventing and ensuring the underlying data cannot be tampered. In one embodiment, the cryptographic accumulator may be a Merkle Tree Generator 714. A Merkle Tree, a type of cryptographic accumulator, is particularly effective in systems that require the integrity and auditability of transaction logs or data entries. A Merkle Tree generator organizes data into a tree structure, where each leaf node represents a data block (such as a cryptographic hash of a component of a verifiable presentation) and each non-leaf node is a hash of its respective child nodes. Each piece of data or transaction (leaf node) is hashed using a cryptographic hash function. Starting from the leaf nodes, each pair of nodes is then hashed together to produce the hash values of their parent node. This process is repeated recursively up the tree until a single hash is obtained at the top, known as the root hash. The root hash of a Merkle Tree serves as a compact summary of all the data in the tree. It provides a way to quickly verify whether a specific piece of data is part of the set by checking if it contributes to the computed root hash, without needing to review all underlying data. The use of the Merkle Trees allow for quick and efficient verification of data integrity. A verifier only needs a small part of the tree (the branch linked to the specific data piece) along with the root hash to verify the presence or absence of data. Because the verification process does not require revealing the entire dataset, the cryptographic accumulator preserves the privacy of the data. Any change in a leaf node (data input) alters the root hash significantly. This sensitivity to alterations makes it extremely difficult to tamper with any part of the data without being detected.

This cryptographic accumulator acts as a cryptographic accumulator; it logs the root hash of the verifiable presentation proofValue in the Merkle Tree asynchronously, ensuring data integrity and enabling efficient verification. Additionally, it logs the hash of the Requester Information, encapsulating the query details, to further enhance the audit trail. The data verification and logging process culminate at the Blockchain Registry 716, which stores a tuple 718 containing the hash of the Requester Information along with the root hash of the VP Merkle Tree. This registration on the blockchain ensures that every component of the query and data handling process is not only recorded but also immutable and verifiable across the network. This architecture not only supports robust audit capabilities but also provides a transparent and secure framework for handling sensitive data queries, ensuring that all transactions are accountable and traceable within a decentralized environment. The blockchain registry then communicates back with the query system which in turn delivers the requested verifiable presentations to the requester.

Figure 8A:
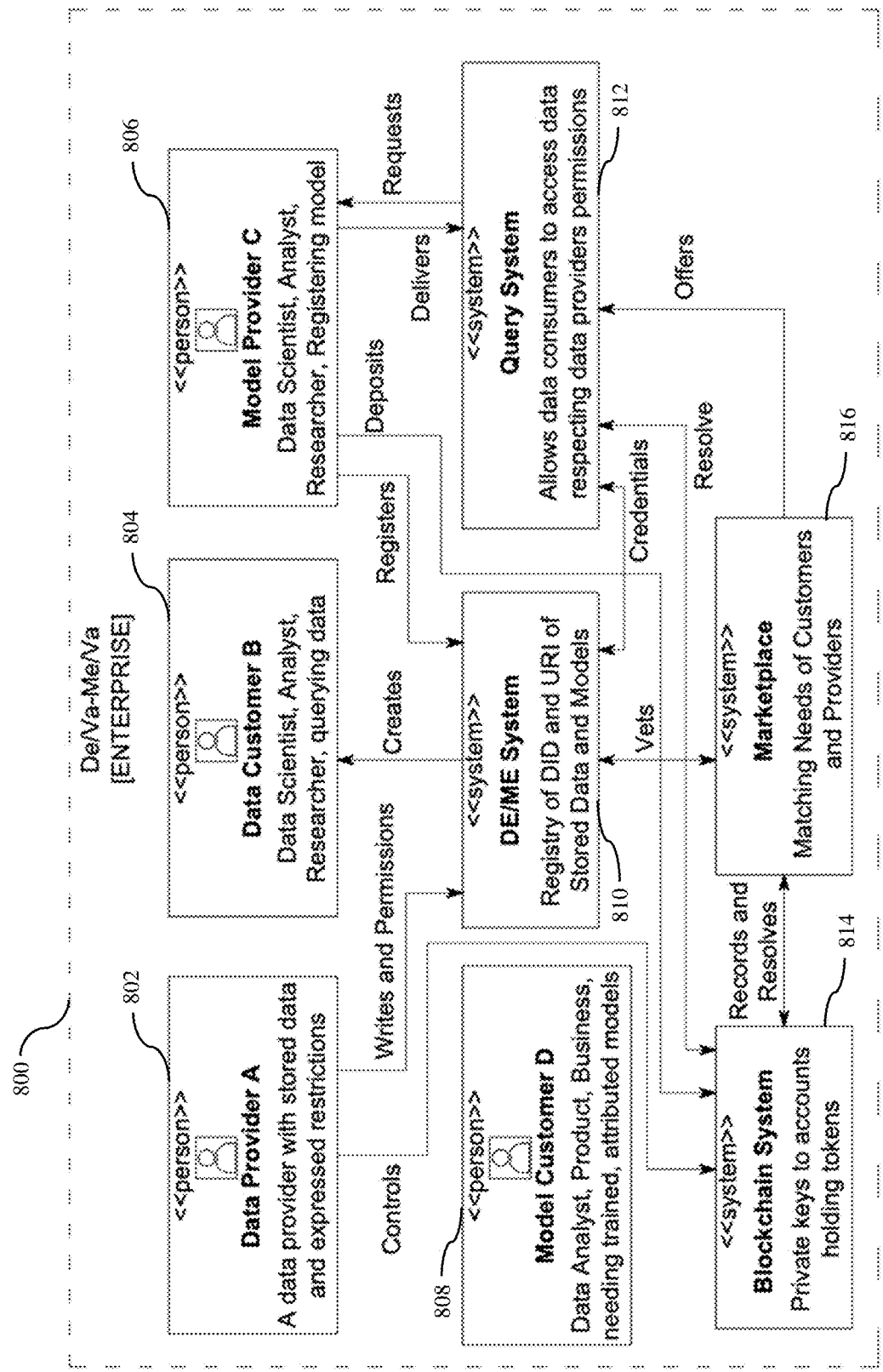
FIG. 8A and FIG. 8B are network architecture diagrams of the system for implementing the disclosed methods, implementable on a Web3 platform, showcasing the decentralized components and their interconnections to enhance security and transparency, according to an example embodiment.
Figure 8B:
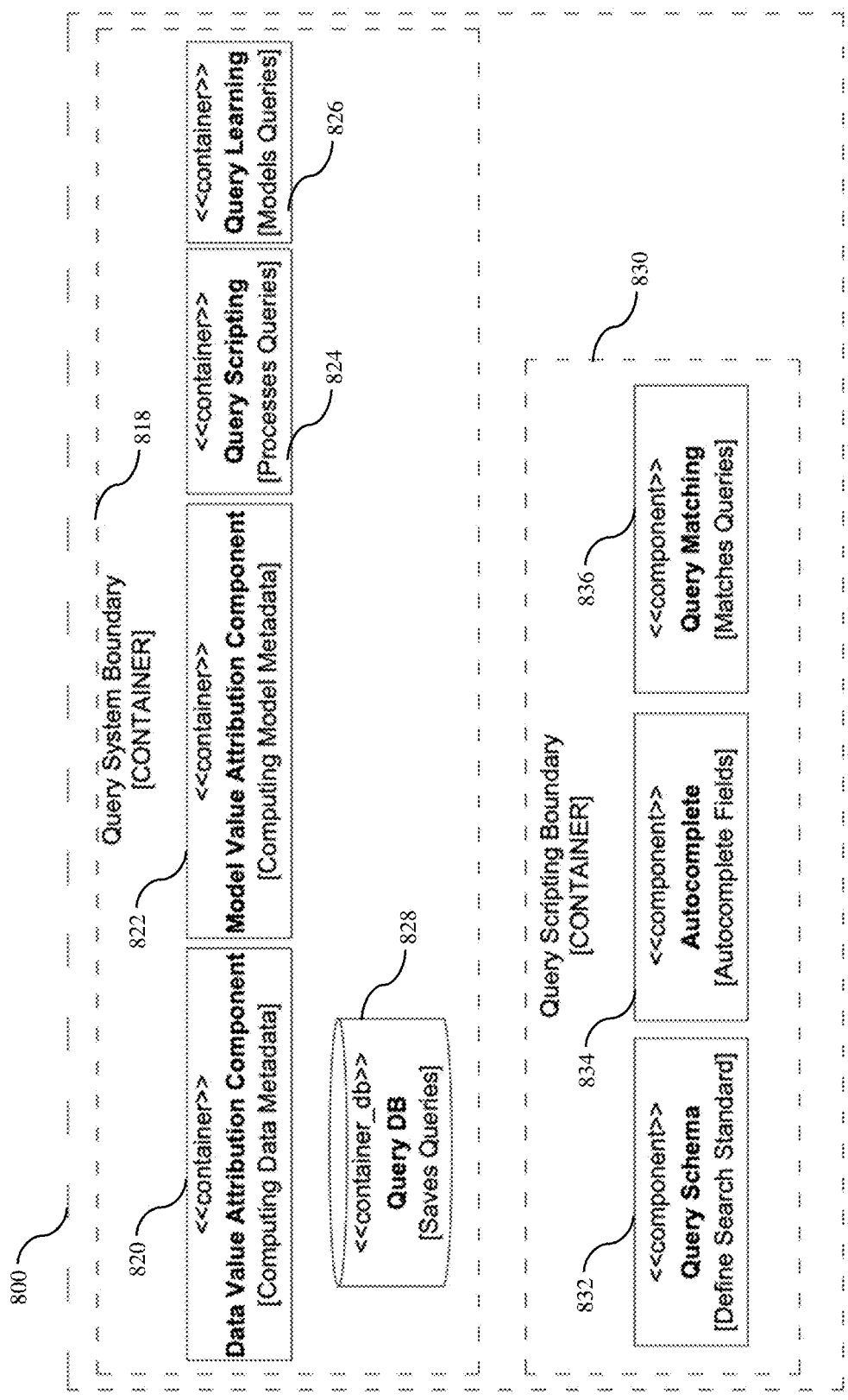

Referring now to FIG. 8A and FIG. 8B, a network architecture diagram of the system for implementing the disclosed methods, implementable on a Web3 platform, showcasing the decentralized components and their interconnections to enhance security and transparency is shown, according to an example embodiment. Data enterprise 800 is depicted as a central entity within the network architecture, contributing to managing and coordinating the data flow and interactions among various components of the system. The enterprise may be responsible for overseeing the data infrastructure, ensuring the security and integrity of data transactions, and maintaining compliance with regulatory standards. It acts as the administrative and operational hub, interfacing with data providers, data consumers, and other stakeholders to facilitate the effective exchange and utilization of data. This entity typically employs advanced technology solutions, including blockchain and decentralized systems, to enhance operational efficiency, data transparency, and trust among participants.

Data Provider A 802 functions as a custodian of stored data, subject to specific access constraints. Data Customer B 804 is the data requester associated with the third computing device. The data requester may be a data scientist, analyst, researcher, etc., that will query data and seek certain verifiable information. Model Provider C 806 engages in the registration and delivery of models, interacting with the DE/ME System 810 to register models and with the Query System 812 to deploy and refine model implementations, thereby enhancing the model's utility and accuracy. The DE/ME System 810 serves as the registry for DIDs and uniform resource identifiers (URIs). It handles credential issuance to the Query System and manages interactions with Data Customers 804 and Model Providers 806, ensuring efficient credential management and access control. Query System 812 facilitates access to data for customers while respecting data provider permissions, integrating with the DE/ME System to authenticate credentials and manage data requests efficiently, thereby maintaining data integrity and accessibility. Model Customer D 808, typically involves a data analyze, product manager, or business entity requiring trained and attributed models. This stakeholder interacts with the Blockchain System 814 for secure transactions and engages with the Marketplace 816 to meet specific operational needs. The Blockchain System 814 manages the security aspects of transactions by handling private keys associated with tokens, ensuring that transactions are secure and verifiable, this maintaining trust across all network interactions. Marketplace 816 operates to align the demands of customers with the capabilities of providers, utilizing offers from the Query Systems to fulfill varied customer requirements.

The Query System Boundary Container 818 acts as a critical hub within the system, enabling seamless access and interaction with data while adhering strictly to the permissions set by data providers; and it incorporates several components for the dynamic valuation and processing of data. This includes the Data Value Attribution Component 820 container which assigns metadata to data entities based on their utility and relevance; the Model Value Attribution Component 822 container that assesses the value of different data models; and the Query Scripting 824 container which handles the execution of queries in compliance with established system protocols. Additionally, the Query System Boundary Container 818 includes the Query Learning 826 container which leverages historical data to enhance the accuracy and efficiency of future queries, and the Query DB 828 container which stores a detailed record of queries and outcomes to support robust data management.

Adjacent to this, the Query Scripting Boundary Container 830 focuses on optimizing the query handling process. It includes the Query Schema 832 component, which defines the standards for query formulation, ensuring consistency across the system. It further includes the Autocomplete 834 component that enhances user interaction by providing predictive text capabilities, making query input more intuitive and precise. Furthermore, it includes the Query Matching 836 component that efficiently aligns incoming queries with the most relevant data or model responses, ensuring users receive accurate and pertinent results. These containers and components collectively enhance the operational efficacy and user engagement by structuring a secure and efficient environment for exploring and interacting with data within the decentralized framework.

Referencing back to method 400 and FIG. 4A, FIG. 4B, and FIG. 4C, the method 400 further utilizes the query system architecture to determine the frictional payment required to access the data by implementing a valuation model. In step 434, the system determines a valuation for the at least one subset of the plurality of data attributes requested by the third computing device, wherein the valuation is based on using the valuation model comprising a predefined set of metrics for assessing the at least one subset of the plurality of data attribute. This may include the query analysis system to analyze the data. Step 436 may include analyzing the data access request with a plurality of stored data access requests to identify at least one pattern of data attributes between the data access request and the plurality of stored data access requests. The at least one pattern of data attributes refers to identifiable trends, relationships, or recurrent themes that emerge when comparing a current data access request against a collection of previously stored data access requests. These patterns can reveal commonalities or discrepancies in how certain data attributes are used or requested across different queries. For example, a pattern may involve the frequent co-occurrence of specific attributes in requests that lead to high-value transactions, or it could highlight sequences in attribute usage that correlate with particular outcomes. Identifying these patterns helps in understanding the contextual importance of data attributes, enabling the system to assign more accurate values and optimize data retrieval strategies for future queries.

This analysis is visually represented in FIGS. 9A through 9C which depict a visual representation of data attributes, from a DID and/or verifiable credential, converted into a vector or embedding, which are then plotted as a three-dimensional cluster, according to an example embodiment. The data request will comprise an identifier which the system recognizes as a associated with a particular verifiable credential. The system will then retrieve the data attributes associated with said verifiable credential that were requested by the query. Data attribute 902 depicted in FIG. 9A, represents an individual data attribute of a verifiable credential which was requested by the query. Said data attribute is considered an individual metric or data element that contributes to the entire identity of the verifiable credential, but only represents the data which was particularly sought by the query. FIG. 9B illustrates a representative example of how said requested data attribute 902 is converted into a numerical form that can be effectively utilized within machine learning algorithms to analyze patterns and relationships in comparison to other data attributes. Specially, FIG. 9B illustrates the data attribute 902 converted into a vector and/or embedding 904. An embedding is a representation of a metric as continuous vector. This method of converting the data attributes to an embedding transform said data with complex relationships and high dimensionality into a lower-dimensional space where similar data points are positioned closely together. Embeddings capture the semantics of the input data by placing data points with similar meaning near each other in the vector space, making them particularly useful for algorithms that work with distances and similarities. High-dimensional spaces often arise from datasets with many attributes or features, which can lead to challenges such as increased computational costs and the curse of dimensionality, where the performance of algorithms degrades as the dimensionality increases. Embeddings address these issues by mapping the high-dimensional data into a more manageable, lower-dimensional space. The process of creating embeddings involves learning a compact representation where similar data points in the high-dimensional space remain close in the lower-dimensional space. In low-dimensional space, embeddings retain much of the significant information from the original high-dimensional data, making it easier to perform tasks like clustering, visualization, and similarity searches.

After a plurality of data attributes are converted into vectorized embeddings, the system, at step 438, the system will generate a query cluster 906, depicted in FIG. 9C. This cluster represents the collective visualization of all data attributes specifically requested by a query within a multi-dimensional attribute space. Each node within this cluster corresponds to an embedding derived from a single data attribute or a composite of attributes, directly linked to the query's parameters. The formation of query cluster 906 allows the system to systematically assess the distribution and relation of requested data attributes, visually identifying how these attributes group together based on their embedded vectors. Such clustering enables the system to detect patterns, concentrations of similar data, and potential outliers. This method is crucial for enhancing data retrieval strategies by focusing on areas within the cluster that demonstrate significant overlap or proximity, suggesting higher relevance to the query's intent. The system will store each data request and associated query to build a valuation model of the queries to associate particular data that is requested with a value based on demand or frequency of appearance when such data appears in a query. To train the system, the system, at step 440, generating a plurality of query clusters based on a plurality of stored data access requests. Each cluster of the plurality of clusters representing a unique query and its corresponding plurality of data attributes. When the system receives a new data request, it processes said data request via step 438, and at step 442, the system generating a current query cluster for the received data access request.

Figures 10A, 10B, 10C:
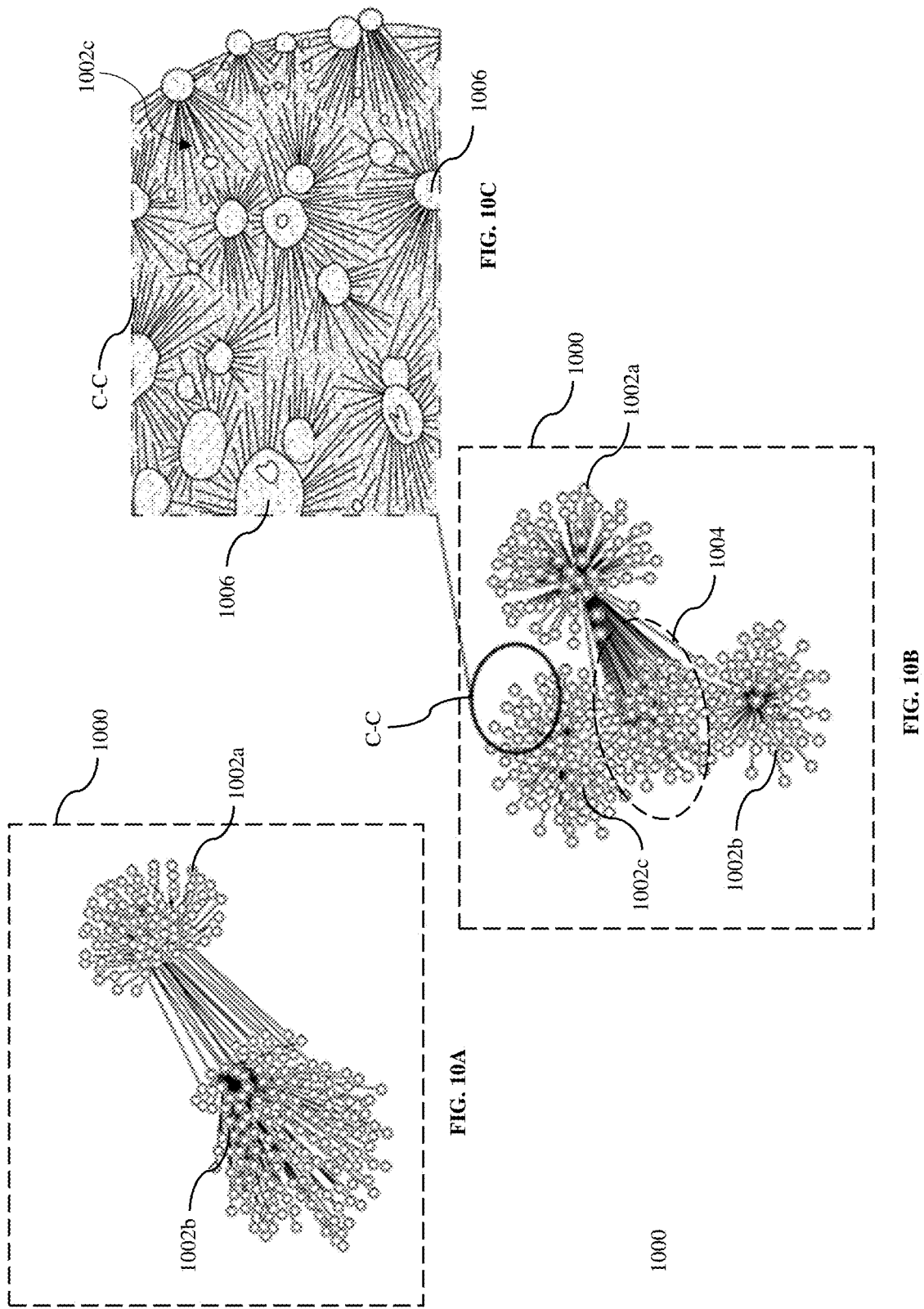
FIG. 10A is an illustration of a network of data clusters, displaying sets of queries and their interactions, highlighting overlapping areas that signify higher data value, according to an example embodiment.
FIG. 10B extends FIG. 10A by adding a new query into the network, showing its integration and impact on existing data clusters, according to an example embodiment.
FIG. 10C provides a detailed view of FIG. 10B, illustrating individual data nodes within the network and their interactions as part of the query process.

FIG. 10A is an illustration of a network 1000 of data clusters (1002a, 1002b), displaying sets of queries and their interactions, highlighting overlapping areas that signify higher data value, according to an example embodiment. The plurality of clusters representing a unique query and its corresponding plurality of data attributes. When the system receives a new data request, it processes said data request via step 438, and at step 442, the system generating a current query cluster for the received data access request.

FIG. 10B extends FIG. 10A by adding the new query or current query 1002c, that was generated in step 442, into the network 1000, showing its integration and impact on existing data clusters, according to an example embodiment. As shown, certain data points or nodes of the current query overlap with previous queries at region 1004 thereby contributing the overall density of the network. As illustrated, current query 1002c overlaps or has similar data nodes with query 1002b at region 1004. By plotting the current query within the query network, the system, at step 444, compares the current query cluster with the plurality of query clusters to identify said overlapping area 1004 where the current query cluster intersects with at least one query cluster of the plurality of query clusters. FIG. 10C provides a detailed view C-C of FIG. 10B, illustrating individual data nodes 1006 within the network and their interactions as part of the query process. Each data node is interconnected with another data node based on their relationships, such as, context-based similarities, dependencies, independencies, frequency of occurrence, etc. Overall, the data network is a series of interconnected data points or a web of data points with multidimensional relationships.

For data valuation of the clusters, the queries may be processed using processed using topic modeling and/or Latent Dirichlet Allocation (LDA). Comparing the current query cluster to the plurality of stored query clusters may include employing LDA and/or topic modeling. Topic modeling is a type of statistical model for discovering the abstract "topics" that occur in a collection of documents. LDA is a particularly popular method for topic modeling that allows sets of observations to be explained by unobserved groups that explain why some parts of the data are similar. For instance, if observations are words collected into documents, LDA posits that each document is a mixture of a small number of topics and that each word's presence is attributable to one of the document's topics. When applied to query processing within a blockchain-based data management system, these techniques help in categorizing and interpreting the large volumes of data accessed through various queries. By analyzing the content of the data access requests, the system can identify underlying patterns or themes, which facilitates more effective data retrieval and organization. This capability allows the system to dynamically adapt to the evolving needs of users by refining the data it highlights and retrieves based on thematic relevance, ultimately enhancing the accuracy and relevance of the data provided in response to user queries. This strategic use of topic modeling and LDA in processing queries enhances the system's ability to understand and predict user behavior and preferences, which can lead to more personalized and efficient data services. Additionally, by incorporating these sophisticated analytical techniques, the system can maintain a high level of performance and responsiveness even as the complexity and volume of data queries increase.

The system, at step 446, will then determine a relative value for at least one of (i) the data access request and/or query and (ii) the at least one pattern of data attributes. This includes calculating a contribution value for the overlapping area, based on a density of data attributes and a frequency of occurrence of the data attributes across the plurality of query clusters. To quantify this assessment, the system calculates a contribution value which reflects the intensity and recurrence of data attributes within overlapping segments of the data clusters. A "contribution value" refers to the quantified impact or importance of an individual data attribute or a specific pattern of data attributes within a broader set of queries. It is essentially a numerical measure that indicates how much a particular data attribute contributes to the overall usefulness or value of the data in specific contexts or analyses.

To do determine said values, the system may, at step 448, apply a game theoretical model comprising a value function used to generate a plurality of Shapley values to assess a potential contribution of each data attribute. A game theoretical model is a mathematical framework used to analyze strategic interactions between rational decision-makers, where the outcome for each participant depends on the choices of others. The Shapley Value is a concept from cooperative game theory that assigns a fair value to each participant based on their contribution to the total payoff, considering all possible coalitions.

Step 448 employs an integration of game theoretical frameworks and Shapley values to assess the contribution of each data attribute across various query coalitions. This approach facilitates a deep analysis of data utility that reflects the intricate interactions among attributes and their cumulative effect on data access requests. The core of this valuation mechanism is the computation of Shapley values for each data attribute. Each attribute is evaluated based on its incremental contribution to all possible combinations of attributes, or coalitions. The value function, denoted as v(C), for a coalition, C, of data attributes, is defined such that it returns a real number representing the total value that the coalition C contributes to the query. The Shapley value for each attribute is then calculated as the average of its marginal contributions across all possible coalitions.

The computation of Shapley values is operationalized through efficient, exact algorithms that mitigate the computational complexity typically associated with their calculation. For instance, considering a graph G(V,E) representing data attributes as nodes and their relationships as edges, the value function $v_1$ could be defined as the size of the fringe $F_C$, which includes all vertices in C or directly connected to it. Formally, $F_C=\{v\in V(G):v\in C$ or $\exists u\in C$ such that $(u, v)\in E(G)\}$.

The algorithmic formulae to compute the Shapley value $SV(v_i)$ for a node $v_1$ without having to iterate through all possible formulations is as follows:

$$SV(v_i) = \sum_{v_j \in \{v_i\} \cup N(v_i)} \frac{1}{1 + deg(v_j)}$$

where $N(v_i)$ is the set of neighbors of node $v_i$ and $deg(v_j)$ is the degree of node $v_j$. Intuitively, a high SV corresponds to a node with many neighbors of low degree. This feature indicates a high likelihood that adding the node to a coalition will substantially increase the size of the fringe.

At step 450, the system will determine a relative value or contribution value for each data node, or data attribute, of the plurality of data attributes or nodes in the network. The system may utilize the at least one machine learning algorithm, based on a set of predefined metrics, to calculate the relative values for the data attributes. The predefined set of metrics refers to a specific collection of criteria or standards established in advance for evaluating or measuring the characteristics, performance, or quality of the queried data attributes. In the context of data analysis, these metrics are systematically chosen to assess various aspects of data attributes, such as their relevance, frequency of use, impact on query results, or contribution to the overall value of the data set. These metrics are essential for enabling consistent, objective, and quantifiable evaluations that guide data processing and valuation decisions. The predefined set of metrics used in the system may include, but is not limited to, factors or metrics such as frequency of Access, indicating how often a data attribute is queried; uniqueness, which measures the rarity of the information provided; completeness, assessing the presence of detailed and non-missing data; correlation with outcomes, evaluating the relationship between attributes and key performance indicators; update frequency, which examines how often data is refreshed; cost of Acquisition, considering the expenses involved in obtaining the data; and impact on performance, determining the influence of attributes on the system's efficiency. These metrics collectively assist in the dynamic valuation of data attributes, facilitating effective data management and decision-making. These factors may be integrated with a series of machine learning algorithms to influence the game theoretical models and calculation of Shapley values. In certain embodiments, the relative value for the data access request is computed based on a frequency of the plurality of stored data access requests. In other embodiments, the relative value for the at least one pattern of data attributes is computed based on an attribute density within the at least one pattern of data attributes.

Step 452 includes calculating a concentration value for the overlapping data areas, based on a density of data attributes and a frequency of occurrence of the data attributes across the plurality of query clusters. More specifically, this may include calculating the plurality of Shapley values for each data attribute within the current query cluster based on a marginal contribution to the value of potential coalitions formed with other data attributes in overlapping query clusters. At step 454, based on the plurality of values attributed to each individual data attribute, the system will generate a value of the at least one subset of data attributes that was requested by the query. This value will constitute the frictional payment required by the requester to access said subset of data attributes. The frictional payment serves as a means to compensate data providers for the use of their data, reflecting the value attributed to the data based on its utility and rarity within the context of the current and historical queries. This value is derived through a valuation model that incorporates various metrics, including the frequency of data usage, its relevance in the query context, and the intensity of data interactions as determined by overlap analysis in previous queries. This valuation process ensures that each data attribute's contribution to the query results is quantitatively assessed, and a corresponding value is assigned. By requiring a frictional payment, the system ensures that there is a tangible exchange that preserves the intrinsic value of the data. This exchange not only incentivizes data providers to maintain high-quality, valuable data but also ensures that data consumers compensate for the utility they derive from accessing specific data sets.

A frictional payment or frictional value in the context of data transactions refers to a monetary or value-based fee required to access or use data. This term encapsulates the costs associated with the consumption of data, factoring in aspects like the effort, time, and resources needed to make data available and ensuring it is used in a manner that compensates the data provider fairly. After the value is calculated, the system will, at step 456, send a request to the third computing device for remittance of the frictional payment and receive the frictional payment from the third computing device. The frictional payment will be received from the third computing device during the exchange of data.

Figure 11:
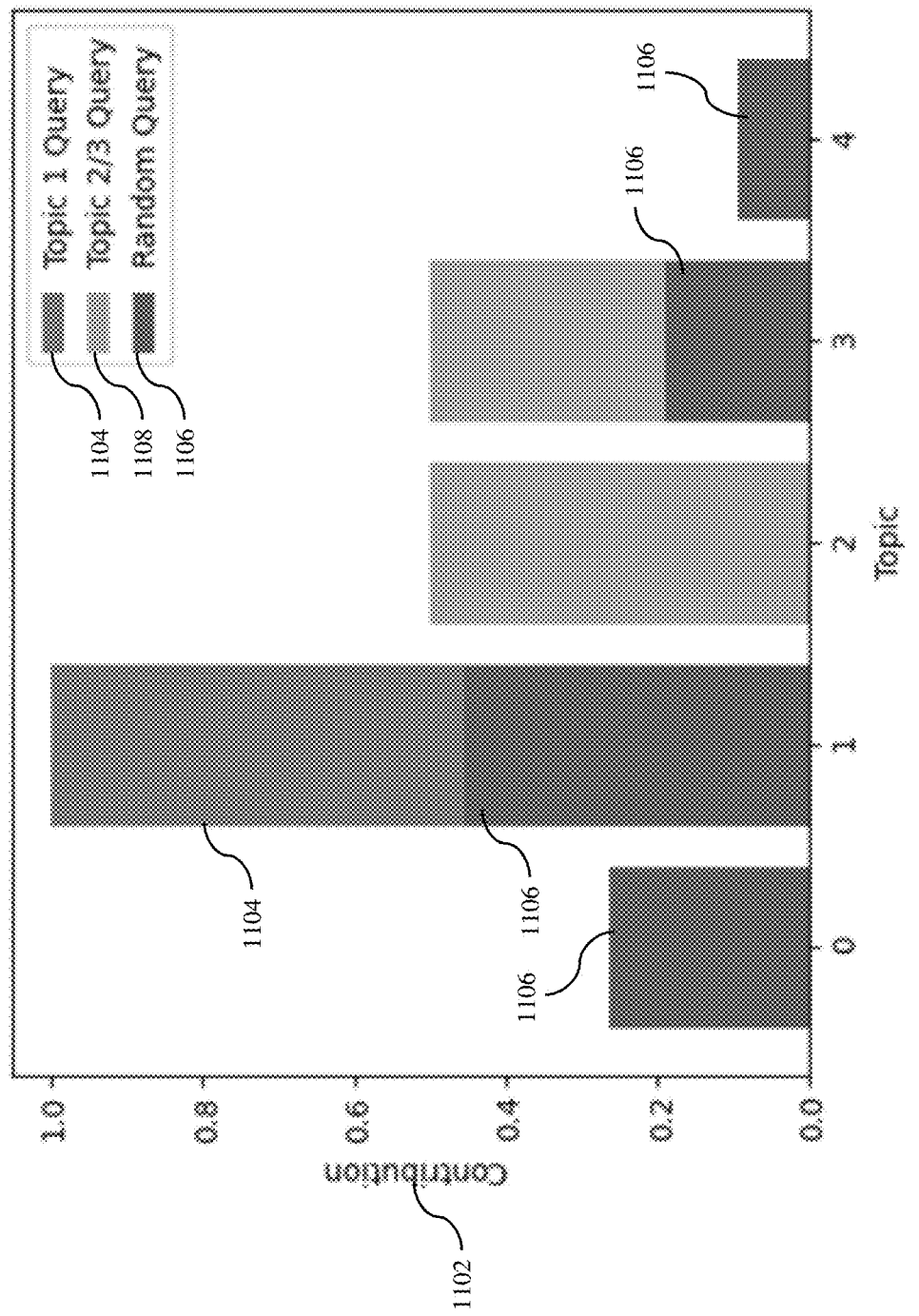
FIG. 11 is a bar graph demonstrating the use of Shapley Value with topic modeling to classify and value new random queries based on trained topics, according to an example embodiment.

The visualization of these computations can be observed in FIG. 11, FIG. 12A, FIG. 12B, and FIG. 13. FIG. 11 graphically represents the application of Shapley values to classify and assign monetary value to new queries based on their topics and the data attributes involved. FIG. 11 presents a bar graph titled "Shapley Value with Topic Modelling", illustrating the application of Shapley values in classifying a new random query based on a set of pre-trained topics. The graph features an x-axis labeled 'Topic', which enumerates topics from 0 to 4, and a y-axis labeled 'Contribution', quantifying the impact of each topic on a scale from 0.0 to 1.0. The Contribution axis quantifies the contribution value 1102 of each query relative to a particular topic. For example, with respect to Topic 1, Topic 1 Query 1104 and Random Query 1106 or current query, each contribute to Topic 1. Random Query 1106 overlaps with Topic 1 Query 1104; however, Random Query 1106 has an overall contribution value 1102 of approximately 0.45 whereas Topic 1 Query has an overall contribution value to Topic 1 of 1.0. Relatedly, the Random Query, also contributes to Topics 0, 3, and 4, but its greatest contribution value it is to Topic 1, thereby rendering the Random Query most relevant to Topic 1. Three distinct sets of bars represent different queries and their corresponding contributions to each topic. One set of bars under Topic 1 reaches the maximum contribution level of 1.0, indicating full impact by this topic for a specific query type. Another set under Topics 2 and 3 suggests moderate contributions by Topic 2/3 Query 1108, with heights indicating comparable influence between these topics. Additionally, a third set of bars across all five topics displays varying heights, showing the differential contributions of each topic to a randomly selected query. This graph effectively demonstrates how Shapley values can classify a query into pre-trained topics by showcasing the relative contribution of each topic. The visualization aims to provide insights into the proportional significance of each topic in contributing to the classification of the new query, thereby reflecting the dynamics of the topic modeling process in the context of the patent application related to data transactions and query valuation.

Figure 12A:
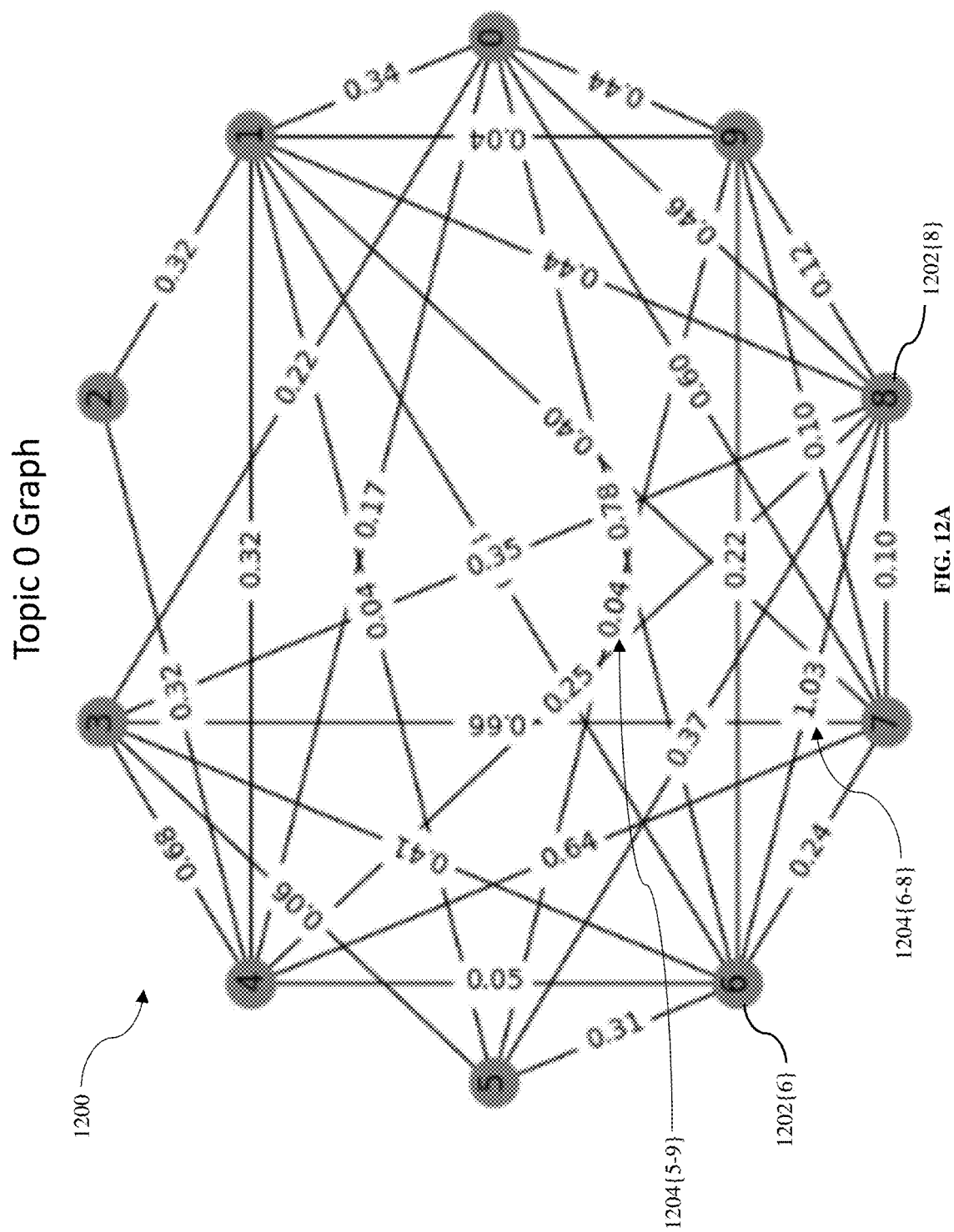
FIG. 12A is a weighted network graph classified by query topics, highlighting the distribution and importance of data within the network, according to an example embodiment.
Figure 12B:
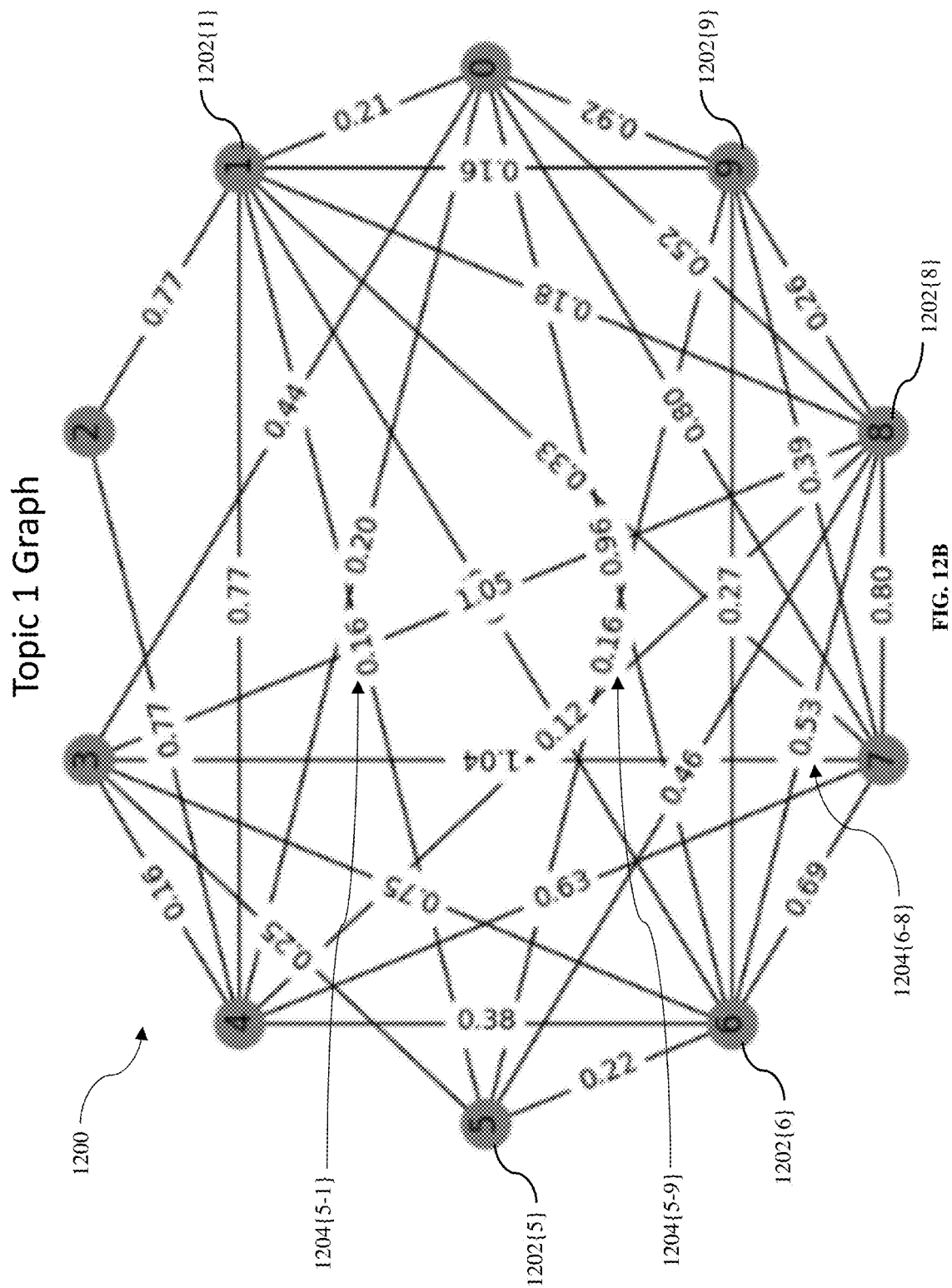
FIG. 12B shows another embodiment of FIG. 12A, exploring alternative configurations and classifications within the weighted network.

FIG. 12A and FIG. 12B illustrate how these values influence the distribution and significance of data within the network, showcasing a weighted network graph classified by query topics. Specifically, FIG. 12A depicts a weighted network 1200 for Topic 0, where nodes 1202{number from 0-9}, represent distinct data attributes or queries, interconnected through edges whose weights signify the strength and importance of these relationships. These nodes are interconnected through edges, with varying weights assigned to each edge, quantitatively expressing the strength of relationships between the nodes. The Shapley values 1204{data node-data node} quantify the multidimensional relationship between interconnected data nodes within the data network. The weights vary from 0.04 (Shapley value 1204{5-9}) to 1.03 (Shapley value 1204{6-8}), allowing for a detailed depiction of the network's connectivity. Noteworthy are the stronger connections, such as a Shapley value 1204{6-8} of 1.03 between nodes 1202{6} and 1202{8}, indicating a particularly strong relevance or dependency between these specific data points within the context of Topic 0.

Similarly, FIG. 12B portrays the weighted network 1200 for Topic 1, structured with nodes connected by weighted edges or Shapley values, representing another set of data interactions under a different query context. The network includes nodes labeled from 0 to 9. This figure mirrors the structure seen in FIG. 12A but adapts it to a different query topic. The weights on this graph range from 0.16 ((Shapley value 1204{5-9}), (Shapley value 1204{5-1}) to 0.96 (Shapley value 1204{6-0}), highlighting substantial interactions, particularly noted between nodes 6 and 0 with a weight of 0.96 (Shapley value 1204{6-0}), and between nodes 1202{7} and 1202{8} with a weight of 0.80 (Shapley value 1204{7-8}), signaling significant connections within Topic 1. Conversely, the previous strength of 1.03 between nodes 1202{6} and 1202{8} in FIG. 12A has been reduced to 0.53 (Shapley value 1204{6-8}) in the context of Topic 1, thereby signaling a weaker connection or relationship between the nodes.

Figure 13:
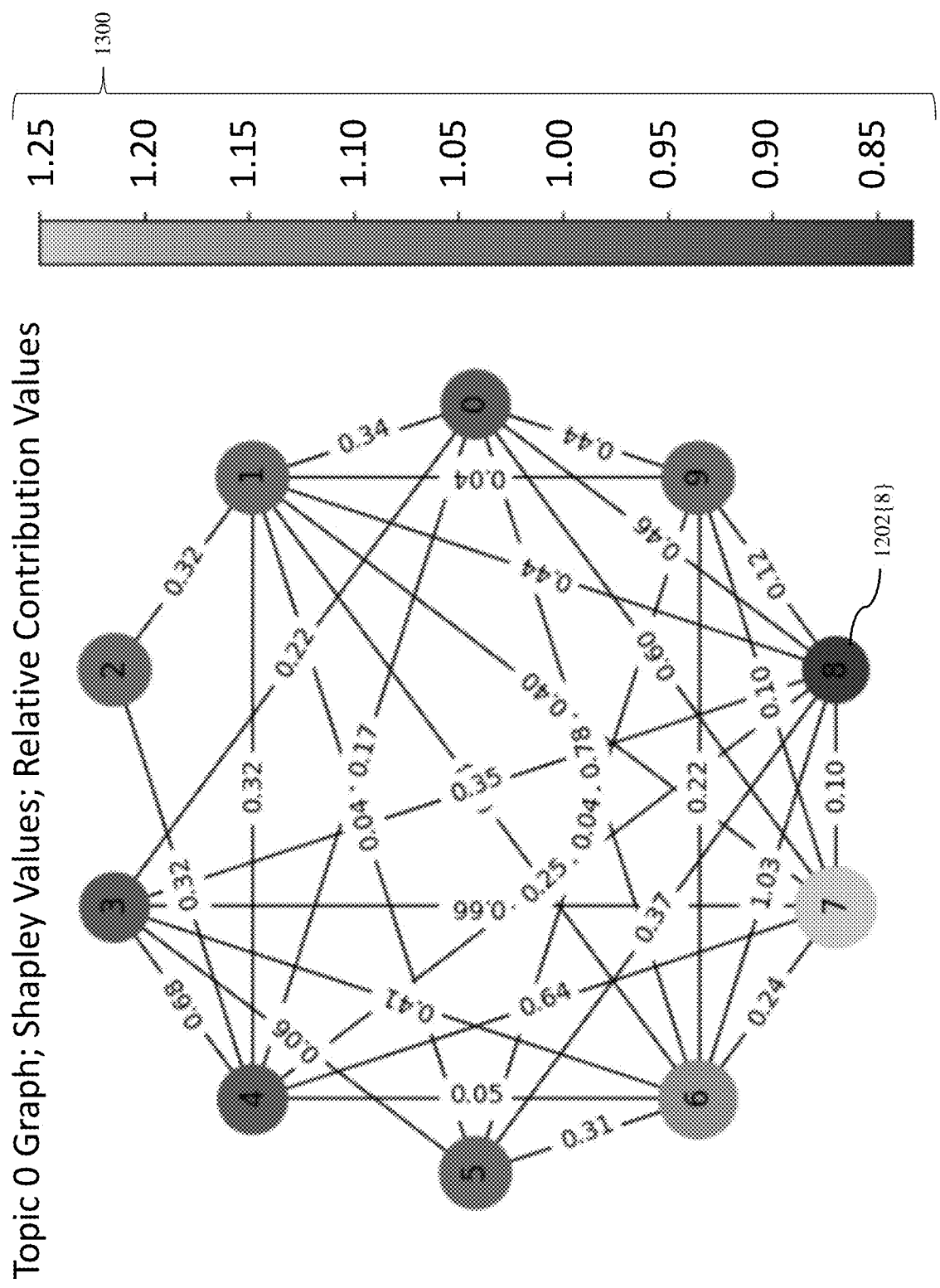
FIG. 13 is a network graph depicting the valuation of data nodes, classified by query topic using Shapley values, according to an example embodiment.

FIG. 13 is another embodiment of Topic 0 as illustrated in FIG. 12A. FIG. 13 further details the network graph depicting the valuation of individual data nodes, emphasizing their calculated worth based on their strategic positions and contributions within the network. Each node, numbered from 0 to 9, represents distinct data points or entities associated with specific query topics, interconnected by edges that carry numerical values indicating the Shapley values. These values reflect the unique contribution of each node to the overall utility of the network when combined with others, providing a clear metric for understanding the influence and importance of individual nodes within the network dynamics. The nodes in the network are differentiated by grayscale intensities, which visually denote the range of Shapley values, from lighter shades representing lower values to darker shades for higher values. This gradient scale facilitates an intuitive grasp of the distribution of values across the network, emphasizing nodes with greater impact or relevance. The weighted average of all the Shapley values depicted between the nodes in FIG. 13 is 0.335. This indicates that the resultant frictional payment for the query is relatively low compared to the weighted average of Topic 1 in FIG. 12B being approximately 0.442. Overall, the query had more relevance to Topic 1 than Topic 0. Therefore, the relative value of the data attributes of Topic 1 causes a higher frictional value for retrieval of said data attributes.

Each node in this network graph is assigned a relative contribution value 1300 that reflects the contribution of each data node to at least one of the overall data network and/or the relevant topic, based on the Shapley value computations. These values demonstrate the relative importance or influence each node holds within the network, highlighting how individual nodes contribute to collective outcomes when combined with others. This allows stakeholders to understand the marginal utility each node adds to a coalition of data points within the network. For example, data node 1302{8} has a low relative contribution value, approximately less than or equal to 0.85. This indicates that with respect to the query to Topic 0, data node 1202{8} provides little relative contribution.

While FIG. 13 portrays a representative example of the contribution of each data node individually, contrastingly, FIG. 11 focuses on depicting the contributions of each query to different topics to analyze and aid in the classification of a new random or current query. It effectively shows the Shapley values associated with various pre-trained topics, illustrating how each stored query and associated relevancy to particular topics contributes to understanding or classifying the query. Unlike FIG. 13, which details individual contributions within a network, FIG. 11 aggregates the contributions at a higher level, mapping out the impact of entire query rather than specific nodes within a network. This highlights the role of each query in enhancing the query's classification and determining a valuation for accessing said underlying data from the query, thereby offering insights into the topic-specific dynamics of query processing.

Together, these figures provide complementary views: FIG. 13 drills down into the micro-level contributions within a networked system, while FIG. 11 zooms out to evaluate the macro-level impact of queries on different topic categories to evaluate the contribution of new queries to the network as a whole, thereby furnishing a comprehensive understanding of data valuation in a decentralized system.

After a plurality of queries are processed and analyzed to build the network, the system, at step 458 continuously updates the valuation model based on the relative values, contribution values, frictional payment values, and/or Shapley values. This results in a dynamic adjustment to the concentration values and relative values of each query in response to changes in data attribute usage patterns and query frequencies. Consequently, subsequent queries may have higher Shapley values and/or frictional values if they align closely with emerging or increasingly relevant data trends. This adaptive approach ensures that the valuation of data access remains equitable and reflects the true market value of the data based on its current utility and demand. Furthermore, such continual updates help maintain the system's relevance and accuracy, ensuring that data providers and consumers transact under the most current and fair conditions possible.

In the disclosed method, the system incorporates a neural network as a core component of its architecture to enhance the processing and evaluation of data queries. A neural of the most fundamental machine learning structures inspired by the biological neural networks that constitute animal brains. It consists of layers of interconnected nodes, or "neurons," each of which processes input data sequentially, passes it through an activation function, and outputs the transformed data to subsequent layers. The neural network in this system is specifically designed to analyze patterns in data access requests, evaluate the relevance and utility of data attributes, and optimize the valuation and monetization processes. It is trained on historical data to learn complex relationships and dependencies between various data attributes and query characteristics. By leveraging learned weights and biases adjusted during training phases, the neural network can accurately predict outcomes, such as the potential value of data based on usage patterns.

The system updates and trains the neural network based on the accumulated query data and associated analytics. This step involves adapting the neural network's parameters to reflect new insights derived from the dynamic valuation of data attributes, as influenced by user queries and interactions within the system. The training process incorporates the latest data access patterns, attribute relevance, and the outcomes of recent queries to refine the network's predictive capabilities.

The update mechanism typically employs machine learning algorithms that adjust weights within the neural network to optimize performance metrics such as accuracy, recall, or specificity in data query handling. These adjustments are made possible through techniques such as backpropagation, where errors from previous query results are used to inform modifications to the neural architecture. This ensures that the neural network becomes progressively more adept at predicting the value of data based on its usage and utility in real-world applications.

Additionally, the system may utilize reinforcement learning strategies where the neural network learns to make decisions that maximize a reward signal derived from successful data transactions. This includes evaluating the effectiveness of data clustering, the precision of data attribute retrieval, and the satisfaction of user requests, thereby continuously improving the network's effectiveness in a live, operational environment. This continuous learning and updating cycle is not limited to step 458, and allows the system to remain adaptive and responsive to changing data landscapes and user needs, ensuring that the neural network remains robust and efficient in handling diverse and evolving data queries.

In light of the aforementioned description of the method and system, consider the application of the described system in the healthcare sector, particularly in enhancing personalized medicine. In this scenario, a hospital acts as the data provider, collecting extensive patient data-including genetic information and treatment outcomes. A hospital collects patient health data, including treatments, outcomes, and genetic information. Each set of patient data is associated with a unique digital identifier and stored securely within the hospital's database system. The hospital, as a data provider, submits this data to a blockchain-based system. The submission includes the data attributes (e.g., treatment outcomes, genetic markers) and a unique digital identifier for the hospital and the data batch.

Upon receiving the data submission, the system authenticates the submission by verifying a cryptographic signature that corresponds to the hospital's unique identifier, ensuring the data's integrity and origin. The system generates a verifiable credential for the submitted data, which includes a cryptographic proof of the data attributes using ZKPs to maintain data privacy. This credential certifies the authenticity and integrity of the data without exposing the underlying sensitive information. The verifiable credential is then stored in a connected database, accessible through the blockchain network.

When a pharmaceutical research company wishes to access the data for drug development research, they must request access. Assuming they meet predefined access permissions (e.g., consent compliance, purpose limitation), the system generates an access credential for them. This credential includes a temporal attribute specifying the duration of access. The pharmaceutical company, as a data requester, submits a query to access specific patient data for individuals with a certain genetic marker to study drug efficacy. The system processes the query by verifying the access credentials and the association with the requested data attributes. It checks for compliance with the temporal and access constraints.

After verifying the credentials and data access request, the system generates a verified presentation. This presentation includes the requested data attributes along with a second cryptographic proof confirming the data's authenticity. The verified presentations are sent to the pharmaceutical company. Subsequently, the system records a data exchange record on the blockchain. This record includes cryptographic proofs verifying the authenticity of each presentation and the transaction details, including a frictional payment calculated based on a valuation model using Shapley values.

By analyzing overlapping data requests and utilizing Shapley values, the system dynamically values the data based on its utility and relevance to various research queries. This helps in fair monetization of the data, incentivizing hospitals to share valuable data securely. As more data is accessed and more queries are processed, the system updates its valuation model and access credentials dynamically, reflecting changes in data usage patterns and attribute significance.

Figure 14:
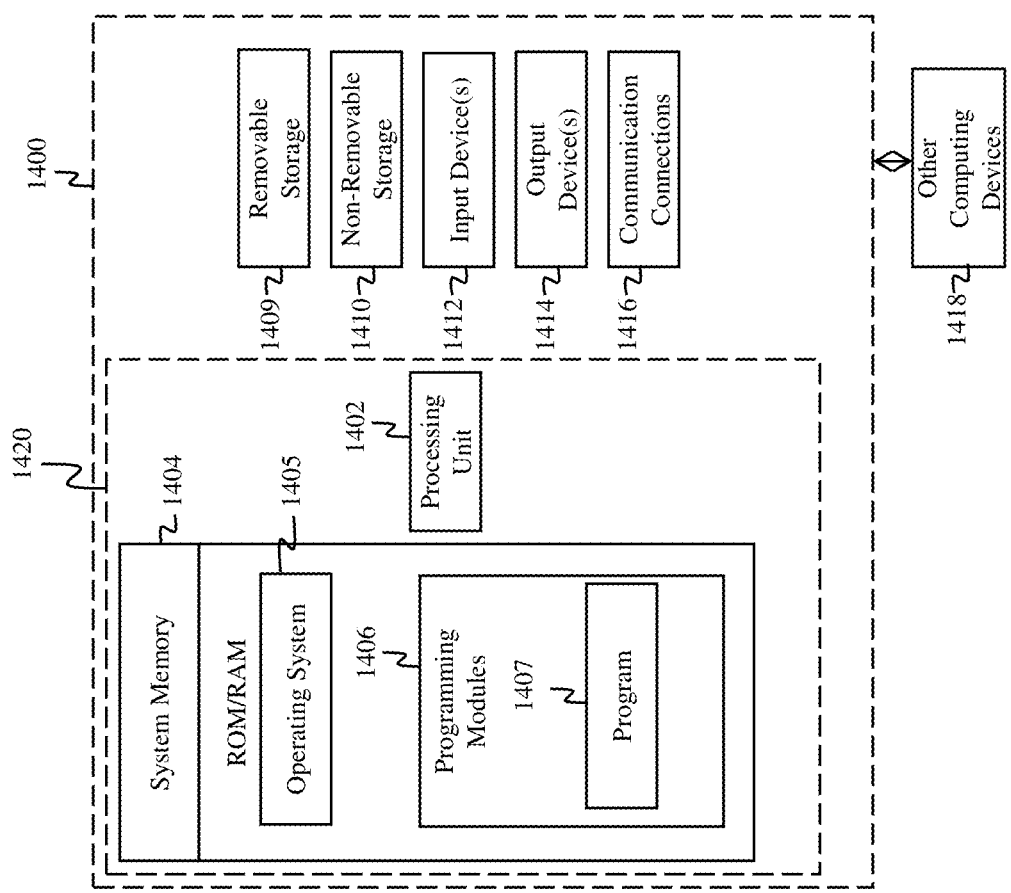
FIG. 14 illustrates a computer system according to exemplary embodiments of the present technology.

Referring now to FIG. 14, a computer system according to exemplary embodiments of the present technology is shown. The system includes an example computing device 1400 and other computing devices is shown, according to an example embodiment. Consistent with the embodiments described herein, the aforementioned actions performed by the methods and system disclosed herein may be implemented in a computing device, such as the at least one processor. Any suitable combination of hardware, software, or firmware may be used to implement the at least one processor. The aforementioned system, device, and processors are examples and other systems, devices, and processors may comprise the aforementioned computing device. Furthermore, the at least one processor may comprise an operating environment for the system and methods herein. Processes, data related to systems and methods herein may operate in other environments and are not limited to the at least one processor.

A system consistent with an embodiment of the disclosure may include a plurality of computing devices, such as a computing device 1400 of FIG. 14. In a basic configuration, computing device 1400 may include at least one processing unit 1402 and a system memory 1404. Depending on the configuration and type of computing device, system memory 1404 may comprise, but is not limited to, volatile (e.g., random access memory (RAM)), non-volatile (e.g., read-only memory (ROM)), flash memory, or any combination or memory. System memory 1404 may include operating system 1405, and one or more programming modules 1406. Operating system 1405, for example, may be suitable for controlling computing device 1400's operation. In one embodiment, programming modules 1406 may include, for example, a program module 1407 for executing the methods illustrated in FIG. 14. Furthermore, embodiments of the disclosure may be practiced in conjunction with a graphics library, other operating systems, or any other application program and is not limited to any particular application or system. This basic configuration is illustrated in FIG. 14 by those components within a dashed line 1420.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410. Computer storage media may include volatile and nonvolatile, removable, and non-removable media implemented in any method or technology for storage of information, such as computer readable instructions, data structures, program modules, or other data. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 1400. Any such computer storage media may be part of system 100. Computing device 1400 may also have input device(s) 1412 such as a keyboard, a mouse, a pen, a sound input device, a camera, a touch input device, etc. Output device(s) 1414 such as a display, speakers, a printer, etc. may also be included. The aforementioned devices are only examples, and other devices may be added or substituted.

Computing device 1400 may also contain a communication connection 1416 that may allow system 100 to communicate with other computing devices 1418, such as over a network in a distributed computing environment, for example, an intranet or the Internet. Communication connection 1416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1404, including operating system 1405. While executing on at least one processing unit 1402, programming modules 1406 (e.g., program module 1407) may perform processes including, for example, one or more of the stages of a process. The aforementioned processes are examples, and at least one processing unit 1402 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged, or integrated electronic chips containing logic gates, a circuit utilizing a microprocessor, or on a single chip (such as a System on Chip) containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. It is also understood that components of the system may be interchangeable or modular so that the components may be easily changed or supplemented with additional or alternative components.

While certain embodiments of the disclosure have been described, other embodiments may exist. Furthermore, although embodiments of the present disclosure have been described as associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method for managing data transactions and verification in a decentralized network using a blockchain over an interconnected network of a plurality of computing devices, executed by at least one processor on a non-transitory recording medium, the computer-implemented method comprising:
  receiving a data submission from a second computing device of a data provider, the data submission comprising a plurality of data attributes and a unique digital identifier, wherein the second computing device comprises a unique second computing device identifier;
  authenticating the data submission by querying the blockchain to verify a cryptographic signature corresponding to the unique digital identifier;
  generating a verifiable credential for the data submission, wherein the verifiable credential comprises:
    the plurality of data attributes;
    a first cryptographic proof of the plurality of data attributes generated using a zero-knowledge proof to verify an integrity of each data attribute of the plurality of data attributes;
    the unique digital identifier; and
    a plurality of access permissions;
  generating a cryptographic identifier for each data attribute of the plurality of data attributes to generate an indexable reference of the plurality of data attributes;
  associating the verifiable credential with the unique second computing device identifier and sending said verifiable credential to the second computing device;
  storing the verifiable credential on a connected database;
  generating an access credential authorizing a third computing device of a data requester to access at least one subset of data attributes of the plurality of data attributes if the plurality of access permissions are satisfied, wherein the access credential comprises a unique third computing device identifier of the third computing device and a temporal attribute;
  storing the access credential on the connected database;
  receiving a data access request from the third computing device, the data access request specifying the at least one subset of data attributes of the plurality of data attributes and comprising the unique third computing device identifier of the third computing device;
  verifying that the at least one subset of data attributes of the plurality of data attributes and the unique third computing device identifier of the third computing device from the data access request are associated with the access credential stored on the connected database and that the data access request satisfies the temporal attribute of the access credential;
  verifying the verifiable credential associated with the access credential;
  searching the indexable reference of the plurality of data attributes for the at least one subset of data attributes of the plurality of data attributes of the data access request;
  generating a verified presentation that comprises the at least one subset of data attributes of the plurality of data attributes and at least one second cryptographic proof for the at least one subset of data attributes of the plurality of data attributes;
  generating a plurality of verified presentations based on a plurality of data access requests from the third computing device;
  sending the plurality of verified presentations to the third computing device; and
  recording a data exchange record on the blockchain, the data exchange record comprising:
    (i) at least one third cryptographic proof as a function of the plurality of verified presentations provided to the third computing device as to provide a layered cryptographic proof of each verified presentation authenticating the at least one subset of data attributes of the plurality of data attributes and the at least one second cryptographic proof that were sent to the third computing device;
    (ii) a frictional payment based on a valuation model; and
    (iii) at least a portion of the access credential of the third computing device that submitted the data access request.

2. The computer-implemented method of claim 1, wherein the computer-implemented method further comprises:
  determining a valuation for the at least one subset of data attributes of the plurality of data attributes requested by the third computing device, wherein the valuation is based on using the valuation model comprising a predefined set of metrics for assessing the at least one subset of data attributes of the plurality of data attributes;
  calculating the frictional payment required for accessing the at least one subset of data attributes of the plurality of data attributes requested by the third computing device, wherein the frictional payment is proportional to the valuation and adjusted based on the predefined set of metrics; and
  sending a request to the third computing device for remittance of the frictional payment; and
  receiving the frictional payment from the third computing device.

3. The computer-implemented method of claim 1, wherein determining the frictional payment using the valuation model comprises:
  analyzing the data access request with a plurality of stored data access requests to identify at least one pattern of data attributes between the data access request and the plurality of stored data access requests;
  determining a relative value for at least one of (i) the data access request and (ii) the at least one pattern of data attributes; and wherein the relative value for the data access request is computed based on a frequency of the plurality of stored data access requests;

wherein the relative value for the at least one pattern of data attributes is computed based on an attribute density within the at least one pattern of data attributes.

4. The computer-implemented method of claim 1, wherein the valuation model comprises:

generating a plurality of query clusters based on a plurality of stored data access requests, each query cluster of the plurality of query clusters representing a unique query and its corresponding plurality of data attributes;

generating a current query cluster for the data access request;

comparing the current query cluster with the plurality of query clusters to identify an overlapping area where the current query cluster intersects with at least one query cluster of the plurality of query clusters;

calculating a contribution value for the overlapping area of the current query, based on a density of data attributes and a frequency of occurrence of the data attributes across the plurality of query clusters; and determining a relative value of the at least one subset of data attributes based on the contribution value of the current query.

5. The computer-implemented method of claim 4, wherein the valuation model further comprises:

applying a game theoretical model comprising a value function used to generate a plurality of Shapley values to assess a potential contribution of each data attribute;

calculating the plurality of Shapley values for each data attribute within the current query cluster based on a marginal contribution to a contribution value of potential coalitions formed with other data attributes in overlapping query clusters;

generating a frictional value of the at least one subset of data attributes; and updating the valuation model based on the plurality of Shapley values to dynamically adjust the contribution value of the plurality of data attributes in response to changes the relative value of the at least one subset of data attributes.

6. A computer-implemented method for training a neural network for dynamic valuation of data queries of verified and authenticated data, the computer-implemented method comprising:

receiving a data submission comprising a plurality of data attributes;

receiving a query for at least one subset of data attributes of the plurality of data attributes of the data submission;

applying a game theoretical model comprising a value function used to calculate a plurality of Shapley values for each data attribute attributed to the query based on a marginal contribution to a contribution value of potential coalitions formed with other data attributes in overlapping query clusters;

training the neural network based on the plurality of Shapley values and the query;

receiving a plurality of subsequent queries;

dynamically adjusting each Shapley value associated with each data attribute of the plurality of data attributes based on each data attributes contribution value relative to each query of the plurality of subsequent queries; and training the neural network based on the plurality of Shapley values that were dynamically adjusted after receiving each subsequent query.

7. The computer-implemented method of claim 6 further comprising:

generating a plurality of query clusters based on a plurality of stored data access requests, each query cluster of the plurality of query clusters representing a unique query and its corresponding plurality of data attributes.

8. The computer-implemented method of claim 7 further comprising:

generating a current query cluster for the query;

comparing the current query cluster with the plurality of query clusters to identify an overlapping area where the current query cluster intersects with at least one query cluster of the plurality of query clusters;

calculating a contribution value for the overlapping area, based on a density of data attributes and a frequency of occurrence of the data attributes across the plurality of query clusters; and determining a relative value for the at least one subset of data attributes of the plurality of data attributes based on the contribution value.

9. A computer-implemented method for generating a valuation model for assessing a data network, executed by at least one processor on a non-transitory recording medium, the computer-implemented method comprising:

receiving a data submission from a second computing device of a data provider, the data submission comprising a plurality of data attributes;

converting the plurality of data attributes to a plurality of embeddings;

plotting the plurality of embeddings as a data cluster, wherein each data attribute of the plurality of data attributes is a node in the data network;

receiving a query from a third computing device of a data requester, the query requesting a verified presentation of at least one subset of data attributes of the plurality of data attributes;

identifying a data cluster of the at least one subset of data attributes of the query; and applying a game theoretical model comprising a value function used to generate a plurality of Shapley values to assess a potential contribution of each data attribute of the at least one subset of data attributes of the query;

calculating the plurality of Shapley values for each data attribute based on a marginal contribution to a contribution value of potential coalitions formed with other data attributes of stored overlapping query clusters;

generating a value of the at least one subset of data attributes; and updating the valuation model based on the value of the at least one subset of data attributes to dynamically adjust a relative value of each data attribute of the plurality of data attributes in the data network.

10. The computer-implemented method of claim 9 further comprising:

generating the verified presentation that comprises the at least one subset of data attributes of the plurality of data attributes and at least one second cryptographic proof for the at least one subset of data attributes.

11. The computer-implemented method of claim 9 further comprising:

authenticating the data submission by querying a blockchain to verify a cryptographic signature corresponding to a unique digital identifier.

12. The computer-implemented method of claim 9 further comprising:
generating a verifiable credential for the data submission, wherein the verifiable credential comprises:
the plurality of data attributes; and
a first cryptographic proof of the plurality of data attributes generated using a zero-knowledge proof to verify an integrity of each data attribute of the plurality of data attributes.

13. The computer-implemented method of claim 9 further comprising:
generating a cryptographic identifier for each data attribute of the plurality of data attributes to generate an indexable reference of the plurality of data attributes; and
searching the indexable reference of the plurality of data attributes for the at least one subset of data attributes of the plurality of data attributes of the query.

14. The computer-implemented method of claim 9 further comprising:
generating an access credential authorizing the third computing device of a data requester to access the at least one subset of data attributes of the plurality of data attributes if a plurality of access permissions is satisfied, wherein the access credential comprises a unique third computing device identifier of the third computing device and a temporal attribute.

15. The computer-implemented method of claim 9 further comprising:
verifying that the at least one subset of data attributes of the plurality of data attributes and a unique third computing device identifier of the third computing device from the query are associated with an access credential stored on a connected database and that the query satisfies a temporal attribute of the access credential.

16. The computer-implemented method of claim 9 further comprising:
recording a data exchange record on a blockchain, the data exchange record comprising at least one third cryptographic proof as a function of a plurality of verified presentations provided to the third computing device as to provide a layered cryptographic proof of each verified presentation authenticating the at least one subset of data attributes of the plurality of data attributes and at least one second cryptographic proof.

* * * * *